US 8,572,636 B2

(12) United States Patent
Okuyama et al.

(10) Patent No.: US 8,572,636 B2
(45) Date of Patent: Oct. 29, 2013

(54) DISK LOADING DEVICE AND DISK DEVICE

(75) Inventors: Isao Okuyama, Chiba (JP); Aki Yoguchi, Tokyo (JP); Takeshi Igarashi, Yokohama (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/319,864

(22) PCT Filed: May 12, 2010

(86) PCT No.: PCT/JP2010/057997
§ 371 (c)(1),
(2), (4) Date: Jan. 30, 2012

(87) PCT Pub. No.: WO2010/131666
PCT Pub. Date: Nov. 18, 2010

(65) Prior Publication Data
US 2012/0124600 A1 May 17, 2012

(30) Foreign Application Priority Data

May 13, 2009 (JP) ................................. 2009-117058
May 13, 2009 (JP) ................................. 2009-117059

(51) Int. Cl.
*G11B 17/043* (2006.01)
*G11B 17/02* (2006.01)
(52) U.S. Cl.
USPC ........................................... 720/623; 720/620
(58) Field of Classification Search
USPC ........................................... 720/615, 619–623
See application file for complete search history.

(56) References Cited

U.S. PATENT DOCUMENTS

| 5,349,488 A | 9/1994 | Shibata |
| 5,416,763 A * | 5/1995 | Ohsaki ........................... 720/623 |
| 7,706,360 B2 | 4/2010 | Fujisawa |

(Continued)

FOREIGN PATENT DOCUMENTS

| JP | 6028736 A | 2/1994 |
| JP | 08-000848 U | 5/1996 |

(Continued)

OTHER PUBLICATIONS

International Search Report for corresponding application PCT/JP2010/057997, Aug. 24, 2010.

(Continued)

*Primary Examiner* — Will J Klimowicz
(74) *Attorney, Agent, or Firm* — Matthew B. Dernier, Esq.; Gibson & Dernier LLP

(57) ABSTRACT

A disk loading apparatus (disk apparatus) includes: a pair of front arms that are disposed substantially symmetrically with respect to a virtual straight line extending along a loading direction of a disk and passing a substantially central position of an insertion opening of an apparatus main body and are pivotally supported at one end thereof in the proximity of the opposite ends of the insertion opening such that the other ends thereof are spaced away from each other to load the disk; and a pair of link arms that are disposed substantially symmetrically around the virtual straight line and crossing with each other to synchronize the pivotal motions of the arms. The link arms have a restricting portion for abutting with the disk loaded to the loaded position to restrict the movement of the disk.

11 Claims, 35 Drawing Sheets

(56) References Cited

U.S. PATENT DOCUMENTS

| | | | |
|---|---|---|---|
| 2005/0132390 A1* | 6/2005 | Tokumoto et al. | 720/623 |
| 2007/0250843 A1* | 10/2007 | Fujisawa et al. | 720/623 |
| 2007/0277187 A1 | 11/2007 | Fujisawa | |
| 2009/0083771 A1* | 3/2009 | Yokochi et al. | 720/604 |

FOREIGN PATENT DOCUMENTS

| | | |
|---|---|---|
| JP | 10275413 A | 10/1998 |
| JP | 2006120278 A | 5/2006 |
| JP | 2007317279 A | 12/2007 |
| JP | 2007335065 | 12/2007 |
| JP | 2009087392 A | 4/2009 |

OTHER PUBLICATIONS

Notification for Reasons of Rejection for corresponding JP Application No. JP-2009-117059, dated Dec. 6, 2011.

International Preliminary Report on Patentability for corresponding application PCT/JP2010/057997, Dec. 12, 2011.

* cited by examiner

FIG.1
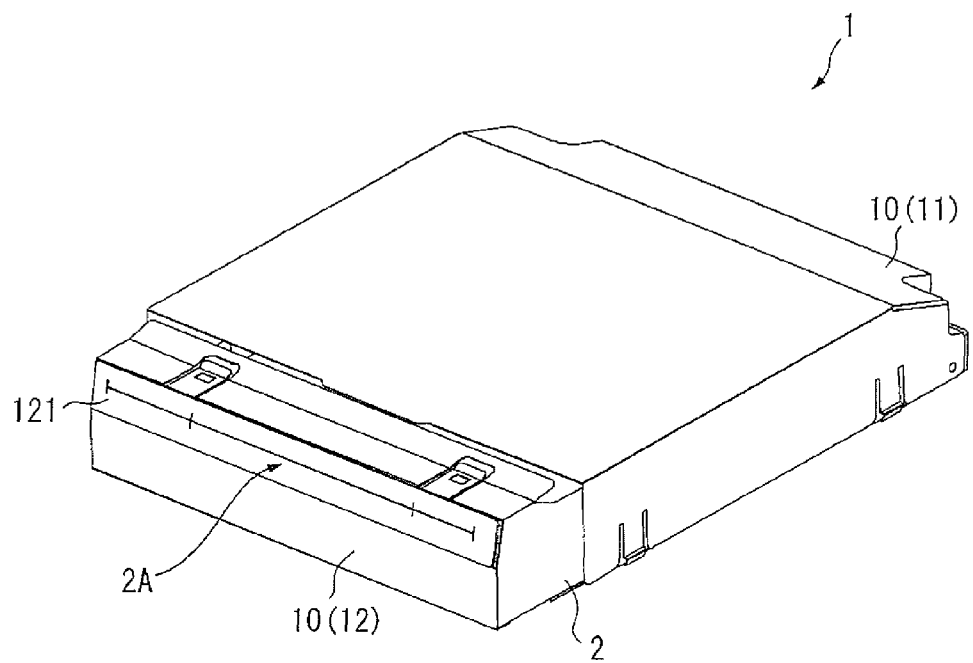
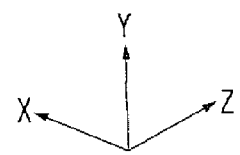

FIG.3
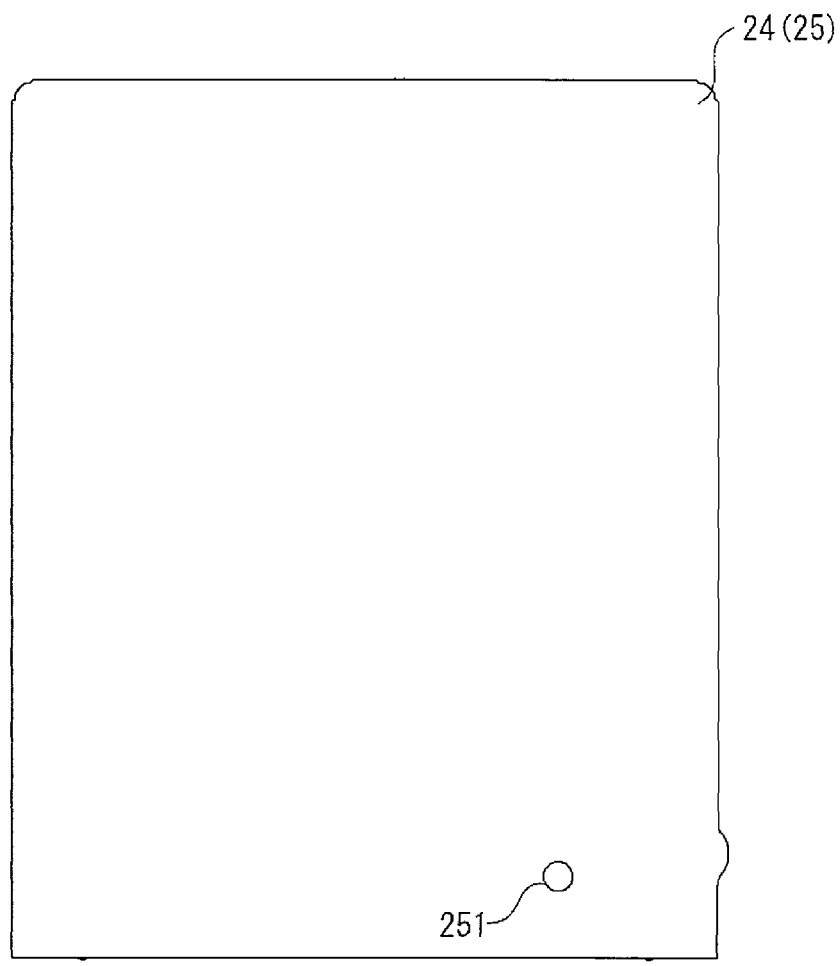
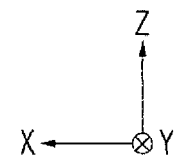

FIG.19
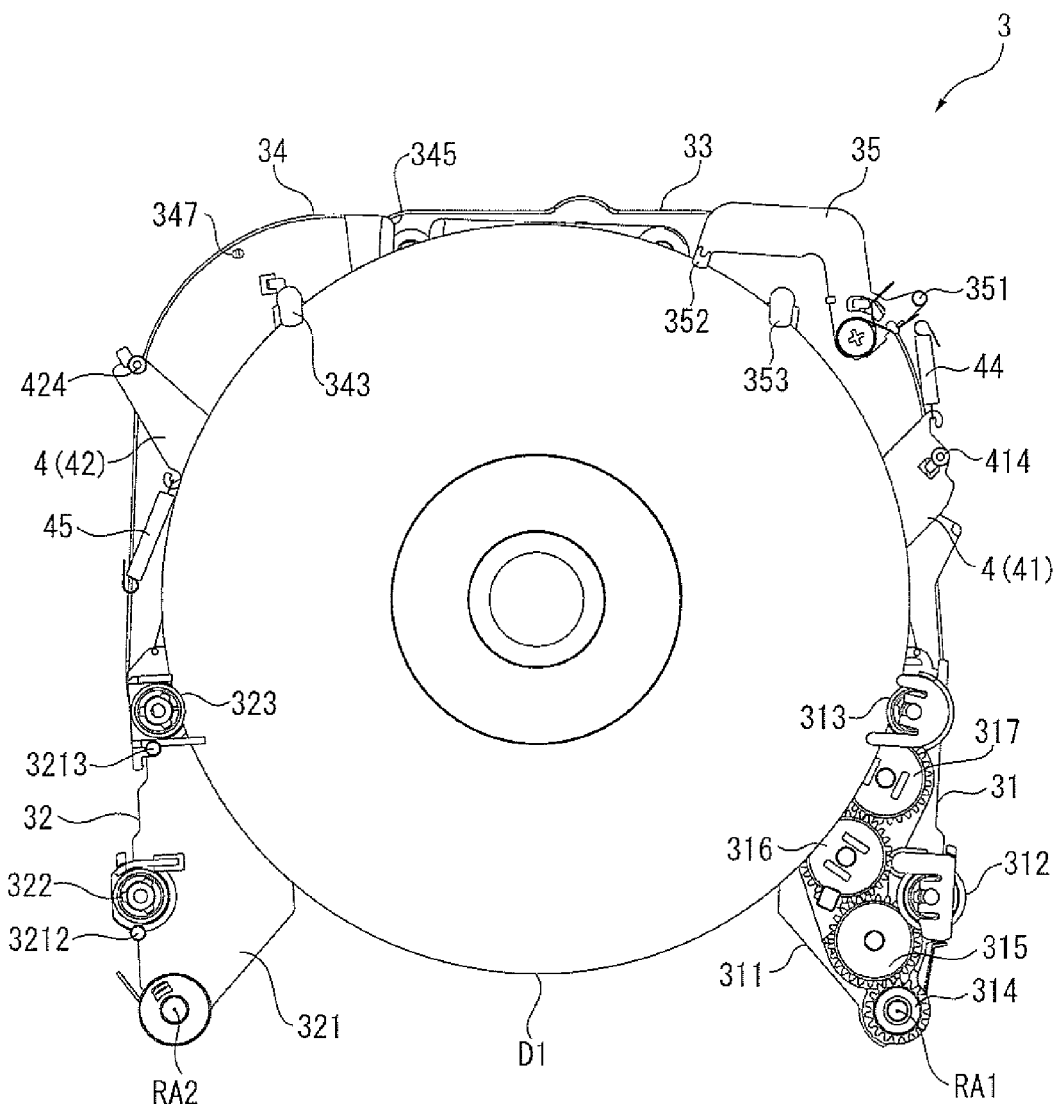
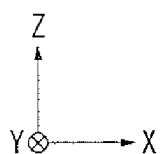

FIG. 28
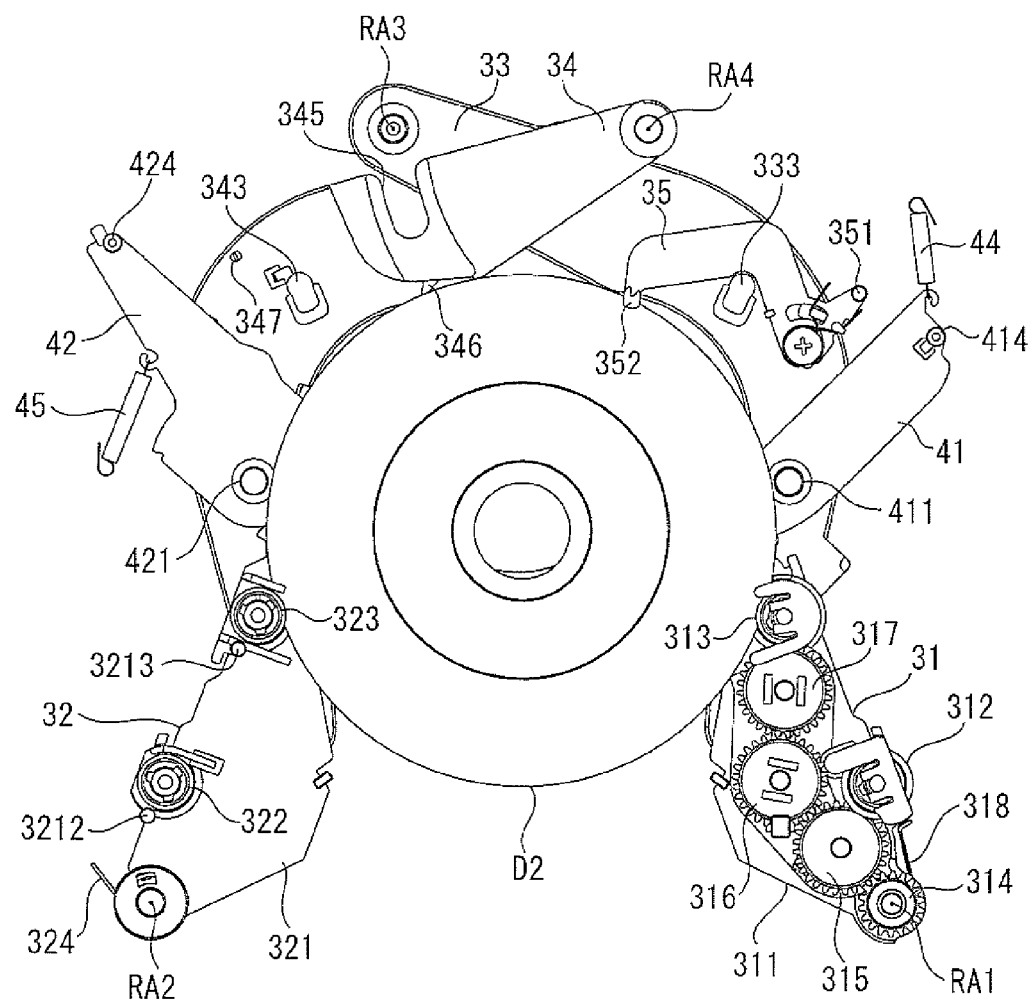
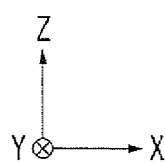

FIG.29
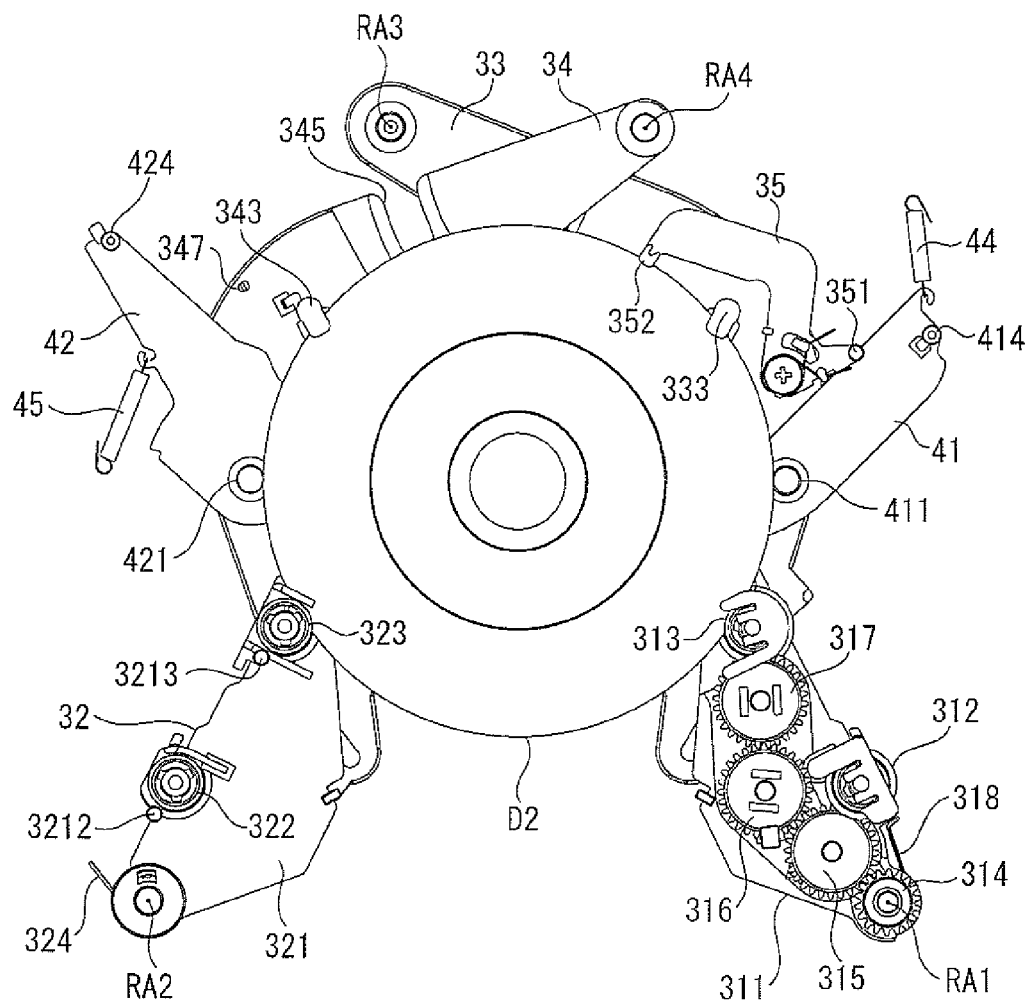
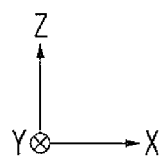

DISK LOADING DEVICE AND DISK DEVICE

TECHNICAL FIELD

The technology disclosed herein relates to a disk loading apparatus and disk apparatus.

BACKGROUND ART

A disk apparatus is known which carries out reading and recording of information from and on a disk such as a CD (Compact Disc), a DVD (Digital Versatile Disc) or a BD (BLU-RAY DISC: registered trademark). As such a disk apparatus as just described, a slot-in type disk apparatus which includes an arm for transporting a disk inserted in an opening for disk accommodation is known and disclosed (for example, see Patent Document 1).

In the disk apparatus of Patent Document 1 mentioned above, a pair of front arms having pivot shafts in the proximity of the opposite ends of the opening into and from which a disk is inserted and removed are supported for rotation. The front arms are pivoted in synchronism with each other by a pair of link arms. After a disk inserted from the opening is gripped by rollers of the arms, the rollers are rotated to pivot the front arms in a direction in which they are spaced away from the opening to load the disk into the inside of the apparatus. The disk loaded in this manner is centered by a support arm and a detection arm and disposed at a chucking position. When the detection arm is pivoted, a pair of slide cams disposed for engagement with the detection arm in such a manner as to sandwich an optical unit therebetween are slidably moved in the opposite directions to each other toward the loading direction of the disk. By the sliding movement of the slide cams, the optical unit is moved up until the disk is chucked between a turntable of the optical unit and a chuck pulley.

Details concerning know disk apparatus may be found in JAPANESE PATENT LAID-OPEN NO. 2007-335065.

However, the disk apparatus disclosed in Patent Document 1 mentioned above is configured such that a disk loaded in by the front arms which pivot in synchronism with each other is introduced to the chucking position by the arms. The disk apparatus further includes not only a pair of slide cams for moving the optical unit upwardly but also a link member for synchronizing the sliding movement of the slide cams. Therefore, the disk apparatus has a problem in that it includes a great number of parts and is complicated in configuration.

Therefore, it is desirable to provide a disk loading apparatus and a disk apparatus which can be simplified in configuration.

SUMMARY OF THE INVENTION

According to an embodiment of the present disclosure, there is provided a disk loading apparatus for loading a disk to a loaded position, including an apparatus body having an insertion opening corresponding to a diametrical dimension of the disk and having the loaded position therein to which the disk inserted into the insertion opening is to be positioned, and a pair of front arms disposed in a substantially symmetrical relationship with each other with respect to a virtual straight line extending along the loading direction of the disk and passing a substantially central position of the insertion opening and supported at one end thereof for pivotal motion in the proximity of the opposite ends of the insertion opening such that the other ends thereof are spaced away from each other to load the disk. The disk loading apparatus further includes a pair of link arms disposed in a substantially symmetrical relationship with each other around the virtual straight line and in a crossing relationship with each other and supported at one end thereof for pivotal motion such that the other ends thereof are spaced away from each other to synchronize the pivotal motion of the front arm with which one of the link arms is engaged and the pivotal motion of the front arm with which the other of the link arms is engaged with each other. In the disk loading apparatus, at least one of the link arms has a restricting portion adapted to abut with an end edge of the disk loaded to the loaded position to restrict the movement of the disk to a leading end side in the loading direction.

In the disk loading apparatus, the restricting portion which abuts with an end edge of a disk to restrict the movement of the disk from the loaded position to the leading end side in the loading direction is provided at a position of one of the link arms in pair on the leading end side in the loading position. By the restricting portion, the disk loaded by the front arms can be disposed appropriately to the loaded position. Since such loading of a disk to the loaded position can be carried out by the front arms in pair and the link arms in pair which synchronize pivotal motions of the front arms with each other, the disk loading apparatus can be configured in a simplified configuration in comparison with the disk apparatus disclosed in Patent Document 1 mentioned hereinabove without the necessity for provision of other arms and so forth. Accordingly, a disk can be loaded to the loaded position by a simple configuration.

In this instance, preferably each of the link arms has a curved shape and is disposed such that the inner side of the curved shape is directed to the center of the loaded position.

In such a curved shape as in the disk loading apparatus, straight lines from the center to end portions cross with each other by a predetermined angle, and for example, a substantially L shape, a substantially arcuate shape or the like is available as the curved shape.

In the disk loading apparatus, the range of movement of the end portions of the link arms on the opposite side to the pivot shaft side can be reduced from that in an alternative case wherein the link arms have a substantially linear shape. Therefore, the disk loading apparatus can be configured in a reduced size. Further, the space in the apparatus main body can be utilized effectively, and otherwise possible interference of the link arms with other components of the disk loading apparatus can be suppressed.

In this instance, preferably each of the link arms has the restricting portion, and the restricting portions are disposed in a substantially symmetrical relationship with each other with respect to the virtual straight line on the leading end side in the loading direction with respect to the center of the loaded position.

In the disk loading apparatus, since the restricting portions are disposed in a substantially symmetrical relationship with each other with respect to the virtual straight line, the substantially symmetrical positions of the disk with respect to the virtual straight line can be restricted. Accordingly, in comparison with an alternative case wherein only one restricting portion is provided at only one portion of one of the link arms, the disc can be placed with certainty at the loaded position without being displaced.

In this instance, preferably the front arms have grasping members provided at substantially symmetrical positions with respect to the virtual straight line and adapted to abut with an end edge of the disk to grasp the disk; the grasping member which at least one of the front arms has being a roller for transporting the disk; the restricting portions leaving, when the restriction portions abut with the disk, the disk at the loaded position together with the grasping members.

With the disk loading apparatus, the restricting portions and the grasping member are abutted with an end edge of the disk loaded to the loaded position. Consequently, the disk can be supported at least at three points thereof, and therefore, the disk can be placed stably with certainty at the loaded position. It is to be noted that, if each link arm has the restricting portion, then since the disk is supported at four points thereof by the restricting portions and the grasping members, the disk can be placed stably to the loaded position.

In this instance, preferably the one end of each of the link arms which acts as a pivot shaft is positioned on the leading end side in the loading direction with respect to the center of the loaded position; and the other end of each of the link arms is engaged with the other end of the corresponding front arm.

If the one end which acts as a pivot shaft of each link arm is positioned otherwise on the trailing end side in the loading direction with respect to the center of the loaded position, then the restricting portions positioned on the leading end side in the loading direction are spaced away by a great amount from the virtual straight line described above by the pivotal motion of the link arms by the pivotal motion of the front arms. Therefore, the position setting of the restricting portions which are abutted with an end edge of the disk loaded to the loaded position is complicated. Particularly in the case where a different disk such as, for example, a disk of another diameter of 8 cm which is smaller than a disk having a diametrical dimension corresponding to the insertion opening such as, for example, a disk of a diameter of 12 cm is to be positioned by the restricting portions, the position setting of the restricting portions is further complicated. In the case where the restricting portions are spaced by a great distance away from the virtual straight line in this manner, restriction of the disk may not possibly be carried out appropriately.

In contrast, with the disk loading apparatus, since the one end which acts as a pivot shaft of each link arm is positioned on the leading end side in the loading direction with respect to the center of the loaded position, even if the link arms are pivoted open by a great amount in response to the pivotal motion of the front arms, the position of the restricting positions is not displaced by a great amount from the virtual straight line. Therefore, the restricting portions can be brought into abutment with certainty with an end edge of the disk loaded to the loaded position, and can restrict the disk appropriately. Further, even if such a disk of a smaller size as described above is inserted, the disk can be restricted appropriately, and position setting of the restricting portions can be carried out readily. Accordingly, restriction of the disk by the restricting portions can be carried out with certainty.

In this instance, preferably one of the link arms has a first projection which projects toward the other link arm at the crossing point with the other link arm, and the other link arm has a first grooved portion extending along a locus of the first projection upon pivotal motion of the link arms and adapted to receive the first projection inserted therein.

With the disk loading apparatus, since the first projections are fitted in the first grooved portions to combine the link arms, the link arms can be pivoted by an equal pivotal motion amount in synchronism with each other. Consequently, the front arms which engage with the link arms can be pivoted by an equal pivotal motion amount and in synchronism with each other. Accordingly, since the front arms can be pivoted with certainty in a symmetrical relationship with each other with respect to the virtual straight line, the disk can be loaded while being centered by the front arms.

In this instance, preferably the first grooved portion has a first cutout which is cut out from a position of the first projection in a state in which the disk is not loaded toward the center of the loaded position, and when a different disk having a diameter smaller than that of the disk is inserted in a one-sided state to the front arm side which engages with the other of the link arms of the insertion opening, the first projection is fitted into the first cutout.

With the disk loading apparatus, when a different disk having a smaller diameter is inserted into the insertion opening in a one-sided state to the front arm side with which the link arm having the first grooved portion is engaged, the pivotal motion of the front arms can be restricted.

In particular, by the different disk inserted in a one-sided state, a load to the leading end side in the loading direction is applied to the front arm which is abutted with the different disk and the link arm which engages with the front arm, that is, the link arm on the side on which the first grooved portion is formed. If the link arms tend to be pivoted in this state, then the first projection is slidably moved along an end edge of the first grooved portion on the side nearer to the center of the loaded position until it is fitted into the first cutout. Therefore, the pivotal motion of the link arms and hence of the front arms can be restricted. Accordingly, the different disk can be prevented from being loaded without being centered.

It is to be noted that, in order to provide each of the front arms with a biasing member for biasing the front arm toward the insertion opening side such that, in order to prevent rattling of the front arms, the biasing force of one of the biasing members is set lower than the biasing force of the other biasing member, preferably the biasing force of the biasing member which acts upon the front arm which engages with the link arm which has the first grooved portion and the first cutout is set lower than the biasing force of the biasing member which acts upon the other front arm. By the configuration, if the different disk is inserted in a one-sided state to the front arm side, then the first projection can be fitted into the first cutout with certainty. Accordingly, the different disk can be prevented from being loaded without being centered with certainty.

In the disk loading apparatus, preferably each of the front arms has a second projection which projects toward a corresponding one of the link arms; and each of the link arms has a second grooved portion in which the corresponding second projection slidably moves upon pivotal motion of the front arm. In the disk loading apparatus, preferably at least one of the second grooved portions has a second cutout which is cut out from the second grooved portion to the center side of the loaded position; and the second projecting is fitted into the second cutout when a different disk having a diameter smaller than that of the disk is inserted into the insertion opening in a one-sided state to the front arm side which engages with the link arm on the opposite side to the link arm which has the second cutout.

In the disk loading apparatus, since the second projection is fitted into the second cutout, when a different disk having a smaller diameter is inserted into the insertion opening in a one-sided state to the opposite side to the front arm which has the second projection, the pivotal motion of the front arms can be restricted.

In particular, by the different disk inserted in a one-side state, a load to the leading end side in the loading direction is applied to the front arm which abuts with the different disk and the link arm which engages with the front arm. Therefore, upon the pivotal motion of the front arms upon loading of the disk, the second projection of the front arm on the opposite side to the front arm is slidably moved along an end edge of the second grooved portion, with which the second projection is engaged, on the center side of the loaded position. Then, as the second projection is slidably moved further until it is fitted into the second cutout, further pivotal motion of the link arms and the front arms can be restricted. Accordingly, the different disk can be prevented from being loaded without being centered.

It is to be noted that, where the biasing member described hereinabove is provided for each of the front arms, if the front arm upon which the higher biasing force acts has the second projection and the link arm which engages with the front arm has the second grooved portion and the second cutout, then when a different disk is inserted in a one-sided state to the front arm side upon which the lower biasing force acts, the second projection can be fitted into the second cutout with certainty. Accordingly, the different disk can be prevented from being loaded with certainty without being centered.

In this instance, preferably at least one of the link arms has a first pivotal motion restricting portion adapted to restrict, when the disk is loaded to the loaded position, pivotal motion of the link arms in directions in which the other ends of the link arms move toward each other in a state in which the link arms are spaced from the disk.

With the disk loading apparatus, the state in which the restricting portions are spaced from the disk loaded to the loaded position can be maintained. Further, since the pivotal motion of the link arms is restricted, also the pivotal motion of the front arms in a direction in which they approach the disk can be restricted and the state in which the front arms are spaced from the disk can be maintained with certainty. Accordingly, since the link arms and the front arms do not interfere with each other, for example, when the disk is rotated, the rotation of the disk can be prevented from being disturbed by the front arms.

In this instance, preferably the disk loading apparatus further includes an abutting member adapted to be abutted with one of faces of the disk loaded to the loaded position; and an arm member adapted to pivot to move the abutting member into abutment with the disk. In the disk loading apparatus, preferably at least one of the link arms includes a second pivotal motion restricting portion adapted to restrict pivotal motion of the arm member when the disk is not loaded.

As such an abutting member as described above, for example, a turntable having a spindle which is inserted in a hole of a disk to rotate the disk, a chucking member such as a chuck pulley which cooperates with the turntable to chuck the disk therebetween and so forth are applicable.

In the disk loading apparatus, since the pivotal motion of the arm members is restricted by the second pivotal motion restricting portion, the abutting member does not move in a state in which no disk is loaded. Accordingly, it is possible to prevent loading of a disk from being disturbed.

According to another embodiment of the disclosed technology, there is provided a disk apparatus including the disk loading apparatus described above, and an information reading/recording apparatus adapted to carry out at least one of reading and recording of information from and on the disk loaded by the disk loading apparatus.

With the disk apparatus, advantages similar to those of the disk loading apparatus described above can be achieved. Consequently, since at least one of reading and recording of information from and on a disk can be carried out appropriately by the information reading/recording apparatus, the disk apparatus achieves improved reliability.

According to a further embodiment of the disclosed technology, there is provided a disk apparatus including, a housing, a rotation section adapted to engage with a disk in the housing and rotate the disk around a direction of an axis of the disk, an information reading/recording section adapted to carry out at least one of reading and recording of information from and on the disk, a holding member adapted to hold at least one of the rotation section and the information reading/recording section, and a moving section adapted to move the holding member at least in one of a direction in which the holding member moves toward the disk and another direction in which the holding member moves away from the disk. In the disk apparatus, the moving section includes a first cam member formed in an arcuate shape surrounding at least part of the holding member and provided for arcuate movement along the holding member around an axis of the arcuate movement at the center of the arcuate shape. One of the holding member and the first cam member has a grooved portion inclined with respect to a direction along the axis of the arcuate movement while the other of the holding member and the first cam member has a first engaging portion for engaging with the grooved portion.

It is to be noted that, as the rotation section, a turntable having a spindle which is inserted in a hole of a disk to rotate the disk is applicable. Meanwhile, as the information reading/recording section, a pickup which irradiates light such as a laser beam upon a disk to record information on the disk or read information recorded on the disk based on reflected light from the disk is applicable.

Further, the grooved portion is formed in an inclined relationship with respect to the direction along the axis of the arcuate movement. In other words, the grooved portion is inclined continuously such that it approaches or is spaced away from the disk as the distance from one end of the range of movement of the first engaging portion increases toward the other end of the range of movement. Or in other words, the grooved portion is formed along a straight line inclined with respect to one of the faces of the disk.

With the disk apparatus, the grooved portion which one of the holding member and the first cam member has is inclined in both of the direction of the arcuate movement of the first cam member and the direction along the axis of the arcuate movement of the first cam member. Further, when the first cam member is arcuately moved, the first engaging portion is moved along the grooved portion and along the axis of the arcuate movement of the first cam member. Therefore, the number of components necessary for movement of the holding member can be reduced in comparison with the configuration disclosed in Patent Document mentioned hereinabove. Accordingly, the disk apparatus can be configured in a simplified configuration.

In this instance, preferably the holding member has a base portion extending along the direction of the arcuate movement of the first cam member, and a pair of extensions extending from the opposite ends of the base portion to sandwich the holding member. In the disk apparatus, at least one of the extensions extends in a direction substantially perpendicular to the extending direction from the base portion of the extension and the axis of the arcuate movement and has a shaft portion supported for rotation on the housing; the first cam member arcuately moves along the housing; and the base portion has one of the grooved portion and the first engaging portion.

With the disk apparatus, since the holding member is supported for pivotal motion around the shaft portion on the housing, the pivotal motion of the holding member around the axis of the arcuate movement of the first cam member is restricted. The base portion of the holding member has the grooved portion or the first engaging portion described hereinabove, and when the first cam member is arcuately moved along the housing, the holding member is pivoted around the shaft portion and the end portion thereof on the base portion side moves along the axis of the arcuate movement of the first cam member. By the configuration just described, the end portion can be moved without forming the first cam member in a shape which surrounds the entire holding member. Accordingly, reduction in size of the first cam member can be achieved, and consequently, miniaturization of the disk apparatus can be anticipated.

In this instance, preferably the housing has an insertion opening for placing the disk into and out of the housing therethrough; the holding member at least holds the rotation section; and the first cam member is disposed between the insertion opening and the rotation section.

Since the rotation section rotates the disk accommodated in the housing through the insertion opening, it is disposed at a position spaced at least by a distance corresponding to the radius of the disk from the insertion opening, and the information reading/recording section is disposed in the proximity of the rotation section. On the other hand, in the case where a loading section for loading the disk inserted in the insertion opening into the housing is provided, it is disposed between the insertion opening and the rotation section. Therefore, the information reading/recording section which moves along a radial direction of the disk is disposed on the opposite side to the insertion opening with respect to the rotation section. Therefore, if the first cam member is disposed on the opposite side to the insertion opening with respect to the rotation section, then the dimension of the housing in a direction from the insertion opening to the rotation section, which is the loading direction of the disk, becomes great, resulting in increase in size of the disk apparatus.

In contrast, with the disk apparatus, since the first cam member is disposed between the insertion opening and the rotation section, the space in the housing can be utilized effectively without disturbing the disposition of the information reading/recording section or a loading section which is provided as occasion demands. Accordingly, reduction in size of the disk apparatus can be anticipated.

In this instance, preferably the disk apparatus further includes a closing member disposed between the insertion opening and the first cam member and adapted to close up the insertion opening in response to the arcuate movement of the first cam member.

With the disk apparatus, since the insertion opening is closed up by the closing member in response to the arcuate movement of the first cam member, a different disk can be prevented from being inserted into the insertion opening. Accordingly, otherwise possible engagement between the rotation section moved by the arcuate movement of the first cam member and the different disk can be prevented.

In this instance, preferably the housing has formed therein an insertion opening for placing the disk into and out of the housing therethrough; the disk apparatus further including a loading section adapted to load the disk inserted in the insertion opening into the housing along a diametrical direction of the disk; the first cam member being arcuately moved around the axis of the arcuate movement when the disk is loaded to a predetermined loaded position by the loading section.

It is to be noted that the loaded position may be a position at which the rotation section can be engaged with the disk, and, for example, in the case where the rotation section is a turntable, may be a position at which the spindle of the turntable is engaged with the hole formed at the center of the disk.

Here, since rotation and reading/recording operation of the disk are carried out after the disk is loaded, in a state in which the disk is not loaded, there is no necessity to carry out movement of the holding member. On the other hand, the rotation and the reading/recording operation are preferably carried out rapidly after the disk is loaded. In this regard, with the disk apparatus, if a disk is loaded to the loaded position by the loading section, then arcuate movement of the first cam member is started. Therefore, the holding member can be moved rapidly. Accordingly, rotation and reading/recording operation of a disk can be carried out rapidly.

In this instance, preferably the disk apparatus further includes a driving section adapted to generate driving force, and a transmission section adapted to transmit the driving force, the transmission section including a first gear wheel which is rotated by the driving force, the moving section including a second cam member which is smaller than the first cam member and slidably moves along the first cam member, the loading section having a pressing portion which presses, when the disk is loaded to the loaded position, the second cam member to slidably move. In the disk apparatus, preferably the second cam member includes a meshing portion which is brought into meshing engagement with the first gear wheel when the meshing portion is pressed by the pressing portion, and an abutting portion which is brought into abutment, when the meshing portion is brought into meshing engagement with the first gear wheel to rotate the first gear wheel and the second cam member is slidably moved by the rotation of the first gear wheel, with the first cam member to arcuately move the first cam member.

With the disk apparatus, when a disk is loaded to the loaded position, the second cam member is pressed to slidably move by the pressing portion until the meshing portion is brought into meshing engagement with the first gear wheel. Then, by rotation of the first gear wheel, the second cam member is slidably moved further until the abutting portion arcuately moves the first cam member. Consequently, since the first cam member can be arcuately moved by rotating force of the first gear wheel, that is, by driving force generated by the driving section, the force required for the arcuate movement of the first cam member and the movement of the holding member can be assured.

Further, when the loading section slidably moves the second cam member which is smaller than the first cam member, the meshing portion of the second cam member and the first gear wheel are brought into meshing engagement with each other so that the first cam member is arcuately moved by the second cam member. By the configuration just described, the force to act upon the moving section from the loading section, that is, the force to be applied upon starting of the movement of the holding member, can be reduced by providing the first cam member with meshing portion such that the loading section slidably moves the first cam member.

Accordingly, the arcuate movement of the first cam member and the movement of the holding member can be carried out with certainty.

In this instance, preferably the loading section includes a first lever which is abutted to pivot by an end edge of the disk loaded to the proximity of the loaded position, the first lever having the pressing portion.

With the disk apparatus, the first lever is pivoted by abutment thereof by an end edge of a disk loaded to the proximity of the loaded position and arcuately moves the second cam member. By the configuration just described, the second cam member and hence the first cam member can be arcuately moved with certainty in response to loading of a disk to the loaded position. Accordingly, loading of a disk and movement of the rotation section can be synchronized with each other with certainty.

In this instance, preferably the loading section includes a pair of first arms disposed substantially symmetrically with respect to a virtual straight line which extends along the loading direction of the disk and passes a substantially central position of the insertion opening and mounted for pivotal motion at one end thereof disposed in the proximity of the opposite ends of the insertion opening such that the other ends thereof approach or are spaced away from each other. In the disk apparatus, preferably each of the first arms having a grasping member for grasping an end edge of the disk, at least one of the grasping members being a roller which is rotated by the driving force transmitted through the transmission section.

In the disk apparatus, a disk inserted in the insertion opening is grasped by the grasping members of the first arms, and the first arms are pivoted together with rotation of the roller which is at least one of the grasping members to load the disk. By the configuration, since the disk is loaded in the state in which it is held by the first arms in pair, the disk can be loaded into the housing while it is centered.

Further, the roller is rotated by driving force generated by the driving section and transmitted by the transmission section. By the configuration, the arcuate movement of the first cam member and the loading of a disk by the loading section can be carried out by the driving force generated by the single driving section. Accordingly, the configuration of the disk apparatus can be simplified in comparison with an alternative case wherein a driving section for generating driving force to arcuately move the first cam member and another driving section for generating driving force required for loading of a disk are provided separately from each other.

In this instance, preferably the transmission section includes a second gear wheel adapted to mesh with the first gear wheel to transmit the rotation of the first gear wheel to the roller, and a second arm which supports the second gear wheel for rotation thereon and is engaged with and pivoted by the first cam member. In the disk apparatus, preferably the second arm moves the second gear wheel away from the first gear wheel in response to the arcuate movement of the first cam member.

In the disk apparatus, by the second arm which is engaged with the first cam member upon arcuate movement of the first cam member, the second gear wheel which transmits driving force to the roller is spaced away from the first gear wheel. By the configuration, since the rotation of the roller which has loaded the disk to the loaded position is stopped in response to the arcuate movement of the first cam member which is started when the disk is loaded to the loaded position, driving force necessary for the arcuate movement of the first cam member can be assured. Accordingly, the first cam member can be arcuately moved with certainty, and hence the holding member can be moved with certainty.

In this instance, preferably the first cam member has a second engaging portion adapted to be engaged, upon the arcuate movement of the first cam member, with the first arms to pivot the first arms in a direction in which the grasping members are spaced away from the end edge of the disk.

In the disk apparatus, the first arms are spaced away from the disk loaded to the loaded position upon the arcuate movement of the first cam member. By the configuration, when the disk is rotated by the rotation section, the first arms can be prevented from obstructing the rotation of the disk. Accordingly, the disk can be rotated appropriately and with certainty.

In this instance, preferably the disk apparatus further includes a sandwiching member adapted to cooperate with the rotation section to sandwich the disk therebetween, and a third arm adapted to support the sandwiching member. In the disk apparatus, preferably the first cam member has a third engaging portion which is engaged, upon the arcuate movement of the first cam member, with the third arm to pivot the third arm in a direction in which the third arm is spaced away from the sandwiching member so that the sandwiching member is engageable with the disk.

It is to be noted that, in the case where the rotation section is configured from a turntable, a member which attracts the turntable by magnetic force to cooperate with the turntable to sandwich a disk therebetween is available as the sandwiching member.

In the disk apparatus, in a state in which the first cam member is not arcuately moved, since the sandwiching member is supported by the third arm, loading of a disk can be prevented from being disturbed by the sandwiching member. On the other hand, when the first cam member is arcuately moved, since the third arm is spaced away from the sandwiching member, the disk can be sandwiched with certainty by the sandwiching member and the rotation section. Accordingly, when the first cam member is arcuately moved, for example, when a disk is loaded to the loaded position described above, sandwiching of the disk by the rotation section and the sandwiching member can be carried out.

In the disk apparatus, movement of a disk loaded to the loaded position toward the leading end side in the loading direction can be restricted by the restricting portion of each link arm provided at a position on the leading end side in the loading direction using a simple configuration. Further, since the number of parts necessary for movement of the holding member which holds at least one of the rotation section and the information reading/recording section can be reduced, the disk apparatus can be configured in a simplified configuration.

BRIEF DESCRIPTION OF THE DRAWINGS

FIG. 1 is a perspective view showing an appearance of a disk apparatus according to a first embodiment of the disclosed technology;

FIG. 3 is a view showing a lower case of the embodiment of FIG. 1;

FIG. 19 is a schematic view illustrating movement of the embodiment of FIG. 1 upon loading of the first disk;

FIG. 28 is a schematic view illustrating movement of the embodiment of FIG. 1 upon loading of the second disk;

FIG. 29 is a schematic view illustrating movement of the embodiment of FIG. 1 upon loading of the second disk;

DESCRIPTION OF THE PREFERRED EMBODIMENTS

1. First Embodiment

Figure 2:
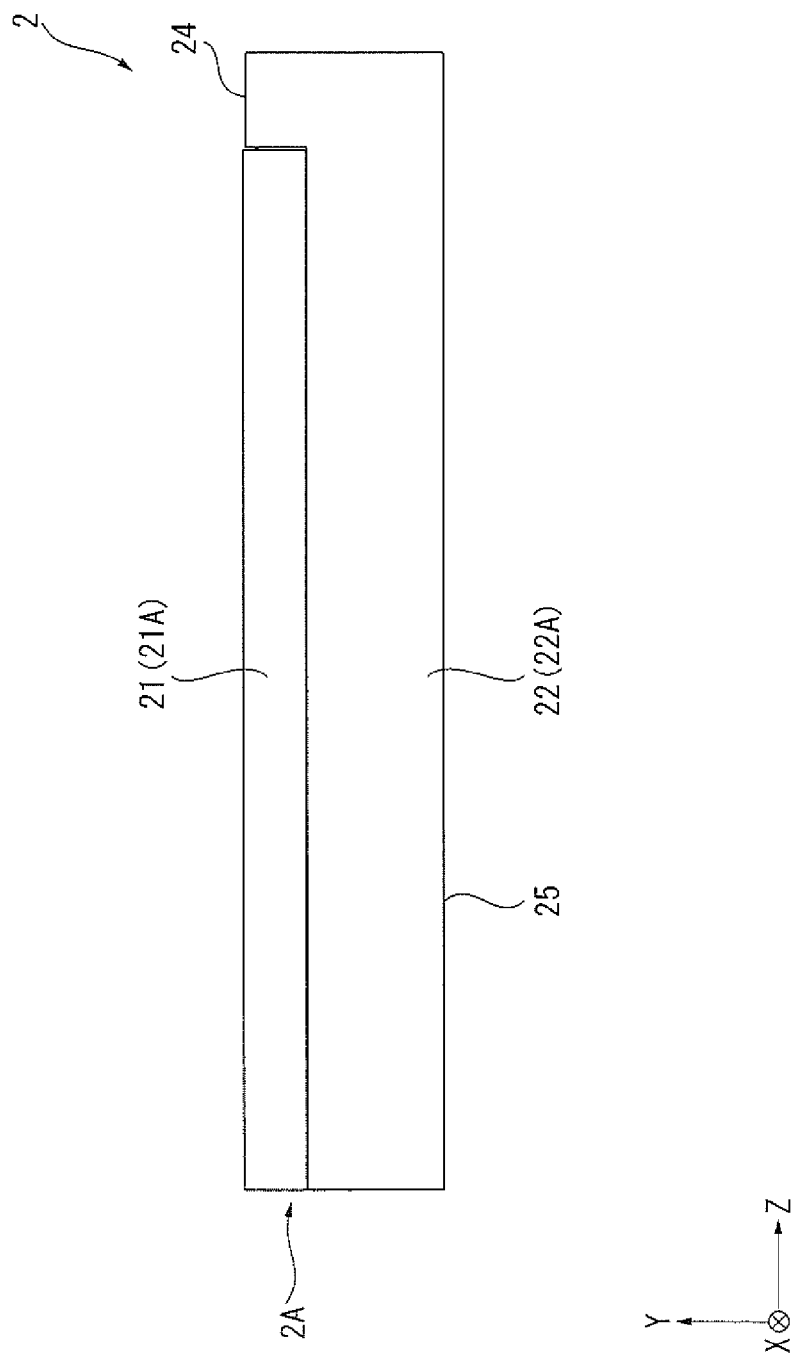
FIG. 2 is a right side elevational view showing an apparatus main body of the embodiment of FIG. 1.

In the following, a first embodiment of the technology disclosed herein is described based on the drawings. FIG. 1 shows an appearance of a disk apparatus 1 according to the present embodiment. It is to be noted that, in the accompanying drawings and the following descriptions, an X direction is defined as a leftward direction when, in a state in which the disk apparatus 1 is placed on a horizontal plane, a user faces to an insertion opening 2A through which the disk is inserted and removed. Meanwhile, a Y direction is defined as an upward direction in the condition described above, and a Z direction is defined as a direction which is perpendicular to both of the X and Y directions and in which a disk is loaded into the disk apparatus 1.

The disk apparatus 1 of the present embodiment is configured as a slot-in type disk apparatus, and carries out reading and recording of information from and on a disk loaded therein. Referring to FIG. 1, such a disk apparatus 1 (disk loading apparatus) as just mentioned includes an apparatus main body 2, and shield members 11 and 12 which cover the apparatus main body 2.

Configuration of the Shield Members

The shield member 11 covers an upper face, the opposite right and left side faces and a rear face of the apparatus main body 2. The shield member 12 covers a front face side of the apparatus main body 2, that is, the side in which the insertion opening 2A is formed. The shield members 11 and 12 are formed by bending a metal plate.

Figure 16:
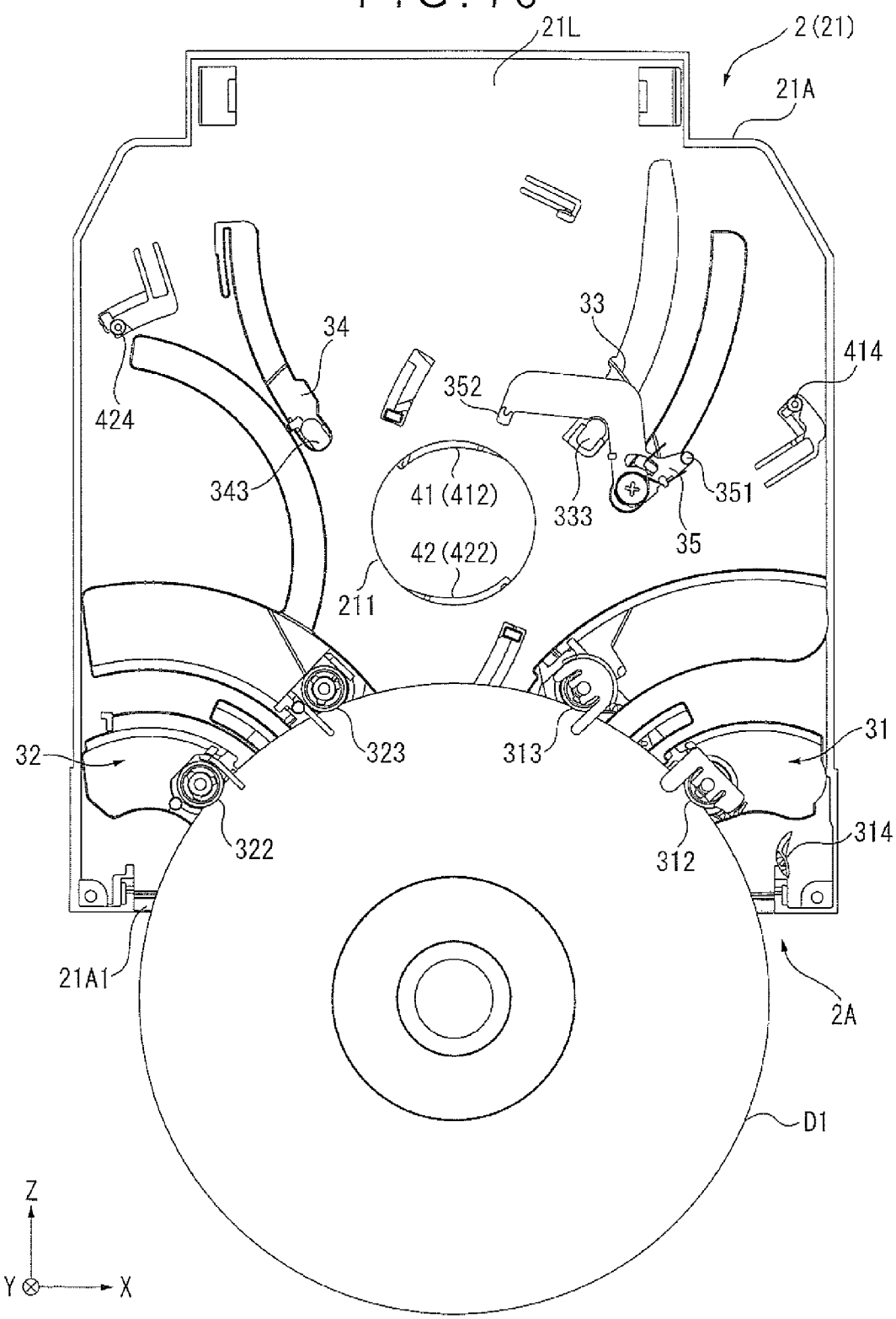
FIG. 16 is a schematic view illustrating movement of the embodiment of FIG. 1 upon loading of a first disk.
Figure 17:
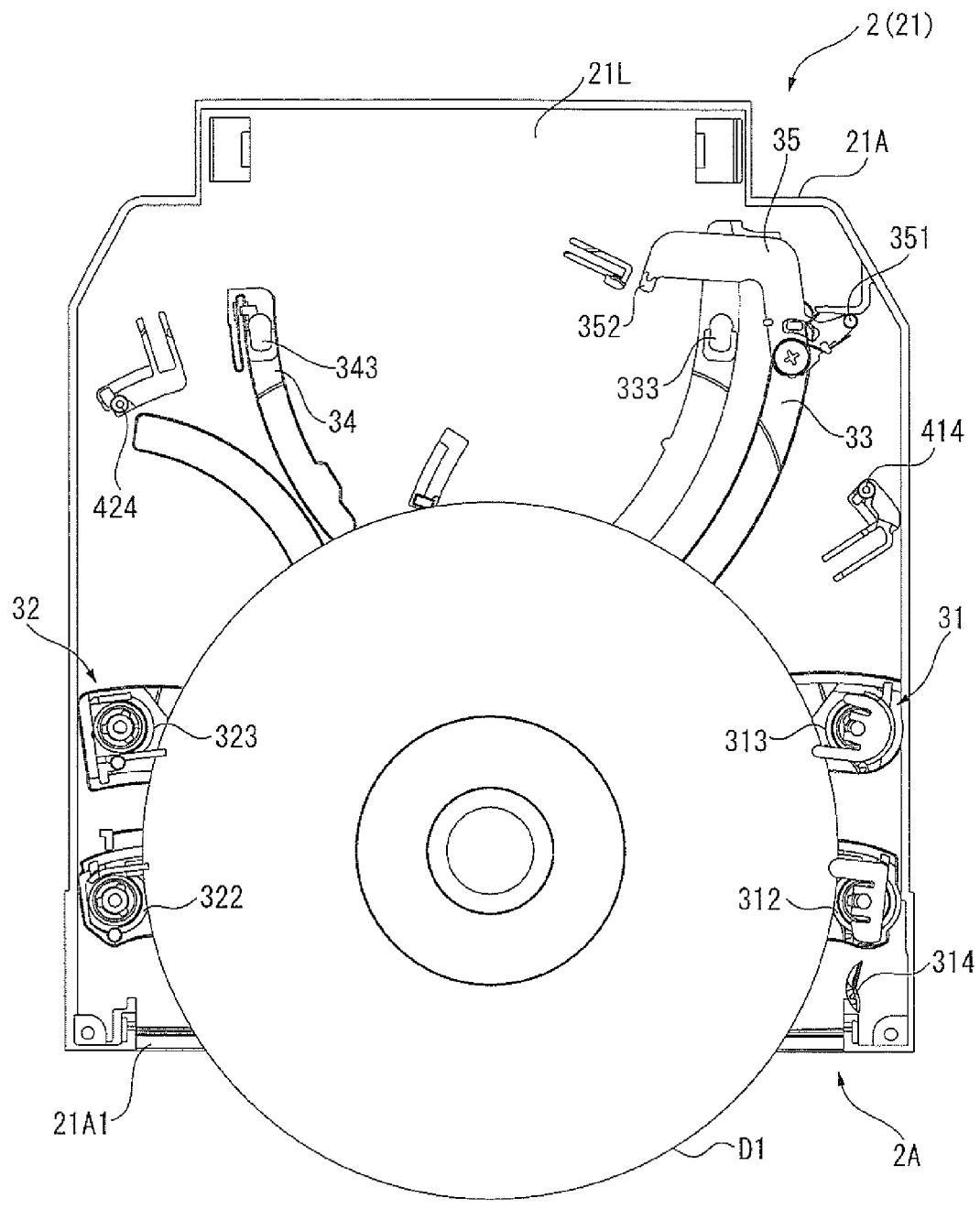
FIG. 17 is a schematic view illustrating movement of the embodiment of FIG. 1 upon loading of the first disk.

Of the shield members 11 and 12, the shield member 12 has an opening (not shown) formed therein in accordance with a dimension of a disk (first disk) D1 of which the diameter is 12 cm shown in FIG. 16, among disks to be inserted to and removed from the insertion opening 2A of the apparatus main body 2. At a position corresponding to the opening, a cloth curtain 121 having a cut for inserting and removing a disk therethrough is applied. The cloth curtain 121 can be formed from felt or the like.

Configuration of the Apparatus Main Body

FIG. 2 shows the right side elevation of the apparatus main body 2. Referring to FIG. 2, the apparatus main body 2 includes an upper unit 21 and a lower unit 22 which configure an upper part and a lower part of the apparatus main body 2, respectively. The units 21 and 22 respectively include an upper frame 21A and a lower frame 22A made of a synthetic resin and having a substantially rectangular shape in plan elongated in the Z direction. The upper frame 21A and the lower frame 22A cooperate with a lower case 25 attached to the bottom face of the lower frame 22A to configure a housing 24 which forms an outer profile of the apparatus main body 2.

The upper frame 21A is secured to the lower frame 22A by screws. The upper frame 21A and the lower frame 22A respectively have recessed portions 21A1 (shown in FIG. 5) and 22A1 (shown in FIG. 7) at base end sides in the Z direction. When the frames 21A and 22A are assembled, the insertion opening 2A (insertion slot) for inserting and removing a disk into and from the apparatus main body 2 is formed by using the recessed portions 21A1 and 22A1.

FIG. 3 shows the lower case 25 which configures the disk apparatus 1 as viewed from below.

The lower case 25 in FIG. 3 is a metal member of a substantially rectangular shape elongated in the Z direction and is secured to the bottom face of the lower frame 22A by screws. The lower case 25 has an insertion hole 251 of a substantially circular shape in the proximity of an end portion on the base end side in the Z direction, that is, in the proximity of an end portion near to the insertion opening 2A. This insertion hole 251 is a hole for emergency ejection formed at a position corresponding to a cross groove 733 (shown in FIG. 8) of a worm wheel 73 hereinafter described. By fitting a jig (not shown) such as a driver into the insertion hole 251 until it is engaged with the cross groove 733 and then rotating the worm wheel 73, a transport apparatus 3 hereinafter described is driven to discharge a disk.

Configuration of the Upper Unit

Figure 4:
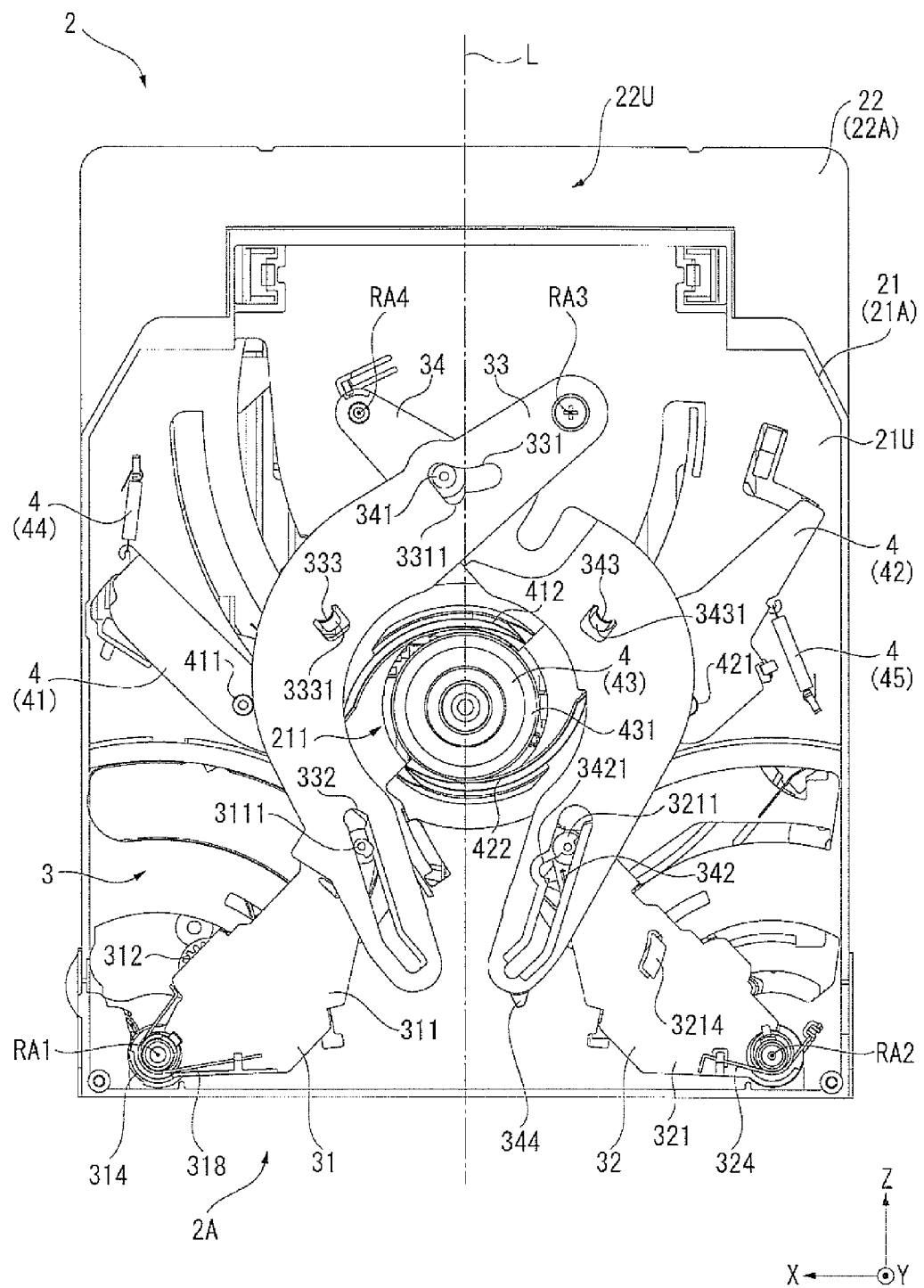
FIG. 4 is a top plan view showing the apparatus main body of the embodiment of FIG. 1.

FIG. 4 shows a top plan of the apparatus main body 2. Referring to FIG. 4, the upper unit 21 includes, in addition to the upper frame 21A described hereinabove, a transport apparatus 3 for transporting a disk, and a chuck apparatus 4 for chucking a loaded disk to a chucking position. The transport apparatus 3 and the chuck apparatus 4 are attached to the upper frame 21A. A plurality of grooved portions are formed on the upper frame 21A in such a manner as to guide arms, which configure the transport apparatus 3 and the chuck apparatus 4, for pivotal motion and to define the range of pivotal motion of the arms. Further, an opening 211 of a substantially circular shape in plan is formed at a substantially central portion of the upper frame 21A, and a chuck pulley 43 which configures the chuck apparatus 4 is disposed corresponding to the formation position of the opening 211.

Configuration of the Transport Apparatus

Figure 5:
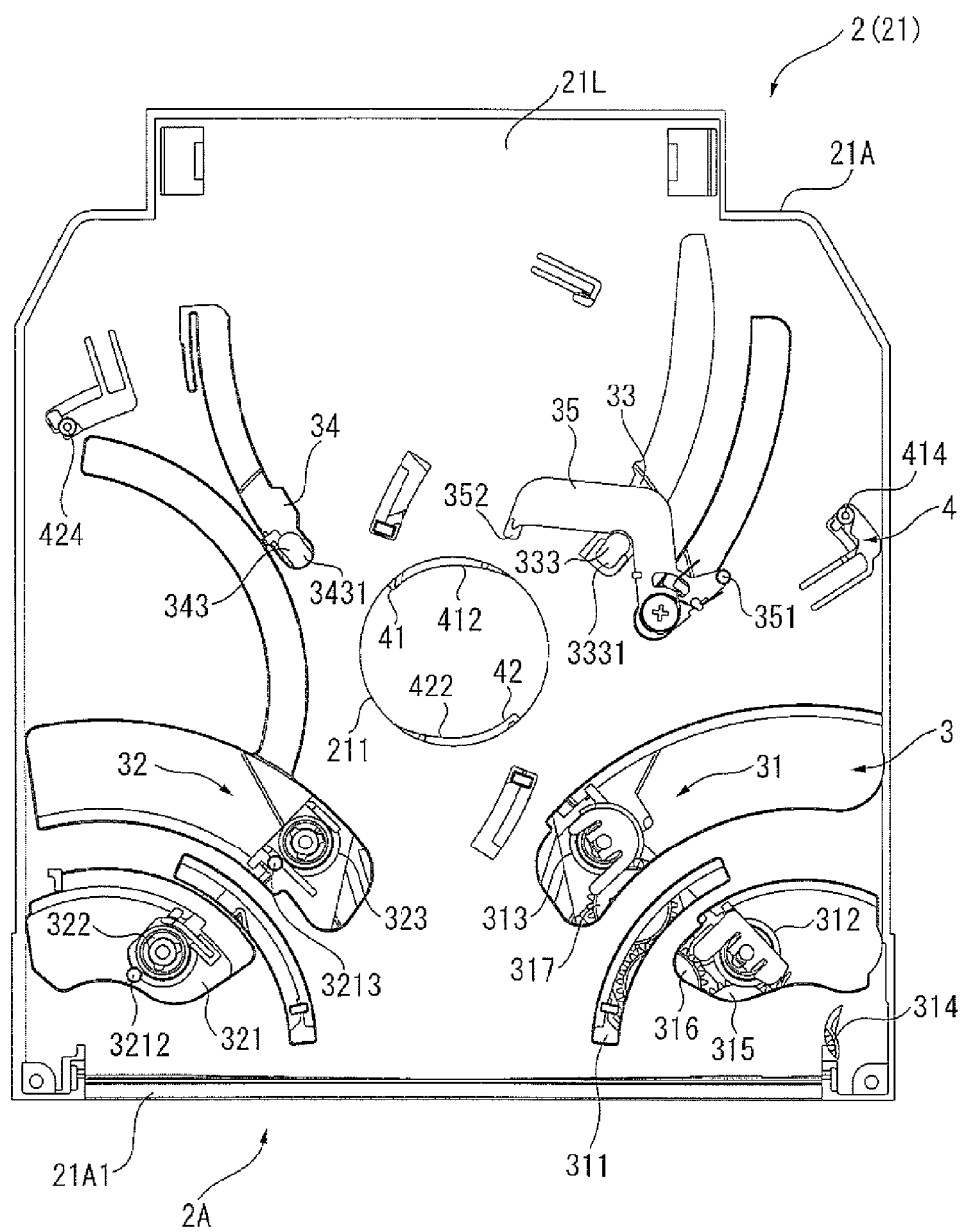
FIG. 5 is a bottom plan view showing an upper unit of the embodiment of FIG. 1.
Figure 6:
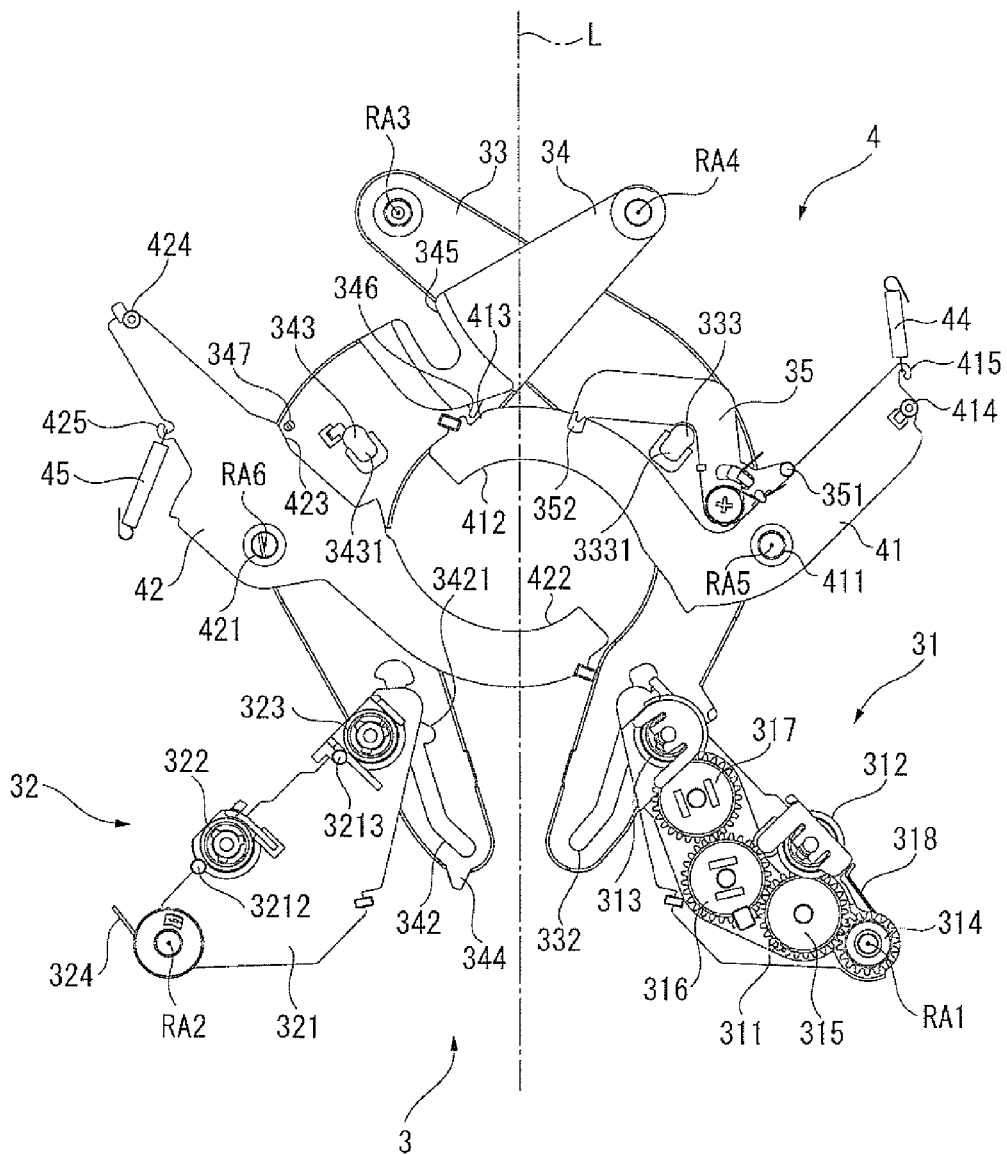
FIG. 6 is a bottom plan view showing the upper unit of the embodiment of FIG. 1.

FIGS. 5 and 6 show the upper unit 21 as viewed from below. It is to be noted that, in FIG. 6, the upper frame 21A is not shown.

Figure 8:
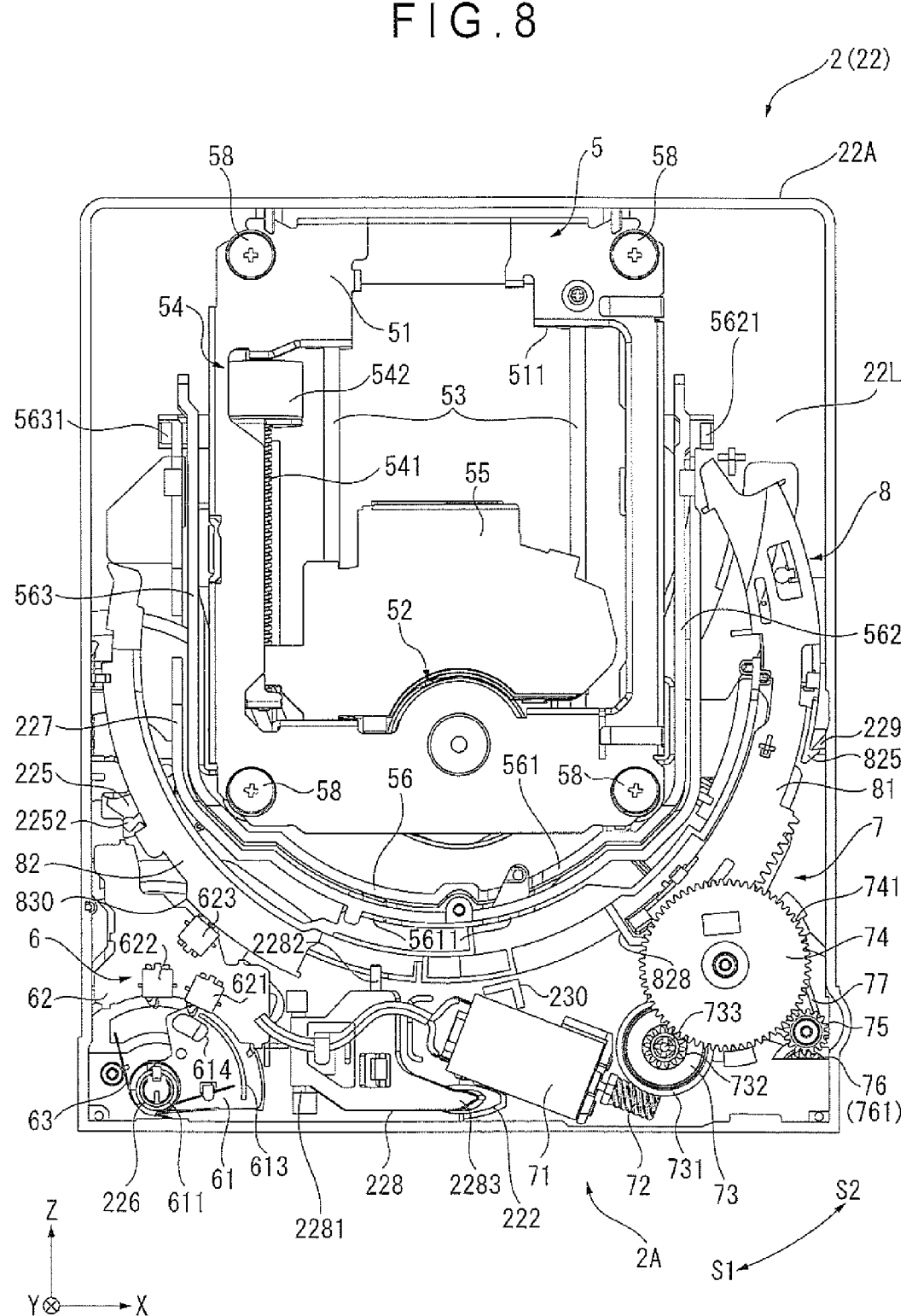
FIG. 8 is a bottom plan view showing the lower unit of the embodiment of FIG. 1.

The transport apparatus 3 corresponds to a loading section of the disclosed technology, and loads a disk inserted through the insertion opening 2A to the chucking position (loading position) and unloads the disk accommodated in the inside of the apparatus main body 2 by using the driving force generated by a driving apparatus 7 shown in FIG. 8 which configures the lower unit 22. Referring to FIGS. 4 to 6, the transport apparatus 3 includes a pair of front arms 31 and 32 supported for pivotal motion in the proximity of the opposite ends of the insertion opening 2A, a pair of link arms 33 and 34 for synchronizing the pivotal motions of the front arms 31 and 32, and a detection lever 35.

Configuration of the Front Arms

The front arms 31 and 32 (first arms), are individually supported for pivotal motion on an upper face 21U of the upper frame 21A and respectively disposed on the right and left of the insertion opening 2A, that is, on the leading end side and the base end side in the X direction. In particular, the front arms 31 and 32 are disposed symmetrically with respect to a virtual straight line L which passes the center of the insertion opening 2A and extends along the disk loading direction in the Z direction. Further, the front arms 31 and 32 are supported for pivotal motion at end portions thereof on the side near the insertion opening 2A in the proximity of the opposite ends of the insertion opening 2A.

Of the front arms 31 and 32, the front arm 31 includes an arm main body 311 in the form of a flat plate, grasping members 312 and 313, an idler 314, three gear wheels 315 to 317, and a torsion coil spring 318 as a biasing member.

The arm main body 311 has a substantially triangular shape in plan. The arm main body 311 is disposed such that one of two sides between which the greatest angle (obtuse angle), is included extends along the insertion opening 2A. The arm main body 311 is supported for pivotal motion at one of two end portions including the one side therebetween, which is not the greatest angle portion, in the proximity of the left side end edge of the insertion opening 2A. Therefore, the greatest angle portion of the arm main body 311 is disposed at a position rather near to the center of the insertion opening 2A. The arm main body 311 configured in this manner is biased in a direction toward the insertion opening 2A by the torsion coil spring 318 attached to an end portion of the arm main body 311 on the pivot shaft RA1 side.

A projection 3111 is formed on the upper face side of an end portion of the arm body 311 on the leading end side in the Z direction and serves as a second projection which projects in a hooked shape and fits in a grooved portion 332 of the link arm 33.

The grasping members 312 and 313 are formed in a substantially cylindrical shape from rubber and are respectively supported for rotation on a lower face of the arm main body 311 opposing to the lower frame 22A as seen in FIGS. 5 and 6. More particularly, the grasping member 312 is supported for rotation at a substantially central position on the hypotenuse of the arm main body 311, and the grasping member 313 is supported for rotation at a portion in the proximity of an end portion of the arm main body 311 on the leading end side in the Z direction. The grasping members 312 and 313 are rollers which are rotated by transmitted driving force of a motor 71 hereinafter described to grip an end edge of a disk to transport the disk.

The idler 314 and the gear wheels 315 to 317 are individually supported for rotation on the arm main body 311 and transmit driving force (rotating force) transmitted thereto from a gear shaft 76 of the driving apparatus 7 which is hereinafter described with reference to FIG. 7 to the grasping members 312 and 313.

The idler 314 is disposed at a position nearest to the insertion opening 2A and has an axis of rotation coaxial with the pivot shaft RA1 of the front arm 31. The idler 314 meshes with the gear shaft 76 to rotate the gear wheel 315 by the rotation of the gear shaft 76.

The gear wheels 315 to 317 have diameters substantially equal to one another and have numbers of teeth equal to each other.

The gear wheel 315 meshes with the gear wheel 316 and the grasping member 312 to rotate them in response to the rotation of the idler 314.

The gear wheel 316 is held in meshing engagement with the gear wheel 317, and the gear wheel 317 is held in meshing engagement with the grasping member 313. Therefore, the gear wheel 315 and the gear wheel 317 rotate at an equal speed in the same direction, and consequently, the grasping members 312 and 313 rotate at an equal speed in the same direction.

The front arm 32 includes an arm main body 321 in the form of a flat plate, grasping members 322 and 323, and a torsion coil spring 324 serving as a biasing member.

The arm main body 321 has a substantially mirror symmetrical structure to the arm main body 311 and is disposed for pivotal motion on the opposite side to the arm main body 311, that is, on the right side of the insertion opening 2A. More particularly, the arm main body 321 has a substantially triangular shape in plan and is disposed such that one of two sides between which the greatest angle (obtuse angle) is included extends along the insertion opening 2A. The arm main body 321 is supported for pivotal motion at one of two end portions including the one side therebetween, which is not the greatest angle portion, in the proximity of the right side end edge of the insertion opening 2A. The arm main body 321 is biased in a direction in which the greatest angle portion approaches the insertion opening 2A by the torsion coil spring 324 attached to an end portion which provides an axis of pivotal motion. It is to be noted that the biasing force of the torsion coil spring 324 is stronger than that of the torsion coil spring 318 thereby to prevent rattling of the front arms 31 and 32.

A projection 3211 is provided at an end portion of the arm main body 321 on the leading end side in the Z direction and serves as a second projection which projects in a hooked shape and is fitted in a slot 342 of the link arm 34.

Further, the arm main body 321 has, on a hypotenuse portion thereof, a pair of projections 3212 and 3213 of a substantially cylindrical shape projecting downwardly. Of the projections 3212 and 3213, the projection 3212 which is positioned on the pivot shaft RA2 side of the arm main body 321 is fitted in an opening 614 of a detection arm 61 hereinafter described with reference to FIGS. 7 and 8. The projection 3213 is engaged with a guide portion 831 or another guide portion 832 of a second slide cam 82 hereinafter described with reference to FIGS. 11 and 14.

Additionally, a projection 3214 is formed at a substantially central position on the upper face of the arm main body 321 as shown in FIG. 4.

The grasping members 322 and 323 have shapes similar to those of the grasping members 312 and 313 of the front arm 31 described hereinabove, and are secured at a substantially central position of the hypotenuse of the arm main body 321 and in the proximity of an end portion on the leading end side in the Z direction, respectively, similarly to the grasping members 312 and 313. Then, in a state in which the front arms 31 and 32 are not pivoting, the grasping members 312 and 322 are disposed at positions spaced by a substantially equal dimension from the insertion opening 2A, and the grasping members 313 and 323 are disposed at positions spaced by a substantially equal distance from the insertion opening 2A. In other words, the grasping members 322 and 323 are disposed at symmetrical positions with respect to the virtual straight line L when comparing to the grasping members 312 and 313. The grasping members 322 and 323 cooperate with the grasping members 312 and 313 to grasp end edges of a disk.

Configuration of the Link Arms

The link arms 33 and 34 synchronize the pivotal motions of the front arms 31 and 32 and are disposed on the left side and the right side with respect to the insertion opening 2A, respectively. In particular, the link arms 33 and 34 are disposed symmetrically with each other with respect to the virtual straight line L described hereinabove. As shown in FIG. 4, the link arms 33 and 34 have a substantially equal dimension and are formed in L shapes as viewed in plan which are substantially symmetrical with each other. The link arms 33 and 34 are supported for pivotal motion with the upper face 21U at end portions thereof on the leading end side in the Z direction, and are engaged at end portions on the base end side thereof with the front arms 31 and 32, respectively.

In particular, the end portions of the link arms 33 and 34 on the leading end side on the Z direction are each supported for pivotal motion at a position opposite side from the insertion opening 2A with respect to the opening 211, and the link arms 33 and 34 are disposed in such a manner as to cross with each other. The pivotally supported positions of the pivot shafts RA3 and RA4 of the link arms 33 and 34 are disposed symmetrically with each other with respect to the virtual straight line L. It is to be noted that the end portion of the link arm 34 on which the pivot shaft RA4 is provided is positioned lower and nearer to the upper face 31U than another end portion nearer to the insertion opening 2A. By this configuration, the thickness of an overlapping portion of the link arm 34 with the link arm 33 can be absorbed. Further, the position between the end portion of the link arm 34 nearer to the insertion opening 2A and the upper face 21U is substantially same as the position between the end portion of the link arm 33 nearer to the insertion opening 2A and the upper face 21U, and also substantially same as the position between the projection 3211 of the front arm 32 and the upper face 21U.

It is to be noted that, while the pivot shafts RA3 and RA4 in the present embodiment are disposed at symmetrical positions with respect to the virtual straight line L, they may otherwise be positioned at the same position such as, for example, at a position on the straight line L.

In the proximity of the end portion of the link arm 33 on the pivot shaft RA3 side, a substantially arcuate slot 331 extending in the X direction is formed. Meanwhile, a substantially cylindrical projection 341 serving as a first projection is formed on the upper face side of the link arm 34 in the proximity of the end portion on the pivot shaft RA4 side. The link arms 33 and 34 are combined such that the projection 341 is fitted in the slot 331.

The slot 331 corresponds to a first slot portion, and in a state in which the link arms 33 and 34 are closed, that is, in a state in which a disk is not loaded, the projection 341 is positioned at one end portion of the slot 331 on the leading end side in the X direction. On the other hand, in a state in which the link arms 33 and 34 are open, that is, in a state in which a disk is loaded, the projection 341 is positioned at the other end portion of the slot 331 on the base end side in the X direction. Upon transition from the closed state to the open state, the projection 341 moves along an end edge of the slot 331 on the leading end side in the Z direction.

Figure 25:
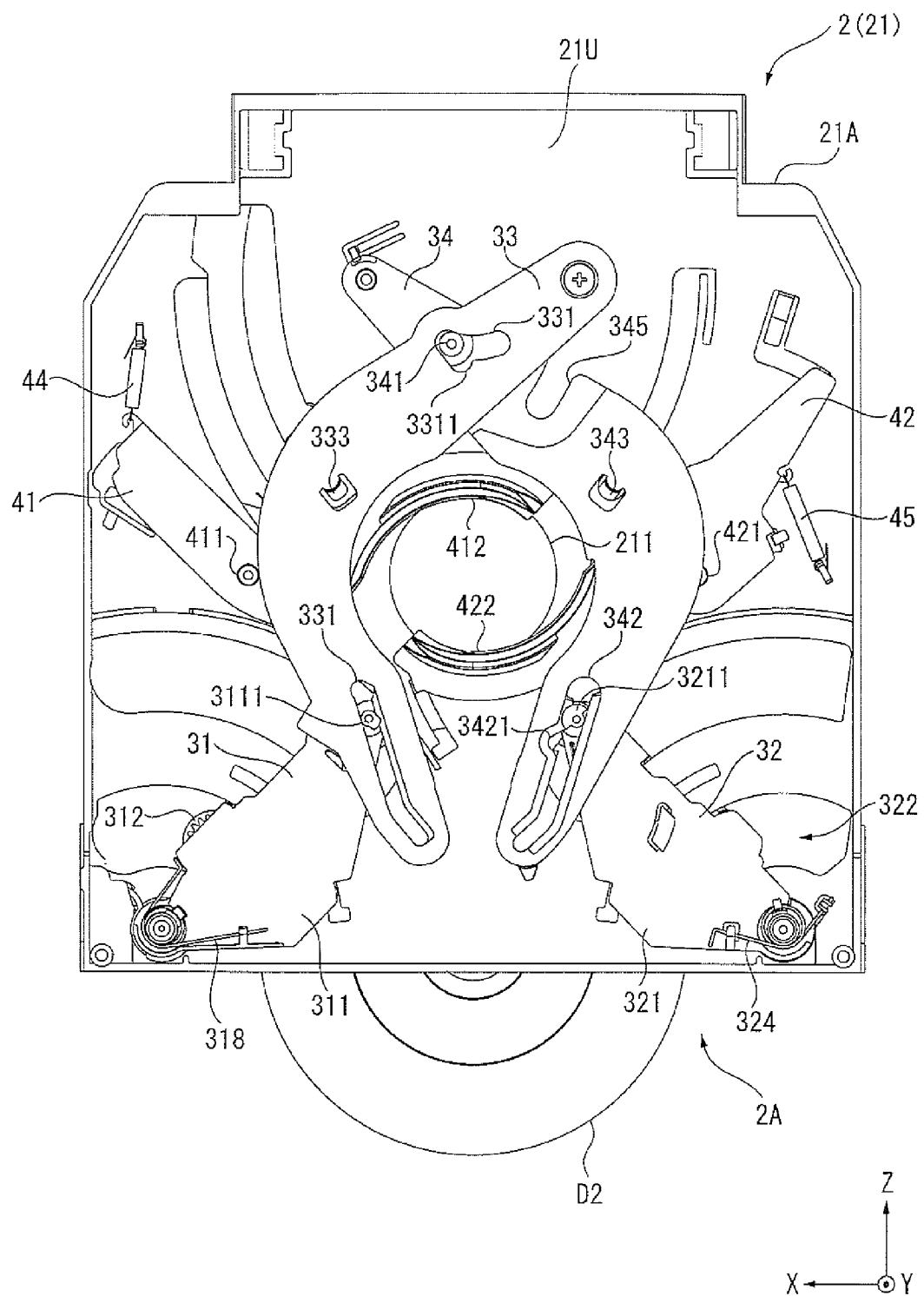
FIG. 25 is a schematic view illustrating movement of the embodiment of FIG. 1 upon loading of a second disk.

The slot 331 has a restricting portion 3311 for restricting transition of the link arms 33 and 34 from the closed state to the open state, that is, for restricting pivotal motion of the link arms 33 and 34, when a disk (second disk) D2 shown in FIG. 25 having a diameter of 8 cm is inserted through the insertion opening 2A in a one-sided state toward the link arm 33 side, that is, toward the leading end side in the X direction. This restricting portion 3311 in the present embodiment is formed as a cutout which extends in a direction different from that of the arc of the slot 331, that is, in a direction opposite to the Z direction, from the place of the projection 341 in the closed state. This restricting portion 3311 corresponds to a first cutout, and while details are hereinafter descried, the projection 341 is fitted in the restricting portion 3311 to restrict further pivotal motion of the link arms 33 and 34 and the front arms 31 and 32, thereby to restrict loading of the disk D2. It is to be noted that alternatively the slot portion may be formed on the link arm 34 while the projection is formed on the link arm 33.

Further, slots 332 and 342 as second slot portions in which the projections 3111 and 3211 are to be fitted are formed at end portions of the link arms 33 and 34 on the opposite side to the end portions on the pivot shafts RA3 and RA4 side, respectively. When the projections 3111 and 3211 serving as the second projections slidably move along the slots 332 and 342, the link arms 33 and 34 are pivoted by pivotal motion of one of the front arms 31 and 32, resulting in pivoting the other one of the front arms 31 and 32. Consequently, pivotal motions of the front arms 31 and 32 are synchronized with each other.

It is to be noted that the slot 342 has a restricting portion 3421 which restricts transition of the link arms 33 and 34 from the closed state to the open state when the disk D2 is inserted into the insertion opening 2A in a one-side state toward the front arm 31 side, that is, toward the leading end side in the X direction. The restricting portion 3421 in the present embodiment is formed as a cutout of the slot 342 cut out to the link arm 33 side. The restricting portion 3421 corresponds to a second cutout. Although details are hereinafter described, the projection 3211 is fitted in the restricting portion 3421 to restrict pivotal motion of the link arms 33 and 34 and hence restrict further pivotal motion of the front arms 31 and 32, thereby to restrict loading of the disk D2.

It is to be noted that a protrusion 344 protruding toward the outside is formed at an end portion of the link arm 34 on the opposite side to the end portion on the pivot shaft RA4 side. When the projection 3211 is fitted into the restricting portion 3421, the protrusion 344 is engaged with a projection 3214 to restrict pivotal motion of the front arms 31 and 32 and the link arms 33 and 34 together with the restricting portion 3421.

Further, the link arm 34 has a recessed portion 345 formed at an outer diameter side portion thereof, that is, at an end edge thereof spaced away from the opening 211, between a restricting portion 343 and the pivot shaft RA4. The recessed portion 345 is disposed in such a manner as to surround the pivot shaft RA3 of the link arm 33 when the link arms 33 and 34 are pivoted such that the end portions thereof near to the slots 332 and 342 are spaced away from each other.

Further, the link arm 34 has pivotal motion restricting portions 346 and 347 for restricting pivotal motion of chuck arms 41 and 42 hereinafter described in the closed state of the link arms 33 and 34. The pivotal motion restricting portions 346 and 347 correspond to second pivotal motion restricting portions.

In particular, in the present embodiment, the pivotal motion restricting portion 346 is formed as a protrusion, which protrudes in a direction toward the chuck arm 41 hereinafter described, at a portion of the bottom face side of the link arm 34 at which the heightwise position from the upper face 21U varies. Further, the pivotal motion restricting portion 347 is formed as a boss which projects toward the upper face 22U side in the proximity of an end edge of a substantially central portion of the link arm 34 on the outer diameter side, that is, on the side spaced from the opening 211. The pivotal motion restricting portion 346 is fitted into a restricting portion 413 hereinafter described of the chuck arm 41, and a restricting portion 423 hereinafter described of the chuck arm 42 is brought into abutment with the pivotal motion restricting portion 347, which restricts pivotal motion of the chuck arms 41 and 42 in a state in which the link arm 34 is not pivoted, that is, in a state in which no disk is loaded. It is to be noted that the shape and position of the pivotal motion restricting portions 346 and 347 may be appropriately determined. The pivotal motion restricting portions 346 and 347 may be provided otherwise on the link arm 33 or else may be individually provided on each of the link arms 33 and 34.

Further, on the bottom face side of the link arms 33 and 34 as shown in FIGS. 5 and 6, restricting portions 333 and 343 of a substantially cylindrical shape are formed, respectively. The restricting portions 333 and 343 support an end edge of a disk loaded by the front arms 31 and 32 from the bottom face side to position the end edge of the disk at the chucking position and restrict the disk from moving toward the leading end side in the Z direction from the chucking position. Such restricting portions 333 and 343 are positioned at symmetrical positions with respect to the virtual straight line L described hereinabove even when the link arms 33 and 34 are pivoted. More particularly, the restricting portions 333 and 343 are provided at positions at which, when the front arms 31 and 32 and the link arms 33 and 34 are pivoted until the loaded disk D1 or D2 is positioned at the chucking position, they are brought into abutment with the disk D1 or D2.

At ends of the restricting portions 333 and 343 in directions in which they project from the link arms 33 and 34, extensions 3331 and 3431 are formed such that they extend in a direction perpendicular to the projection direction. The extension directions of the extensions 3331 and 3431 are set to directions toward the opening 211 shown in FIG. 5 in a state in which the link arms 33 and 34 are not pivoted, that is, in a state in which no disk is loaded. Further, though not shown, the extensions 3331 and 3431 have inclined faces which are inclined from the end portions thereof on the leading end side in the extension direction toward side faces of the restricting portions 333 and 343. The inclined faces of the extensions 3331 and 3431 are brought into abutment with end edges of a disk so that the end edges of the disk are appropriately brought into abutment with the side faces of the restricting portions 333 and 343.

Configuration of Detection Lever

A detection lever 35 corresponds to a first lever and is supported for pivotal motion on the bottom face side of the link arm 33. The detection lever 35 detects that a disk is loaded to the chucking position to move a first slide cam 81 of a lifting apparatus 8 hereinafter describe toward the base end side in the Z direction. The detection lever 35 is formed as a flat plate having a substantially L shape in plan, and a substantially cylindrical pressing portion 351 is formed at an end portion of the detection lever 35 on the pivot shaft side such that the pressing portion 351 projects to the bottom face side. A protrusion 352 is formed at an end portion of the detection lever 35 on the opposite side to the pivot shaft side such that the protrusion 352 projects to the bottom face side similarly.

The protrusion 352 is brought into abutment with an end edge of a disk loaded to the chucking position to pivot the detection lever 35. When the detection lever 35 is pivoted, the pressing portion 351 pushes the first slide cam 81 to move it toward the base end side in the Z direction.

Configuration of the Chuck Apparatus

The chuck apparatus 4 cooperates with a turntable 521 of an optical apparatus 5 hereinafter described to chuck a loaded disk. Referring to FIGS. 4 to 6, the chuck apparatus 4 includes a pair of chuck arms 41 and 42, a chuck pulley 43, and tension coil springs 44 and 45 for biasing the chuck arms 41 and 42, respectively.

Configuration of the Chuck Pulley

The chuck pulley 43 corresponds to an abutting member (sandwiching member) and abuts with a face of a disk opposite to the recording face to sandwich the disk together with the turntable 521. The chuck pulley 43 is disposed at a position corresponding to the opening 211 as seen in FIG. 4. The chuck pulley 43 has a magnet in the inside thereof and has a small diameter portion not shown which is inserted into the opening 211 and a large diameter portion 431 having a diametrical dimension greater than that of the opening 211. The large diameter portion 431 is supported by the chuck arms 41 and 42.

Therefore, in a state in which a disk is not chucked, the chuck pulley 43 is kept floating from the opening 211 by the chuck arms 41 and 42. Then, if the chuck arms 41 and 42 are pivoted away from the chuck pulley 43, then the chuck pulley 43 is moved in a direction in which it approaches the turntable 521 by the magnetic force so that chucking of the disk by the members mentioned is carried out. Thereupon, the large diameter portion 431 does not interfere with the upper frame 21A, and consequently, rotation of the disk is not disturbed.

It is to be noted that, upon unloading of the disk, the chuck arms 41 and 42 move up by the large diameter portion 431 to cancel the chucking by the chuck pulley 43 and the turntable 521.

Configuration of the Chuck Arms

The chuck arms 41 and 42 correspond to arm members (third arms) and are supported for pivotal motion on the left side, that is, on the leading end side in the X direction and on the right side, that is, on the base end side in the X direction on the upper face 21U, respectively. Further, the chuck arms 41 and 42 are disposed between the link arms 33 and 34 and the upper face 21U of the upper frame 21A, respectively, such that the chuck arm 41 crosses with the link arm 33 and the chuck arm 42 crosses with the link arm 34.

Substantially circular openings 411 and 421 are formed at substantially central portions of the chuck arms 41 and 42, respectively, as seen in FIG. 6. Bosses (not shown) formed on the upper face 21U are inserted in the openings 411 and 421 such that the chuck arms 41 and 42 are pivoted around pivot shafts RA5 and RA6 at the center of the openings 411 and 421, respectively.

The chuck arms 41 and 42 have substantially arcuate abutting portions 412 and 422 which are provided at end portions thereof on the opening 211 side and which are extending along the opening 211. In a state in which no disk is loaded, the abutting portions 412 and 422 abut with the chuck pulley 43 to support the chuck pulley 43 in a state in which they push up the chuck pulley 43 in a direction in which the chuck pulley 43 is spaced away from the upper frame 21A.

Further, the chuck arms 41 and 42 have restricting portions 413 and 423, which are abutted with the link arm 34, to restrict pivotal motion of the chuck arms 41 and 42. In particular, the restricting portion 413 is formed as a cutout into which the protrusion of the pivotal motion restricting portion 346 is fitted, and the restricting portion 423 is formed on an end edge of the inner diameter side of a substantially central portion of the chuck arm 42, that is, on the side near to the opening 211. Then, the protrusion of the pivotal motion restricting portion 346 described hereinabove is fitted into the restricting portion 413 and the restricting portion 423 is abutted with the boss of the pivotal motion restricting portion 347 to restrict pivotal motion of the chuck arms 41 and 42 in a state in which the link arm 34 is not pivoted, that is, in a state in which no disk is loaded. It is to be noted that, by the pivotal motion of the link arms 33 and 34 caused by the pivotal motion of the front arms 31 and 32, the link arms 33 and 34 are spaced away from the restricting portions 413 and 423 thereby to cancel the restriction on the pivotal motion of the chuck arms 41 and 42.

The chuck arms 41 and 42 have substantially cylindrical protrusions 414 and 424, respectively, provided at end portions on the side spaced from the opening 211 in such a manner as to project toward the bottom face side of the chuck arms 41 and 42. The protrusions 414 and 424 are respectively inserted into guide portions 821 and 835 of the second slide cam 82 of the lifting apparatus 8 hereinafter described referring to FIGS. 11 and 14, to pivot the chuck arms 41 and 42 by the arcuate movement of the second slide cam 82. By the pivotal motion of the chuck arms 41 and 42, the abutting portions 412 and 422 are spaced away from the chuck pulley 43 thereby to allow the chuck pulley 43 to cooperate with the turntable 521 to chuck a disk loaded to the chucking position therebetween.

It is to be noted that an engaging portion 415 is formed at an end portion of the chuck arm 41 on the protrusion 414 side, and another engaging portion 425 is formed on the chuck arm 42 between the protrusion 424 and the opening 421. The engaging portions 415 and 425 are engaged by one end of the tension coil springs 44 and 45 which are anchored at the other ends thereof to the upper frame 21A. Therefore, the chuck arms 41 and 42 are biased in a direction in which the abutting portions 412 and 422 are abutted with the chuck pulley 43 by the biasing force of the tension coil springs 44 and 45

When no disk is loaded, such chuck arms 41 and 42 as described above are restricted from pivotal motion by the link arms 33 and 34, and if the link arms 33 and 34 are pivoted, then the pivotal motion of the chuck arms 41 and 42 is permitted. Further, if the first slide cam 81 hereinafter described is slidably moved by the pivotal motion of the detection lever 35, then the chuck arms 41 and 42 are pivoted in a direction spaced way from the chuck pulley 43 by the second slide cam 82, thereby to carry out chucking of a disk by the chuck pulley 43.

Configuration of the Lower Unit

Figure 7:
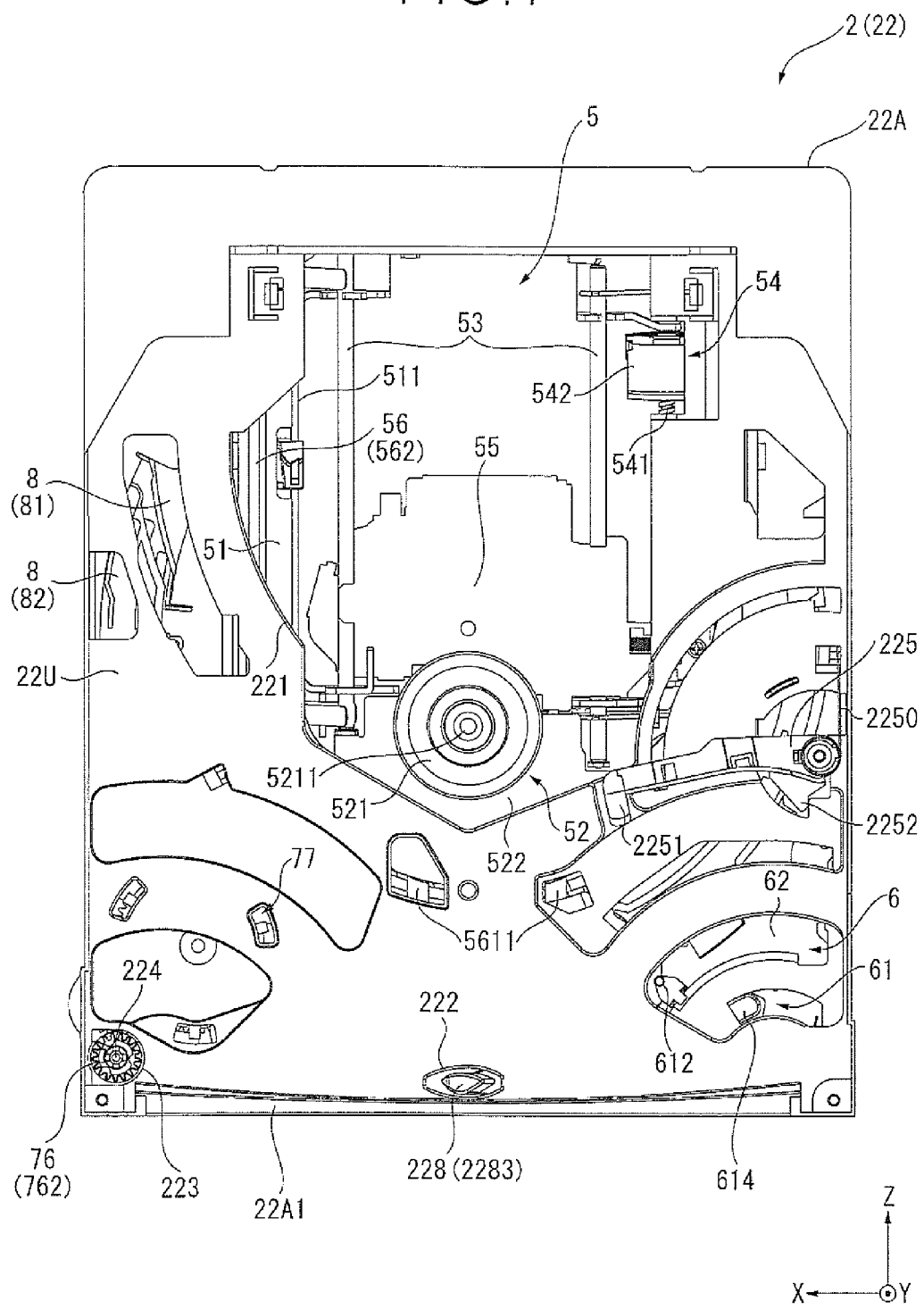
FIG. 7 is a top play view showing a lower unit of the embodiment of FIG. 1.

FIGS. 7 and 8 show a top plan and a bottom plan of the lower unit 22, respectively.

The lower unit 22 configures a lower portion of the apparatus main body 2 as described hereinabove. Referring to FIGS. 7 and 8, the lower unit 22 includes not only the lower frame 22A but also the optical apparatus 5, a detection apparatus 6, the driving apparatus 7 and the lifting apparatus 8. The optical apparatus 5, the detection apparatus 6, the driving apparatus 7 and the lifting apparatus 8 are individually attached to the lower frame 22A.

Referring to FIG. 7, the lower frame 22A has a recessed portion 22A1 described hereinabove which forms the insertion opening 2A, an opening 221 of a substantially rectangular shape formed on the leading end side in the Z direction, an opening 222 having a substantially elliptical shape formed in the proximity of a substantially central portion of the recessed portion 22A1, and an opening 223 and a shaft portion 224 positioned on the left side, that is, on the leading end side in the X direction, of the recessed portion 22A1. The lower frame 22A further has a plurality of slot portions formed thereon. The slot portions define a range of pivotal motion of the associated arms similarly to the slot portions of the upper frame 21A described hereinabove, and expose protrusions provided on the arms or the like to the upper face 22U side or the lower face 22L side. Further, the lower frame 22A includes a support arm 225 supported for pivotal motion on the upper face 22U.

The openings 221 and 222 expose the optical apparatus 5 attached to the lower face 22L and a projection 2283 of a lock lever 228 hereinafter described to the upper face 22U side.

The opening 223 exposes the gear shaft 76, which configures the driving apparatus 7 hereinafter described and is supported for pivotal motion on the shaft portion 224 formed in the opening 223, to the upper face 22U side. The gear shaft 76 meshes with the idler 314 described hereinabove.

Configuration of the Support Arm

The support arm 225 is formed in a substantially arcuate shape in plan in accordance with a locus of the end portion of the front arm 32 on the grasping member 323 side when the front arm 32 is pivoted, and is pivotally supported in the proximity of an end edge of the upper face 22U on the right side, that is, on the trailing end side in the X direction. In other words, the support arm 225 is supported for pivotal motion within a range from the insertion opening 2A to the turntable 521 hereinafter described. The support arm 225 is kept, in a state in which no disk is loaded, in a state in which it extends substantially perpendicularly to the Z direction under biasing force of a torsion coil spring 2250 provided at the pivotally supported position thereof.

Such a support arm 225 as described above has, at an end portion thereof on the opposite side to the pivotally supported position thereof, an abutting portion 2251 for abutting with an end edge of a disk to be loaded. Then, the support arm 225 is pivoted by transporting force of a disk abutting with the abutting portion 2251 to center the disk. Particularly when a disk D2 of a smaller diameter is loaded in a one-sided state to the front arm 31 side into the insertion opening 2A, the abutting portion 2251 is abutted with an end face of the disk D2 to center the disk D2.

Further, referring to FIG. 8, the support arm 225 has a projection 2252 provided in the proximity of the pivotally supported position and projecting downwardly. This projection 2252 engages with the second slide cam 82 hereinafter described to restrict arcuate movement of the second slide cam 82 in a state in which no disk is loaded. Then, when the support arm 225 is pivoted by loading of a disk, the restriction of arcuate movement of the second slide cam 82 by the projection 2252 is canceled. Further, by arcuate movement of the second slide cam 82, the support arm 225 is spaced away from the end face of the disk.

On the lower face 22L of the lower frame 22A, a substantially cylindrical projection 226 is formed such that it projects to a direction outside the plane in the proximity of an end portion on the right side of the insertion opening 2A, that is, on the trailing end side in the X direction and on the left side in FIG. 8, and a guide portion 227 of a substantially U shape in plan is formed at a substantially central portion.

The projection 226 supports the detection arm 61 of the detection apparatus 6 hereinafter described for pivotal motion.

The guide portion 227 guides the second slide cam 82 hereinafter described for arcuate movement. The optical apparatus 5 and the second slide cam 82 hereinafter described are positioned on the inner side and the outer side of the guide portion 227. A pair of openings not shown into which a pair of projections 5611 provided on a holder 56 of the optical apparatus 5 are fitted are formed on the guide portion 227 such that the projections 5611 are engaged with the second slide cam 82 through the openings.

Configuration of the Lock Lever

The lock lever 228 serving as a closing member is pivotally supported on the trailing end side in the Z direction of the lower face 22L between the insertion opening 2A and the second slide cam 82. The lock lever 228 is erected uprightly in such a manner as to close up the insertion opening 2A after loading of a disk thereby to prevent insertion of another disk.

Figure 9:
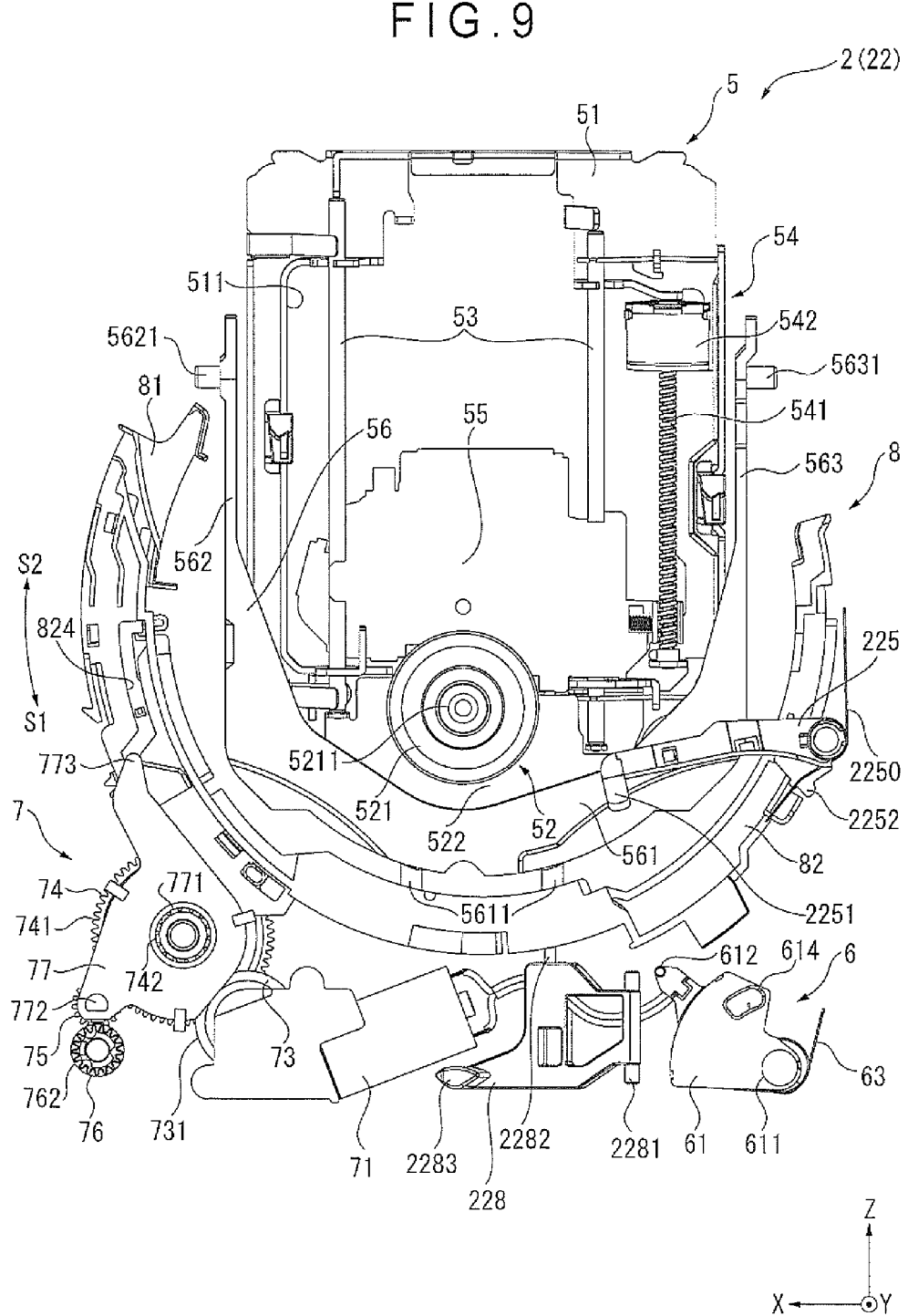
FIG. 9 is a view showing the lower unit of the embodiment of FIG. 1.

Referring to FIGS. 8 and 9, the lock lever 228 has a shaft portion 2281 formed at an end portion thereof on the right side, that is, on the trailing end side in the X direction, and is supported for pivotal tilting motion with respect to the lower face 22L by the shaft portion 2281. Further, the lock lever 228 has a projection 2282 for engaging with the second slide cam 82 and has another projection 2283 formed on the opposite side to the shaft portion 2281 and projecting upwardly.

The lock lever 228 having such a configuration as described above is disposed so as to be inclined with respect to the lower face 22L in a state in which no disk is loaded. Then, when the second slide cam 82 is arcuately moved in response to loading of a disk, the projection 2282 slidably moves along the guide portion 829 of the second slide cam 82 to pivot the lock lever 228 so as to move along the lower face 22L. By the pivotal motion of the lock lever 228, the projection 2283 is exposed to the upper face 22U side through the opening 222. This projection 2283 closes up a substantially central portion of the insertion opening 2A thereby to prevent loading of any other disk.

A locking portion 229 of a substantially right rectangular shape is provided in a projecting manner on a left side one of the opposite side faces erected uprightly from the lower face 22L of the lower frame 22A, that is, on the side face on the leading end side in the X direction and on the right side in FIG. 8. The locking portion 229 is abutted with a restricting portion 825 of the second slide cam 82 to prevent the second slide cam 82 from excessively slidably moving in the direction toward the leading end side in the Z direction by biasing force of a tension coil spring not shown. In other words, the locking portion 229 defines an initial position of the second slide cam 82.

Further, a projection 230 is formed on the lower face 22L in the proximity of the motor 71 of the driving apparatus 7 hereinafter described such that it projects to a direction outside the plane, that is, to a downward direction. When the second slide cam 82 is arcuately moved in response to loading of a disk, the projection 230 is brought into abutment with an abutting portion 828 to restrict the second slide cam 82 from arcuately moving by more than a necessary amount.

Configuration of the Optical Apparatus

FIG. 9 shows the lower unit 22 except the lower frame 22A and a control board 62 as viewed from above. Referring to FIG. 9, the optical apparatus 5 carries out reading and recording of information from and on a loaded disk. The optical apparatus 5 is attached to the lower face 22L of the lower frame 22A and positioned on the leading end side in the Z direction, that is, on the upper side in FIGS. 7 and 8. More particularly, the optical apparatus 5 is attached at an end portion thereof on the insertion opening 2A side for pivotal motion in the upward and downward direction around an end edge on the interior side, that is, on the leading end side in the Z direction, of the optical apparatus 5, or in other words, around an axis along the X axis. In other words, the optical apparatus 5 is attached in a state in which pivotal motion thereof around the Y direction is restricted. Such an optical apparatus 5 as described above includes a support member 51, a rotating apparatus 52, a pair of guide rails 53, a moving apparatus 54 and a pickup 55, and a holder 56 for holding the support member 51 as seen in FIGS. 7 to 9.

The support member 51 is a metal member of a substantially rectangular box shape elongated along the Z direction and is attached at the opposite ends thereof on the leading end side in the Z direction for tilting movement on the lower face 22L by means of screws 58 shown in FIG. 8. Further, the support member 51 is secured at the opposite ends thereof on the trailing end side in the Z direction to the holder 56 by means of the screws 58 shown in FIG. 8. The support member 51 has an opening 511 at a substantially central portion thereof, and the pickup 55 is disposed in the opening 511. In other words, a space in which the pickup 55 moves is formed in the opening 511.

The rotating apparatus 52 corresponds to a rotation section, and is provided at an end portion of the support member 51 on the trailing end side in the Z direction, that is, on the insertion opening 2A side and rotates a loaded disk. The rotating apparatus 52 includes the turntable 521, a motor not shown for rotating the turntable 521, and a control board 522 for controlling driving of the motor.

The turntable 521 is disposed such that the center thereof is positioned on the virtual straight line L shown in FIG. 4. The turntable 521 has a fitting portion 5211 for fitting with a hole formed at the center of a disk, and a magnet not shown for attracting the chuck pulley 43 is provided on the fitting portion 5211. The position corresponding to the center of the upper face of the turntable 521 corresponds to the position of the chucking position, that is, the loaded position.

The guide rails 53 extend substantially in parallel to each other in the Z direction, and the pickup 55 is attached for sliding movement on the guide rails 53.

As shown in FIG. 9, the moving apparatus 54 is provided on the trailing end side in the X direction on the support member 51. The moving apparatus 54 includes a spindle 541 having a helical groove formed in an axial direction on an outer periphery thereof, and a driving section 542 for rotating the spindle 541. The pickup 55 is fitted at an end thereof on the helical groove of the spindle 541. Then, if the driving section 542 rotates the spindle 541, then the pickup 55 moves in a direction in which it moves toward and away from the turntable 521 along the guide rails 53.

The pickup 55 irradiates a laser beam upon a disk rotated by the turntable 521 to record information on the disk and receives reflected light from the disk to read information recorded on the optical disk. In particular, the pickup 55 corresponds to an information reading/recording section which carries out at least one of reading and recording of information from and on the disk.

The holder 56 configures a holding member together with the support member 51 described hereinabove, and is supported at one end thereof for rotation on the lower face 22L and engages with the second slide cam 82 hereinafter described. The holder 56 moves, upon arcuate movement of the second slide cam 82, the end portion of the support member 51 on the trailing end side in the Z direction, that is, on the side on which the turntable 521 is disposed, upwardly or downwardly. This holder 56 includes a base portion 561 extending along the end portion of the support member 51 on the trailing end side in the Z direction and having the end portion secured thereto, and a pair of extensions 562 and 563 extending toward the leading end side in the Z direction from the opposite left and right ends of the base portion 561, respectively. The holder 56 thereby has a substantially U shape as viewed in plan.

The base portion 561 is formed so as to extend along a direction of arcuate movement of the second slide cam 82 hereinafter described and is biased downwardly by a tension coil spring not shown provided on the lower face 22L. The base portion 561 includes a pair of projections 5611 projecting substantially cylindrically towards the trailing end side in the Z direction. The projections 5611 correspond to first engaging portions and are individually inserted into guide grooves 839 shown in FIG. 11 of the second slide cam 82.

The extensions 562 and 563 are disposed so as to cover approximately ¾ of the opposite left and right ends of the support member 51. Substantially cylindrical shaft portions 5621 and 5631 are formed at end portions of the extensions 562 and 563 on the leading end side in the Z direction, and the holder 56 is supported for rotation on the lower face 22L by the shaft portions 5621 and 5631.

Such a holder 56 as just described is pivoted upwardly and downwardly around the shaft portions 5621 and 5631 in response to arcuate movement of the second slide cam 82 with which the projections 5611 engage. Consequently, the turntable 521 moves upwardly and downwardly to carry out chucking of a disk and cancellation of the chucking.

Configuration of the Detection Apparatus

The detection apparatus 6 not only detects a transport state of a disk but also detects an arcuate movement position of the slide cams to detect a chucking state of a disk. Then, the detection apparatus 6 controls driving of the motor 71 hereinafter described based on a result of the detection. Such a detection apparatus 6 as just described includes the detection arm 61 and the control board 62 as shown in FIGS. 7 to 9 although the control board 62 is not shown in FIG. 9.

The detection arm 61 has a substantially cylindrical boss 611 shown in FIG. 8 for fitting with the projection 226 and is supported for pivotal motion in the proximity of an end edge of the insertion opening 2A on the trailing end side in the X direction. A torsion coil spring 63 shown in FIGS. 8 and 9 is attached around the boss 611 such that the detection arm 61 is biased in a direction in which it approaches the insertion opening 2A by the torsion coil spring 63.

The detection arm 61 has an abutting portion 612, a pressing portion 613 and an opening 614.

The abutting portion 612 is formed at an end portion side of the detection arm 61 on the opposite side to the boss 611 in such a manner as to project upwardly. A leading end portion of the abutting portion 612 in the projecting direction is positioned higher than the upper face 22U, and an end edge of a disk loaded in the insertion opening 2A is abutted with the abutting portion 612. Then, when the disk is pushed toward the leading end side in the Z direction, the detection arm 61 is pivoted around the center of the boss 611.

The pressing portion 613 is formed between the boss 611 and the abutting portion 612 such that it projects downwardly substantially in an arc centered at the center of the boss 611, that is, at the pivot shaft of the detection arm 61. The pressing portion 613 presses switches 621 and 622 disposed on the control board 62 upon pivotal motion of the detection arm 61.

The opening 614 is formed in a substantially rectangular shape between the boss 611 and the pressing portion 613 in the proximity of the end portion on the leading end side in the Z direction. The projection 3212 of the front arm 32 described hereinabove is inserted in the opening 614. Therefore, if pivotal motion of the front arm 32 is restricted by the second slide cam 82, then also pivotal motion of the detection arm 61 is restricted.

The control board 62 is disposed in the proximity of the detection arm 61 and has three switches 621 to 623 as seen in FIG. 8. Referring to FIG. 8, the switches 621 and 622 are disposed in parallel on the control board 62 on the detection arm 61 side and are pressed by the pressing portion 613 of the pivoted detection arm 61. In a state in which no disk is loaded, the switches 621 and 622 are not pressed and are in an off state. Then, at an initial stage of pivotal motion of the detection arm 61 upon loading of a disk, the switch 621 is first pressed into an on state, and then at a last stage of the pivotal motion of the detection arm 61, the switch 622 is pressed into an on state together with the switch 621.

The switch 623 is disposed at an end portion of the control board 62 on the leading end side in the Z direction in an opposing relationship to the second slide cam 82 hereinafter described. The switch 623 is pressed by a pressing portion 830 shown in FIGS. 14 and 15 of the second slide cam 82 and exhibits an on state. Then, if the second slide cam 82 is arcuately moved upon loading of a disk, then the pressing by the pressing portion 830 is canceled and the switch 623 transits to an off state.

If the switch 621 transits from an off state to an on state when the switch 623 is in an on state, then the control board 62 having such a configuration as described above outputs a driving signal to the motor 71 which configures the driving apparatus 7 to cause the motor 71 to rotate forwardly. Consequently, loading of a disk by the transport apparatus 3 is carried out, and when the detection arm 61 is pivoted further in response to the loaded position of the disk, the switch 622 is placed into an on state. Then, when the second slide cam 82 is arcuately moved until the switch 623 is placed into an off state, and then the control board 62 outputs a stopping signal to the motor 71 thereby to stop the driving of the transport apparatus 3 and the lifting apparatus 8.

On the other hand, when a disk is to be unloaded such as when an eject button not shown is depressed, for example, by a user, the control board 62 outputs a driving signal to the motor 71 to cause the motor 71 to rotate reversely. Consequently, the second slide cam 82 is arcuately moved and the arms 31 to 34 are pivoted in the opposite directions to those upon loading. Then, by pivotal motion of the front arm 32 in a direction toward the insertion opening 2A, the detection arm 61 is pivoted in a direction toward the insertion opening 2A. Thereafter, when the switch 623 is placed into an on state and the switch 622 is placed into an off state, the control board 62 outputs a stopping signal to the motor 71 thereby to stop the driving of the transport apparatus 3 and the lifting apparatus 8. In this state, since the disk remains in a state in which it is grasped by the grasping members 312 and 322, inadvertent coming off of the disk from the insertion opening 2A is prevented.

Configuration of the Driving Apparatus

The driving apparatus 7 transmits driving force for driving the transport apparatus 3, chuck apparatus 4 and lifting apparatus 8 to these apparatus. The driving apparatus 7 is disposed on the lower face 22L on the opposite side to the detection apparatus 6 as shown in FIG. 8. The driving apparatus 7 includes a motor 71 serving as a driving section, and a worm gear 72, a worm wheel 73, gear wheels 74 and 75, a gear shaft 76 and a swing arm 77 as a transmission section.

The motor 71 is driven under the control of the control board 62 described hereinabove to rotate the worm gear 72 attached to the spindle. The motor 71 is secured to the lower face 22L such that the axis of rotation of the worm gear 72 is inclined with respect to the insertion opening 2A.

The worm wheel 73, gear wheel 74, gear shaft 76 and swing arm 77 are supported for rotation on the lower face 22L.

Of the members, the worm wheel 73 is a speed reducing gear wheel and has two stages of gear portions 731 and 732 having different diametrical dimensions from each other. Of the gear portions 731 and 732, the gear portion 731 positioned on the upper side, that is, on the nearer side to the lower face 22L, and having a greater diametrical dimension meshes with the worm gear 72. Further, the gear portion 732 positioned on the lower side, that is, on the remote side from the lower face 22L, and having a smaller diametrical dimension meshes with the gear wheel 74.

Meanwhile, the worm wheel 73 has a cross groove 733 formed on a shaft of rotation on the lower side. Into the cross groove 733, a jig not shown in the figures fitted with the insertion hole 251 described hereinabove is inserted. Then, if the worm wheel 73 is rotated in the direction same as the direction upon reverse rotation of the motor 71 through the jig, then the apparatus 3, 4 and 8 of the apparatus main body 2 are driven to unload the disk. It is to be noted that, if it is tried to rotate the worm wheel 73 in the same direction as that upon forward rotation of the motor 71, that is, to load a disk, in a state in which a disk is loaded already, then since arcuate movement of the second slide cam 82 hereinafter described is restricted, the worm wheel 73 is not rotated.

The gear wheel 74 corresponds to a first gear wheel and has two stages of gear portions 741 and 742, shown in FIGS. 8 and 9, respectively, of different diametrical dimensions as shown in FIGS. 8 and 9. Of the gear portions 741 and 742, the gear portion 741 positioned on the lower side and having a greater diametrical dimension meshes with the gear portion 732 and the gear wheel 75. Meanwhile, the gear portion 742 positioned on the upper side and having a smaller diametrical dimension meshes with a rack portion 817 of the first slide cam 81 hereinafter described to slidably move the first slide cam 81. In other words, the gear portion 742 functions as a pinion to the rack portion 817.

The gear wheel 75 corresponds to a second gear wheel and is supported for rotation on the swing arm 77. The gear wheel 75 meshes with the gear wheel 74 and meshes, in a state in which no disk is inserted, with the gear shaft 76.

The gear shaft 76 is formed in a substantially cylindrical shape and is supported for rotation on the shaft portion 224 described hereinabove. The gear shaft 76 has a gear portion 761 shown in FIG. 8 and another gear portion 762 shown in FIGS. 7 and 9 at the opposite ends thereof in the axial direction. The gear portion 761 on the lower side, that is, on the trailing end side in the Y direction, meshes with the gear wheel 75 and the gear portion 762 on the upper side, that is, on the leading end side in the Y direction, is positioned above the upper face 22U and meshes with the idler 314 described hereinabove. Consequently, rotating force of the motor 71 is transmitted to the grasping members 312 and 313 through the gear wheels 315 to 317 to rotate the grasping members 312 and 313.

The swing arm 77 corresponds to a second arm, and has an opening 771 of a substantially circular shape, in which a shaft portion not shown for supporting the gear wheel 74 for rotation thereon is fitted, at a central portion thereof as shown in FIG. 9 and is attached to the lower face 22L for pivotal motion around the opening 771. In other words, the swing arm 77 is supported for pivotal motion on the lower face 22L such that it pivots coaxially with the gear wheel 74.

The swing arm 77 has a shaft portion 772 provided at an end portion thereof on the trailing end side in the Z direction and supporting the gear wheel 75 for rotation thereon. Further, the swing arm 77 has a projection 773 provided at an end portion thereof on the leading end in the Z direction such that it is inserted in a guide groove 824 shown in FIGS. 14 and 15 of the second slide cam 82. Then, when the projection 773 moves along the guide groove 824 in response to arcuate movement of the second slide cam 82, the swing arm 77 is pivoted in a direction in which the gear wheel 75 is moved toward and away from the gear shaft 76.

In particular, since, upon arcuate movement of the second slide cam 82 upon loading of a disk, that is, upon arcuate movement in an S1 direction hereinafter described, a disk is loaded to the chucking position, there is no necessity to rotate the grasping members 312 and 313 of the front arm 31, but on the contrary, driving force for rotating the second slide cam 82 is required. Therefore, if the swing arm 77 is pivoted in a direction in which the gear wheel 75 is spaced away from the gear shaft 76, then the rotating force is not transmitted from the gear wheel 75 to the gear shaft 76 any more. Consequently, arcuate movement of the grasping members 312 and 313 of the front arm 31 is stopped, and driving force required for arcuate movement of the second slide cam 82 is assured.

Meanwhile, upon arcuate movement of the second slide cam 82 upon unloading of a disk, that is, upon arcuate movement of the second slide cam 82 in an S2 direction hereinafter described, immediately before the arcuate movement of the second slide cam 82 comes to an end, the swing arm 77 is pivoted in a direction in which the gear wheel 75 moves toward the gear shaft 76. Therefore, the gear wheel 75 and the gear shaft 76 are brought into meshing engagement with each other and rotating force is transmitted from the gear wheel 75 to the gear shaft 76. Consequently, the grasping members 312 and 313 are rotated, and the driving force for unloading the disk is assured.

Configuration of the Lifting Apparatus

Figure 10:
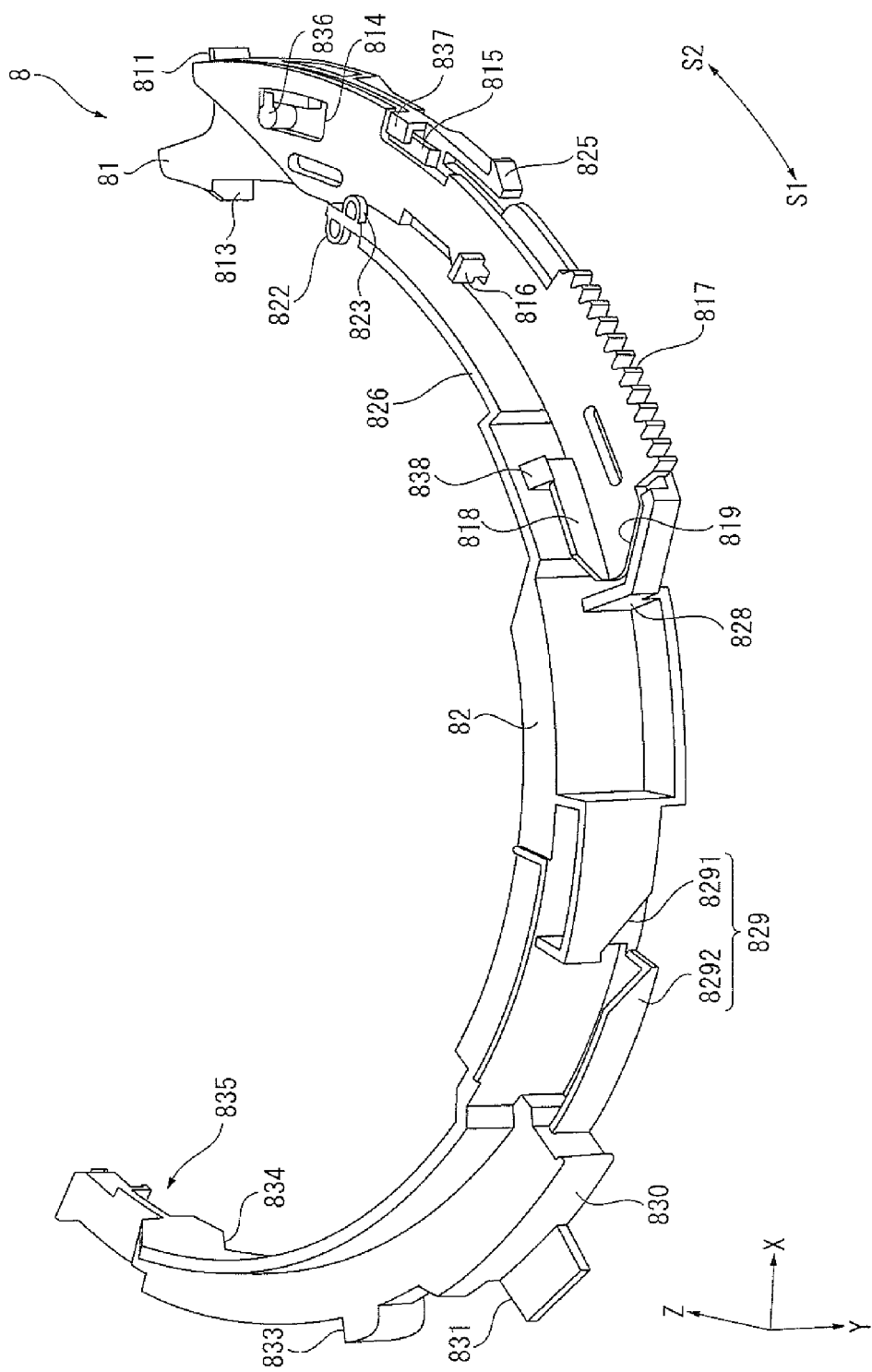
FIG. 10 is a perspective view showing a lifting apparatus of the embodiment of FIG. 1.
Figure 11:
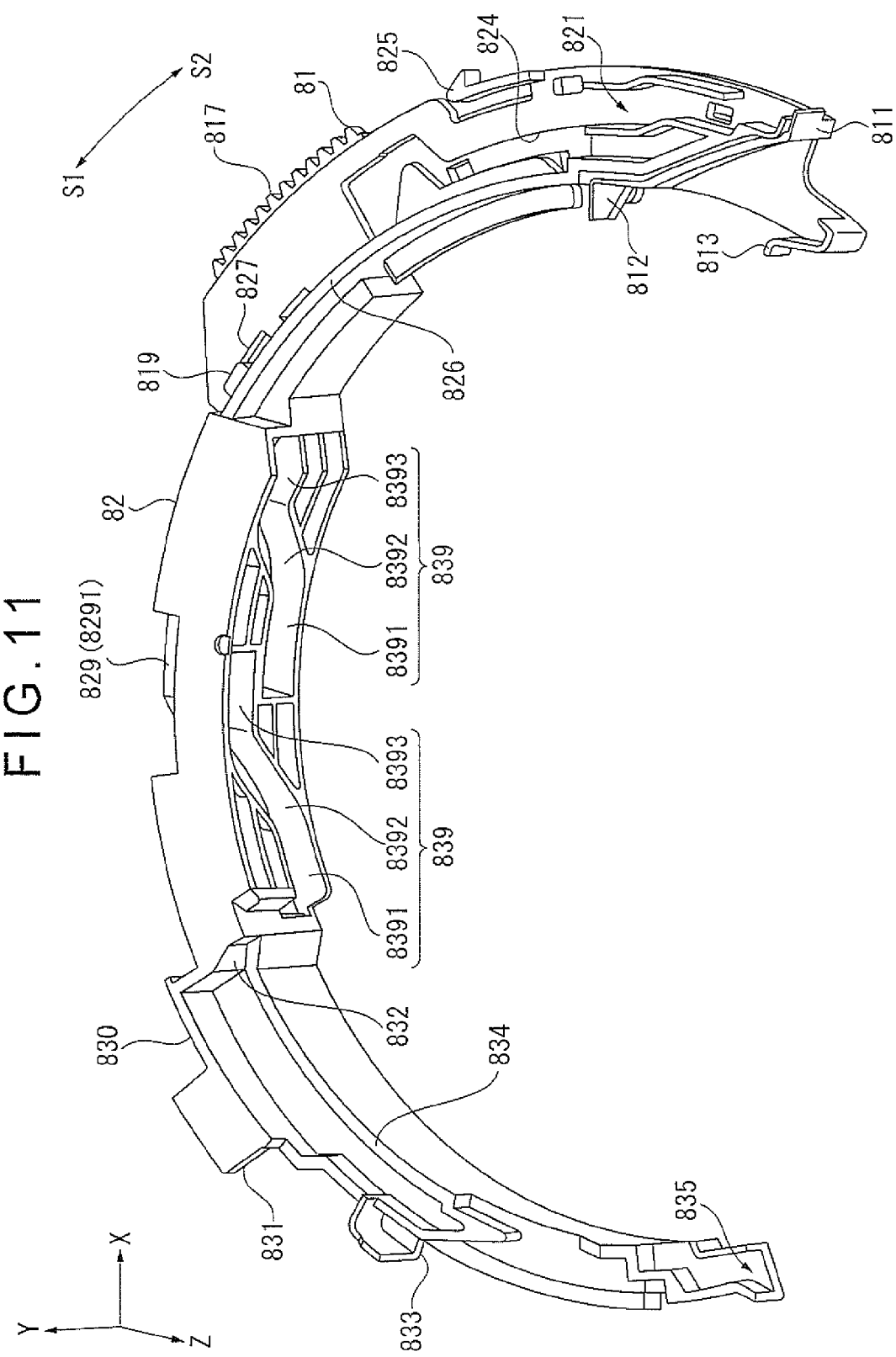
FIG. 11 is a perspective view showing the lifting apparatus of the embodiment of FIG. 1.

FIG. 10 shows the lifting apparatus 8 as viewed from the trailing end side in the Y direction, that is, from the lower side, on the trailing end side in the Z direction, and FIG. 11 shows the lifting apparatus 8 as viewed from the leading end side in the Y direction, that is, from the upper side, on the leading end side in the Z direction. It is to be noted that the X, Y and Z directions in FIGS. 10 and 11 are represented in conformity with the direction of the lifting apparatus 8 in a state in which no disk is loaded.

The lifting apparatus 8 moves the optical apparatus 5 upwardly and downwardly by driving force transmitted thereto from the driving apparatus 7. Further, the lifting apparatus 8 moves the front arms 31 and 32 of the transport apparatus 3, the chuck arms 41 and 42 of the chuck apparatus 4 and the support arm 225 away from the disk loaded at the chucking position, and pivots the lock lever 228 to lock the insertion opening 2A. Such a lifting apparatus 8 as described above includes a first slide cam 81 and a second slide cam 82 as seen in FIGS. 8 to 10.

Configuration of the First Slide Cam

Figure 12:
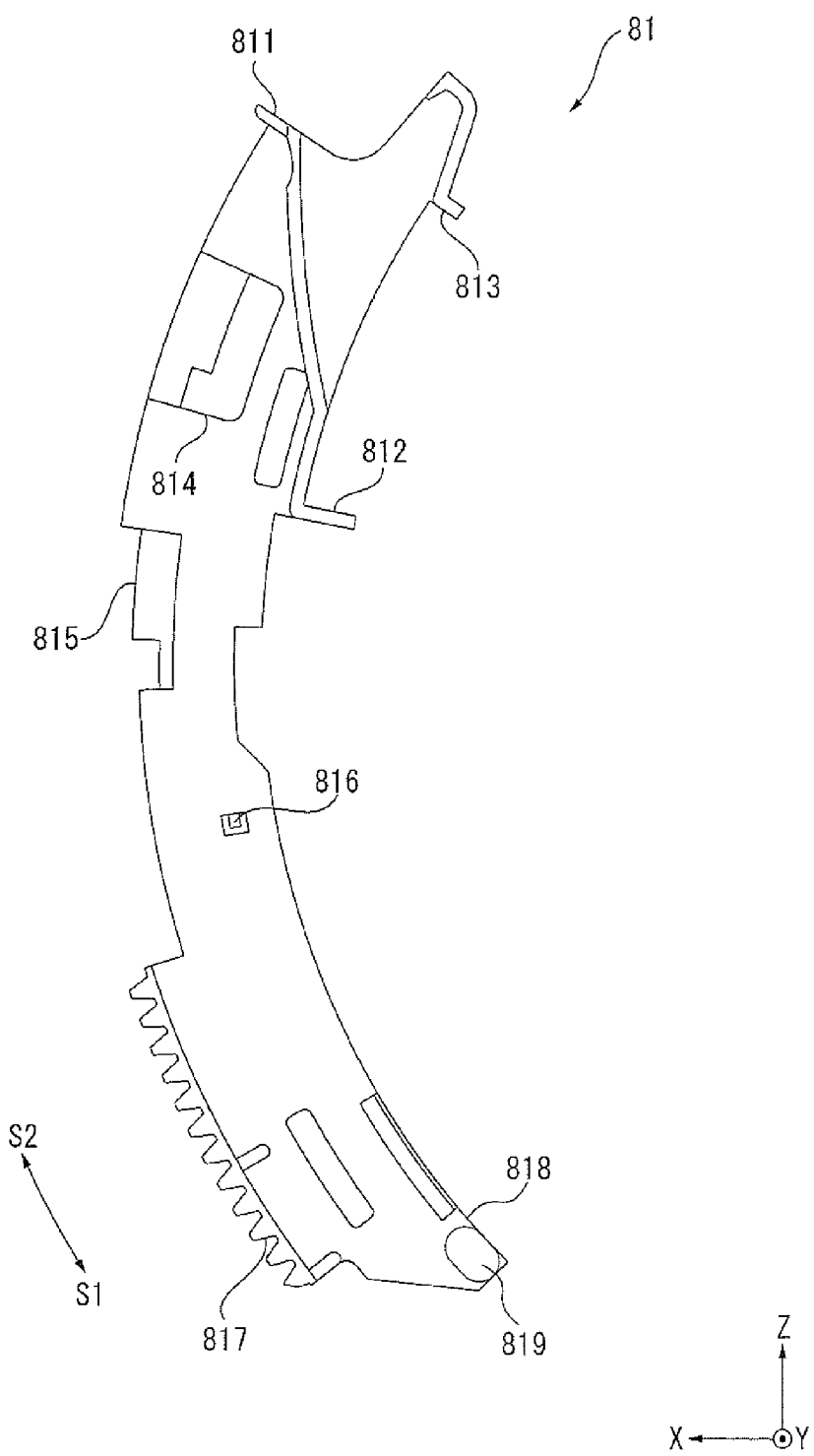
FIG. 12 is a top plan view showing a first slide cam of the embodiment of FIG. 1.
Figure 13:
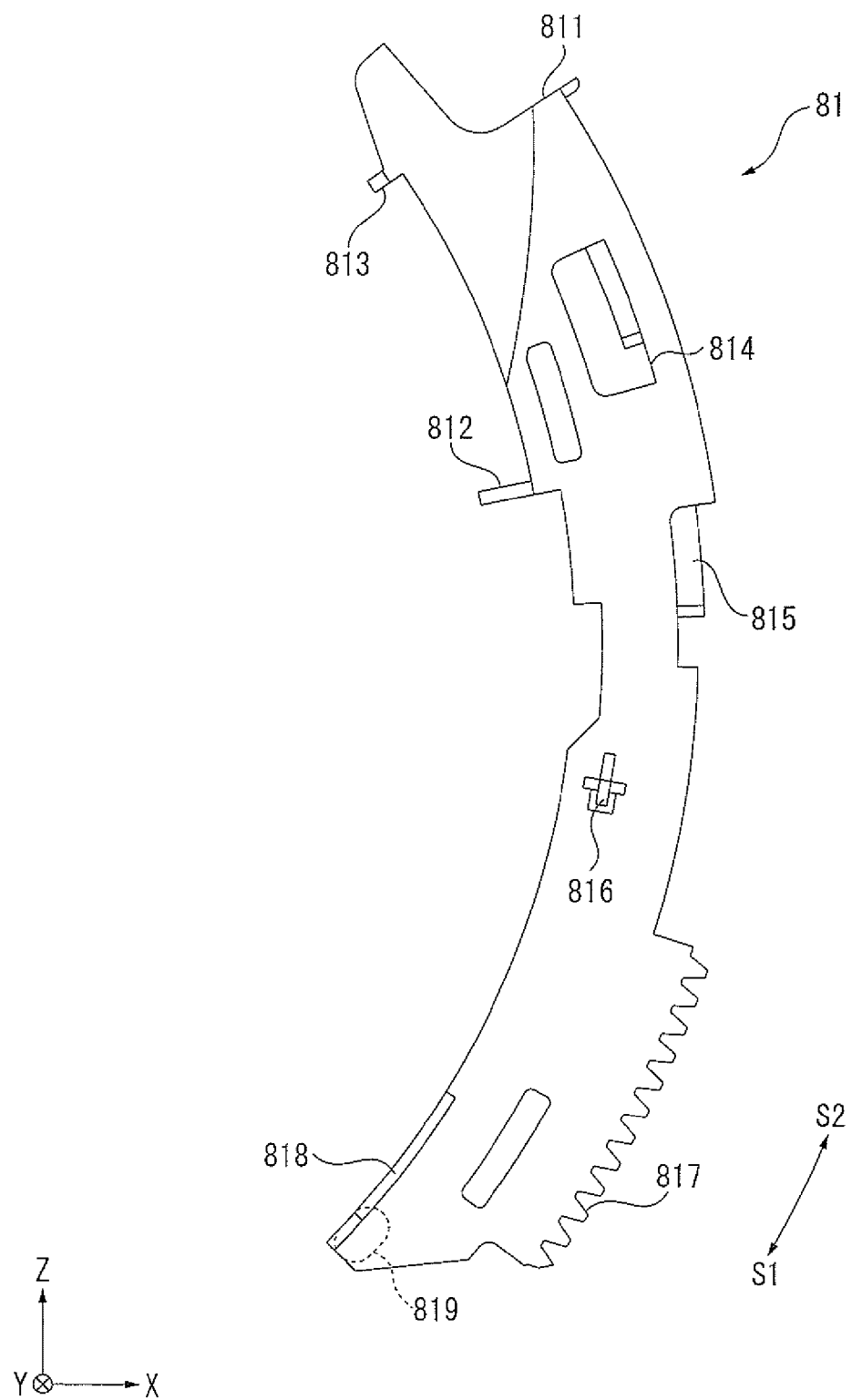
FIG. 13 is a bottom plan view showing the first slide cam of the embodiment of FIG. 1.

FIGS. 12 and 13 show the first slide cam 81 from above and from below, respectively. It is to be noted that the X, Y and Z directions in FIGS. 12 and 13 are represented in conformity with the direction of the first slide cam 81 in a state in which no disk is loaded. The first slide cam 81 corresponds to a second cam member and is attached for sliding movement on the lower face of the second slide cam 82. The first slide cam 81 is pressed, upon loading of a disk, by the detection lever 35 to slidably move toward the driving apparatus 7. Then, the first slide cam 81 is placed into meshing with the gear wheel 74 and slidably moved in an S1 direction illustrated in FIGS. 10 to 13 which is the counterclockwise direction as viewed from above and then in an S2 direction which is the clockwise direction as viewed from above. Consequently, the second slide cam 82 is arcuately moved in the same directions. In other words, the sliding movement of the first slide cam 81 triggers arcuate movement of the second slide cam 82.

Such a first slide cam 81 as described above is formed as a substantially arcuate member elongated along the Z direction as seen in FIGS. 12 and 13. The first slide cam 81 has abutting portions 811 and 812, a guide portion 813, an opening 814, engaging portions 815 and 816, a rack portion 817, another guide portion 818 and a projection 819.

The abutting portion 811 is positioned on the leading end side in the Z direction, that is, on the side in the S2 direction, and the abutting portion 812 is positioned on an inner diameter side at a substantially central position of the first slide cam 81. When a disk D1 or D2 is loaded, the pressing portion 351 is brought into abutment with the abutting portions 811 and 812. Then, by pivotal motion of the detection lever 35, the first slide cam 81 slidably moves to the trailing end side in the Z direction along the second slide cam 82 and on the S1 direction side, that is, on the side for approaching the insertion opening 2A, upon pivotal motion of the detection lever 35.

The guide portion 813 is positioned on the same side as the abutting portion 812 on the leading end side in the X direction similarly, and is brought into abutment, when a disk D2 is chucked, with the pressing portion 351 to move the detection lever 35 away from the disk D2.

The opening 814 is formed in a substantially rectangular shape on the leading end side in the Z direction, and the engaging portion 815 is formed on the outer diameter side at a substantially central portion of the first slide cam 81. Hooked portions 836 and 837 of the second slide cam 82 are engaged with an end edge of the opening 814 and the engaging portion 815 to prevent coming off of the first slide cam 81 from the second slide cam 82 and guide the first slide cam 81 for sliding movement.

The engaging portion 816 is formed in a hooked shape at a substantially central portion of the first slide cam 81 such that it projects downwardly, and a tension coil spring not shown anchored at one end thereof by the second slide cam 82 engages with the engaging portion 816. The first slide cam 81 is biased toward the leading end side in the Z direction against the second slide cam 82 by the tension coil spring.

The rack portion 817, guide portion 818 and projection 819 are formed at an end portion on the trailing end side in the Z direction, that is, on the S1 direction side. The rack portion 817 corresponds to a meshing portion and is formed along an end edge on the outer diameter side. The rack portion 817 is brought into meshing engagement with the gear wheel 74 when the first slide cam 81 slidably moves to the S1 direction side. Then, the first slide cam 81 is slidably moved in the S1 direction and then in the S2 direction by rotation of the gear wheel 74.

The guide portion 818 is formed along an end edge on the inner diameter side. This guide portion 818 is abutted with a hooked portion 838 shown in FIGS. 10 and 15 of the second slide cam 82 to guide the first slide cam 81 for sliding movement.

The projection 819 has a substantially elliptical shape projecting upwardly and corresponds to an abutting portion. The projection 819 is inserted in a guide slot 827 shown in FIGS. 14 and 15 of the second slide cam 82 to cooperate with the end edge of the opening 814, engaging portion 815 and guide portion 818 to guide the first slide cam 81 for sliding movement with respect to the second slide cam 82. Further, the projection 819 is abutted with an end edge of the guide slot 827 on the side in the S1 direction to slidably move the second slide cam 82 in the S1 direction in response to the sliding movement of the first slide cam 81 in the S1 direction.

Configuration of the Second Slide Cam

Figure 14:
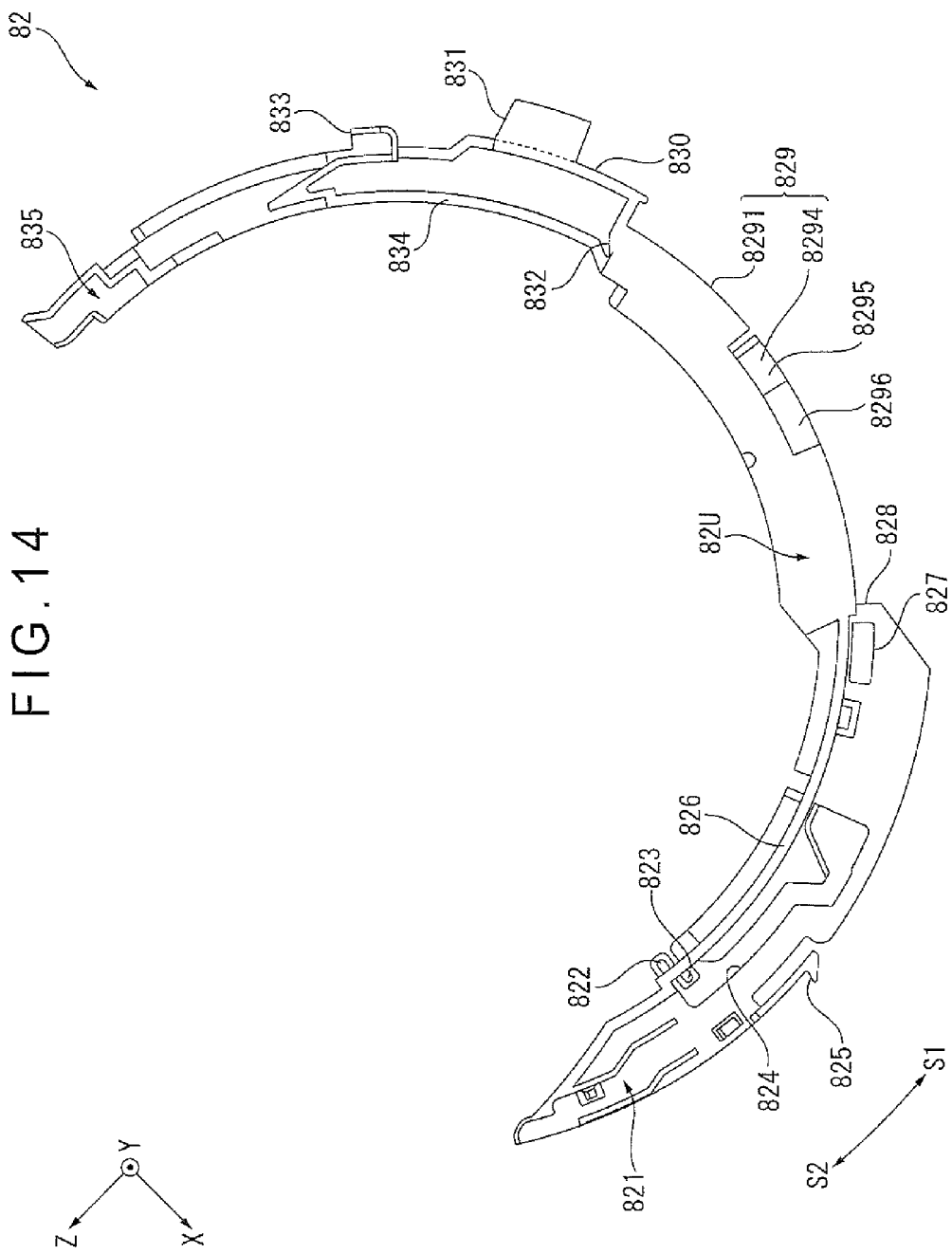
FIG. 14 is a top plan view showing a second slide cam of the embodiment of FIG. 1.
Figure 15:
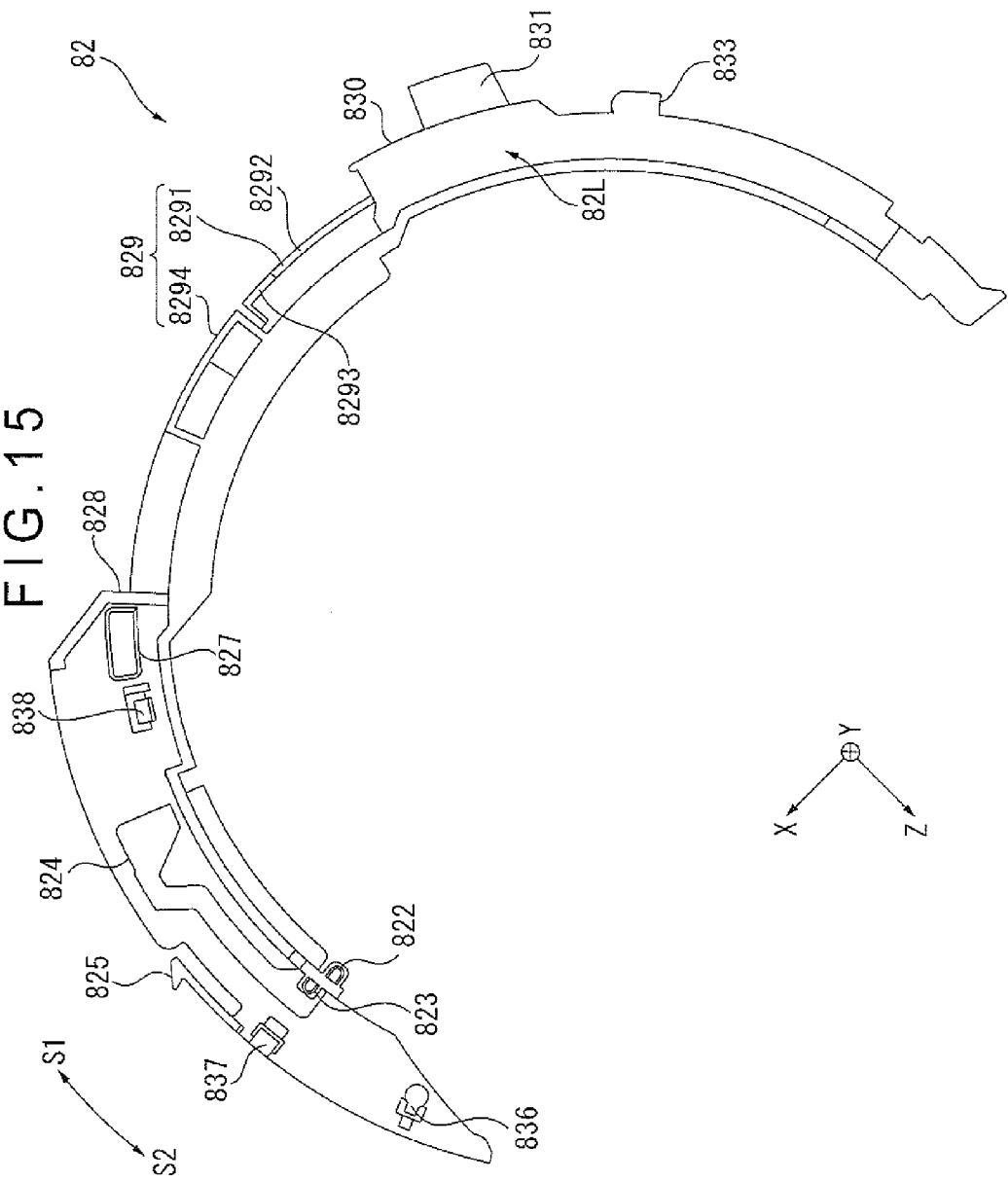
FIG. 15 is a bottom plan view showing the second slide cam of the embodiment of FIG. 1.

FIGS. 14 and 15 show the second slide cam 82 as viewed from above and from below, respectively. Referring to FIGS. 14 and 15, the second slide cam 82 corresponds to a first cam member. The second slide cam 82 is arcuately and slidably moved in the S1 direction and the S2 direction by the first slide cam 81 which meshes with the gear wheel 74 and slidably moves in the first direction and the second direction to move the optical apparatus 5 up and down and move the arms and the levers out of and into abutment with an end edge of a loaded disk.

The second slide cam 82 is an integrally molded part of a synthetic resin having a substantially semicircular shape as seen in FIGS. 8 to 11 and is disposed between the insertion opening 2A and the rotating apparatus 52. The center of the substantially semicircular shape of the second slide cam 82 and the center of the substantially arcuate shape of the first slide cam 81 substantially coincide with each other, and the center is positioned on the virtual straight line L described hereinabove. As shown in FIGS. 14 and 15, such a second slide cam 82 as described above has a guide portion 821, a pair of locking portions 822 and 823, a guide groove 824, a restricting portion 825, another guide portion 826, a guide slot 827, an abutting portion 828, a further guide portion 829, a pressing portion 830, a pair of guide portions 831 and 832, another restricting portion 833, and a pair of guide portions 834 and 835 all shown in FIG. 14, and hooked portions 836 to 838 shown in FIG. 15.

In the following, the elements 821 to 835 formed on the second slide cam 82 from the S2 direction side toward the S1 direction side are described principally with reference to FIG. 14.

The guide portion 821 stands uprightly from an upper face 82U at an end portion of the second slide cam 82 on the S2 direction side and is engaged with the protrusion 414 shown in FIG. 6 of the chuck arm 41. Then, when the second slide cam 82 is arcuately moved in the S1 direction, the guide portion 821 pivots the chuck arm 41 to move the abutting portion 412 away from the chuck pulley 43. It is to be note that, when the second slide cam 82 is arcuately moved in the S2 direction, the chuck arm 41 is pivoted by the biasing force of the tension coil spring 44 to place the abutting portion 412 into abutment with the chuck pulley 43.

The locking portions 822 and 823 are formed on the S2 direction side and on the inner diameter side of the second slide cam 82. Of the locking portions 822 and 823, the locking portion 822 which projects toward the inner diameter side is engaged by a tension coil spring not shown provided on the lower face 22L. The second slide cam 82 is biased toward the S2 direction side, that is, toward the opposite side to the S1 direction, by the spring. Meanwhile, another coil spring not shown is anchored at one end thereof by the locking portion 823 which projects to the outer diameter side. The coil spring is anchored at the other end thereof by the first slide cam 81.

The guide groove 824 is formed on the second slide cam 82 in the proximity of an end portion on the S2 direction side, and the projection 773 shown in FIG. 9 of the swing arm 77 is inserted into the guide groove 824. Then, the guide groove 824 pivots the swing arm 77 in response to arcuate movement of the second slide cam 82 to place the gear wheel 75 and the gear shaft 76 into and out of meshing engagement with each other as described hereinabove.

The restricting portion 825 is formed on the outer diameter side of the second slide cam 82. When the second slide cam 82 is arcuately moved in the S2 direction, the restricting portion

825 is placed into abutment with the locking portion 229 shown in FIG. 8 of the lower frame 22A thereby to restrict further arcuate movement of the second slide cam 82 in the S2 direction.

The guide portion 826 is formed on the upper face 82U side of the second slide cam 82 along an end edge of the inner diameter side. The guide portion 826 abuts with the lower face 22L to guide the second slide cam 82 for sliding movement.

The guide slot 827 is formed in a substantially arcuate shape having a center substantially same as that of the semicircular shape of the second slide cam 82, and a projection 819 shown in FIG. 12 of the first slide cam 81 is inserted in the guide slot 827. Then, as the projection 819 slidably moves in the S1 direction while it abuts with an end edge of the guide slot 827 on the S1 direction side, the second slide cam 82 arcuately moves in the same direction. It is to be noted that, since the second slide cam 82 is biased in the S2 direction, when the motor 71 rotates reversely to cause the first slide cam 81 to slidably move in the S2 direction, while the projection 819 remains in abutment with an end edge of the guide slot 827 on the S1 direction side, the second slide cam 82 is arcuately moved in the S2 direction.

When the second slide cam 82 is arcuately moved in the S1 direction, the abutting portion 828 is brought into abutment with the projection 230 shown in FIG. 8 formed on the lower face 22L thereby to restrict the second slide cam 82 from arcuately moving exceeding an unnecessary amount.

The guide portion 829 is configured from a first guide portion 8291 and a second guide portion 8294 formed on the outer diameter side and having heightwise positions, that is, positions in the Y direction, different from each other. This guide portion 829 is engaged with the projection 2282 shown in FIGS. 8 and 9 of the lock lever 228 to pivot the lock lever 228.

The first guide portion 8291 is formed on the S1 direction side and on the lower side, that is, on the trailing end side in the Y direction as seen in FIG. 15. The first guide portion 8291 has a flat portion 8292 positioned on the S1 direction side and extending in the S1 direction, and an inclined portion 8293 positioned on the S2 direction side and inclined upwardly from an end edge on the S2 direction side of the flat portion 8292.

The second guide portion 8294 is positioned on the S2 direction side and on the upper side, that is, on the leading end side in the Y direction as seen in FIG. 14. The second guide portion 8294 has an inclined portion 8295 positioned on the S1 direction side and inclined upwardly, and a flat portion 8296 connected to an end portion of the inclined portion 8295 on the S2 direction side and extending along the S2 direction. The inclined portion 8295 is disposed in an opposing relationship to the inclined portion 8293.

In the guide portion 829 having such a configuration as described above, in a state in which no disk is loaded, the projection 2282 is disposed at a position corresponding to the flat portion 8292. Then, upon arcuate movement of the second slide cam 82 in the S1 direction, the projection 2282 moves from the flat portion 8292 to the inclined portion 8293 side. Then, when the second slide cam 82 moves in the S1 direction, the projection 2282 moves along the inclined portion 8295 opposing to the inclined portion 8293 to pivot the lock lever 228 in a direction in which the projection 2283 is projected from the upper face 22U. Then, since the projection 2282 is disposed along the flat portion 8296, pivotal motion of the lock lever 228 is restricted and the projection 2283 is maintained in a state in which it projects from the upper face 22U. Consequently, insertion of another disk into the insertion opening 2A is restricted.

It is to be noted that, if the second slide cam 82 is arcuately moved in the S2 direction from this state, then the projection 2282 relatively moves from the flat portion 8296 toward the flat portion 8292, whereupon the lock lever 228 is pivoted in the reverse direction to move the projection 2283 downwardly from the upper face 22U. Consequently, insertion of a disk into the insertion opening 2A is permitted.

The pressing portion 830 is formed on the outer diameter side and presses the switch 623 described hereinabove with reference to FIG. 8. The pressing portion 830 is spaced away from the switch 623 in a state in which the second slide cam 82 completes its arcuate movement in the S1 direction.

The guide portion 831 projects to the outside from the outer diameter side. The guide portion 831 is abutted, upon arcuate movement of the second slide cam 82 in the S1 direction, at an end portion thereof on the S1 direction side with the projection 3213 of the front arm 32 for loading a disk D1 of a large diameter to pivot the front arm 32 in a direction in which it is spaced away from the disk D1.

The guide portion 832 has a face substantially perpendicular to the S1 direction and is similarly abutted, when the second slide cam 82 is arcuately moved in the S1 direction, at the face thereof with the projection 3213 to pivot the front arm 32 in a direction in which it is spaced away from the disk D2 of a small diameter.

The guide portions 831 and 832 correspond to second engaging portions.

The restricting portion 833 is formed in a substantially U shape directed in the S1 direction side on the outer diameter side. The restricting portion 833 is abutted with the projection 2252 shown in FIG. 7 of the support arm 225 to restrict arcuate movement of the second slide cam 82 so that the second slide cam 82 may not arcuately move in the S1 direction in a state in which no disk is loaded.

The guide portion 834 is formed on the inner diameter side and is abutted, upon arcuate movement of the second slide cam 82 in the S1 direction, with the projection 2252 after abutted with and moved by the disk to pivot the support arm 225 in a direction in which it is spaced away from the disk.

The guide portion 835 is formed at an end portion on the S1 direction side such that it is erected uprightly from the upper face 82U. When a disk D1 or D2 is loaded to the chucking position, the guide portion 835 is engaged, upon the arcuate movement of the second slide cam 82 in the S1 direction, with the protrusion 424 shown in FIG. 6 of the chuck arm 42 to pivot the chuck arm 41 in a direction in which the abutting portion 422 is spaced away from the chuck pulley 43. It is to be noted that, if the second slide cam 82 is arcuately moved in the S2 direction, then the guide portion 835 and the protrusion 424 are spaced away from each other. Thereupon, the chuck arm 42 is pivoted by the biasing force of the tension coil spring 44 shown in FIG. 4 in a direction in which the abutting portion 422 moves toward the chuck pulley 43.

The hooked portions 836 to 838 are formed in the proximity of an end portion on the S2 direction side such that they project from a lower face 82L of the second slide cam 82 as seen in FIG. 15.

Of the hooked portions 836 to 838, the hooked portion 836 is inserted into the opening 814 shown in FIG. 10 and the hooked portion 837 is engaged with the engaging portion 815 shown in FIG. 10 to restrict letting off of the first slide cam 81 from the second slide cam 82.

The hooked portion 838 is formed in the proximity of the guide slot 827 and is engaged with the guide portion 818 shown in FIG. 10 to guide the first slide cam 81 for movement with respect to the second slide cam 82.

The second slide cam 82 further has a pair of guide grooves 839 as seen in FIG. 11. The guide grooves 839 correspond to grooved portions and are formed on the inner diameter side, that is, on the side proximate to the base portion 561 shown in FIG. 9 of the holder 56. Each of the guide grooves 839 has a pair of flat portions 8391 and 8393 extending in the S1 direction and an inclined portion 8392 for connecting the flat portions 8391 and 8393 to each other.

The flat portion 8391 positioned on the S1 direction side is positioned on the lower side, that is, on the trailing end side in the Y direction, with respect to the flat portion 8393 positioned on the S2 direction side. Meanwhile, the inclined portion 8392 is continuously inclined upwardly from the end portion of the flat portion 8391 on the S2 direction side and is connected to an end portion of the flat portion 8393 on the S1 direction side. This inclined portion 8392 is inclined with respect to the direction along the axis of arcuate movement of the second slide cam 82, that is, with respect to the Y direction and the direction along the axis of rotation of the disk D1 or D2. In other words, the inclined portion 8392 is inclined continuously such that it gradually approaches the disk D1 or D2 along the direction from one end to the other end of the range of movement of the projection 5611 serving as a first engaging portion. Further in other words, the inclined portion 8392 is formed in such a manner as to extend long a straight line which is inclined with respect to one of faces such as a recording face of the disk D1 or D2. In particular, the inclined portion 8392 is formed such that the end portion thereof on the inclined portion 8392 side is positioned nearer to the load disk D1 or D2 than the end portion of the inclined portion 8392 on the flat portion 8391 side.

In such guide grooves 839, the projections 5611 of the holder 56 are inserted. Then, when the second slide cam 82 is arcuately moved in the S1 direction, each of the projections 5611 moves from the position corresponding to the flat portion 8391 to the flat portion 8393 through the inclined portion 8392 to move the end portion of the optical apparatus 5 on the insertion opening 2A side, that is, on the trailing end side in the Z direction. On the other hand, if the second slide cam 82 is arcuately moved in the S2 direction, then each of the projections 5611 moves from the flat portion 8393 to the flat portion 8391 side through the inclined portion 8392 so that the end portion of the optical apparatus 5 on the insertion opening 2A side is moved down.

Loading of Disk of Diameter of 12 cm

FIGS. 16 to 24 illustrate operation of the disk apparatus 1 upon loading of a disk D1. In the following, operation of the disk apparatus 1 when a disk D1 of a diameter of 12 cm is inserted into the insertion opening 2A is described. If the disk D1 is inserted into the insertion opening 2A, then the disk D1 is abutted with the abutting portion 612 shown in FIG. 7 to pivot the detection arm 61 shown in FIG. 8. By the pivotal motion of the detection arm 61, the switch 621 is pressed and a driving signal is outputted from the control board 62 shown in FIG. 8 to drive the motor 71. The driving force or rotating force of the motor 71 is transmitted to the grasping members 312 and 313 through the gear wheels 72 to 76, idler 314 and gear wheels 315 to 317 to rotate the grasping members 312 and 313.

If the disk D1 is inserted further, then an end edge of the disk D1 is grasped by the grasping members 312 and 322 as seen in FIG. 16. Then, if the end edge of the disk D1 is pressed to the leading end side in the Z direction by the grasping member 312 in the form of a roller while the grasping member 312 rotates, then the front arms 31 and 32 are pivoted in synchronism with each other in directions in which they are spaced away from each other. Consequently, the disk D1 is inserted to the leading end side in the Z direction while being rotated from a base point provided by the gripped position thereof by the fixed grasping member 322.

It is to be noted that, in response to the pivotal motion of the front arms 31 and 32, the detection arm 61 is further pivoted so that the switch 622 is pressed by the pressing portion 613.

Figure 18:
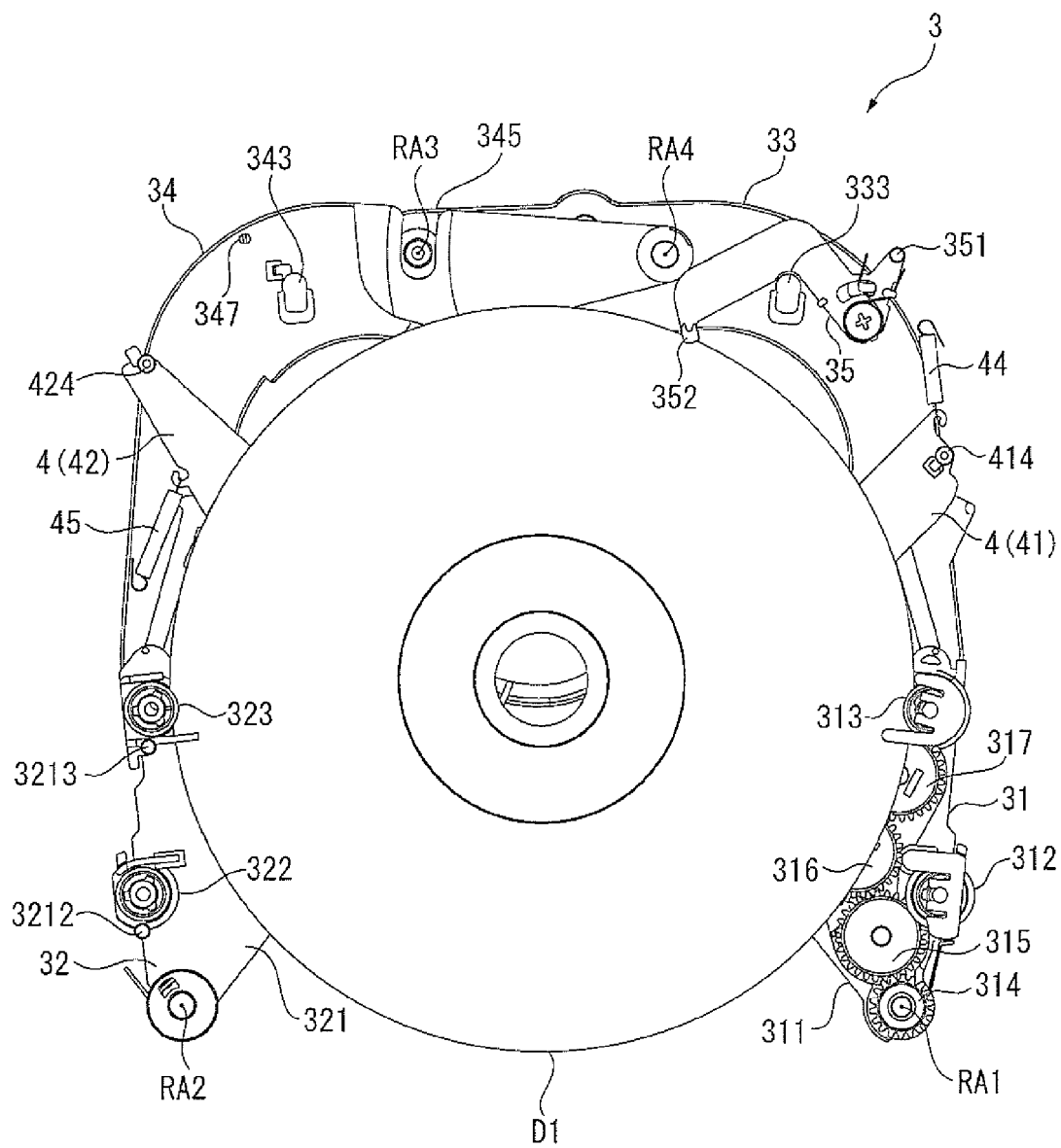
FIG. 18 is a schematic view illustrating movement of the embodiment of FIG. 1 upon loading of the first disk.

Then, the disk D1 is transferred from the grasping members 312 and 322 to the grasping members 313 and 323 and is further loaded to the leading end side in the Z direction. Thereafter, if the disk D1 is loaded to the leading end side in the Z direction in a state in which it is abutted by the protrusion 352 as seen in FIG. 18, then the disk D1 is brought into abutment with the restricting portions 333 and 343 as seen in FIG. 19. Consequently, the disk D1 is positioned at the checking position. In this state, the disk D1 is supported at four points thereof by the grasping members 313 and 323 positioned on the trailing end side in the Z direction and the restricting portions 333 and 343 positioned on the leading end side in the Z direction with respect to the center of the disk D1.

Thereupon, the detection lever 35 which abuts with the disk D1 is pivoted further, and the pressing portion 351 presses the abutting portion 811 to slidably move the first slide cam 81 toward the trailing end side in the Z direction, that is, toward the S1 direction side. It is to be noted that, in this state, pivotal motion of the chuck arms 41 and 42 is permitted.

Figure 20:
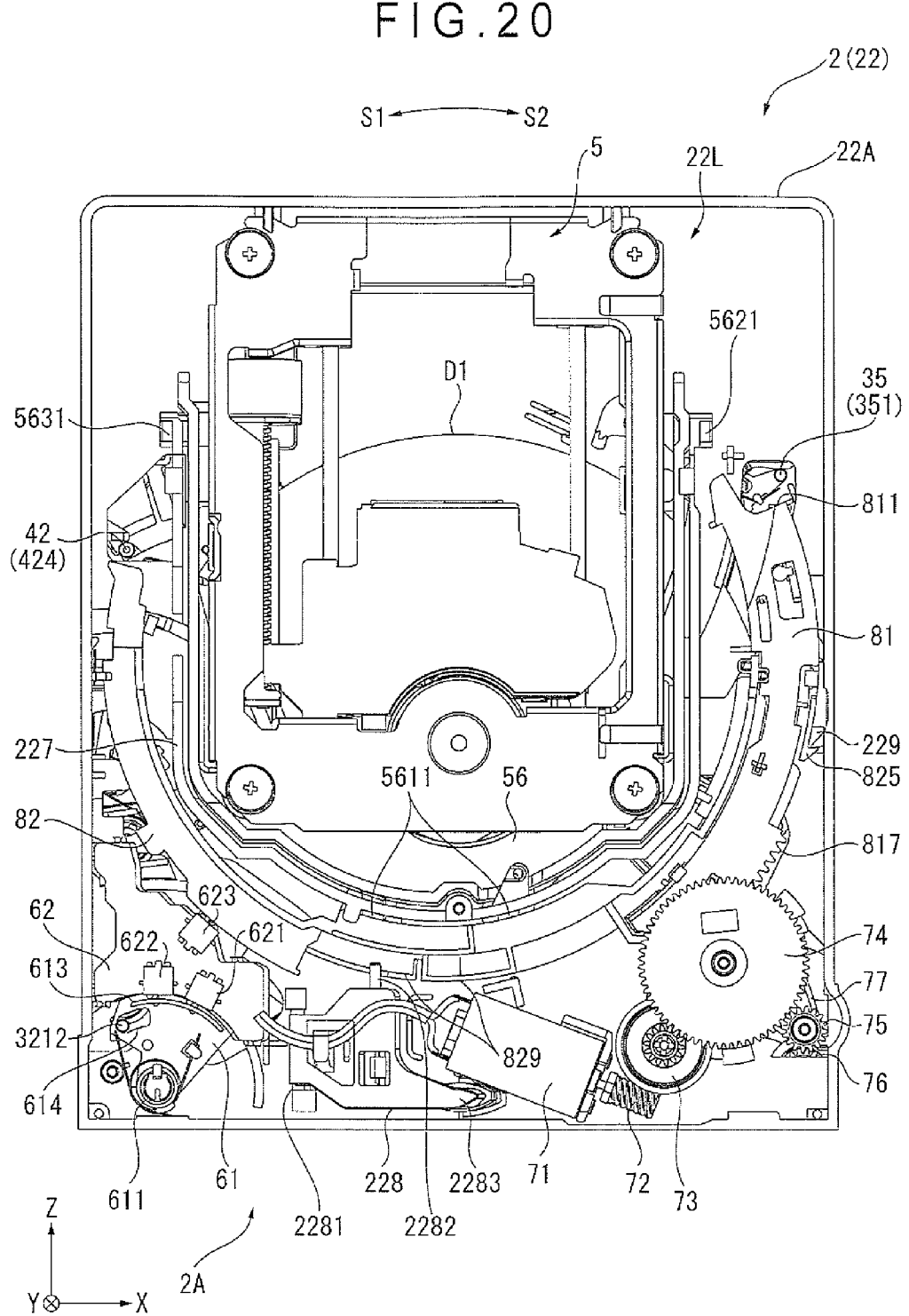
FIG. 20 is a schematic view illustrating movement of the embodiment of FIG. 1 upon loading of the first disk.

When the first slide cam 81 slidably moves, the rack portion 817 and the gear wheel 74 are placed into meshing engagement with each other as seen in FIG. 20 so that the first slide cam 81 is further slidably moved to the 51 direction side by the rotating force of the gear wheel 74. Consequently, the projection 819 shown in FIG. 11 is brought into abutment with an end edge of the guide slot 827 shown in FIG. 11 on the 51 direction side so that the first slide cam 81 arcuately moves the second slide cam 82 in the 51 direction.

Figure 21:
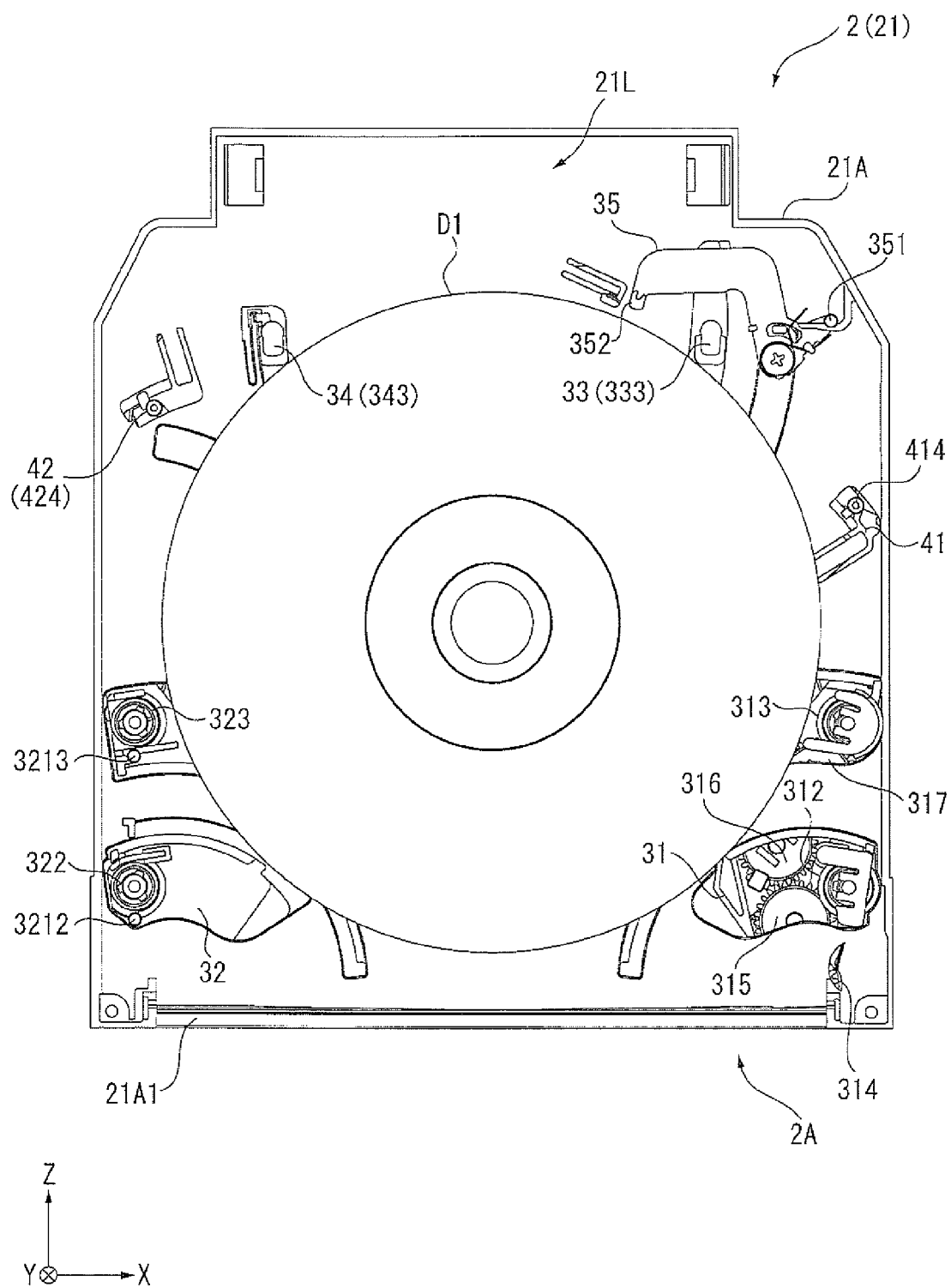
FIG. 21 is a schematic view illustrating movement of the embodiment of FIG. 1 upon loading of the first disk.

By the arcuate movement of the second slide cam 82, the arms 31 to 34 are pivoted in the direction in which they are spaced away from the disk D1 as seen in FIG. 21 and also the detection lever 35 supported for pivotal motion on the link arm 33 is spaced away from the disk D1. In response to the pivotal motion of the arms 31 to 34, the detection arm 61 which engages with the front arm 32 is retracted to the circumferential edge side of the lower frame 22A and the chuck arms 41 and 42 are pivoted in a direction in which they are spaced away from the chuck pulley 43.

It is to be noted that, at this point of time, the swing arm 77 is pivoted already and the gear wheel 75 is spaced from the gear shaft 76. Therefore, rotation of the grasping members 312 and 313 is stopped.

Figure 22:
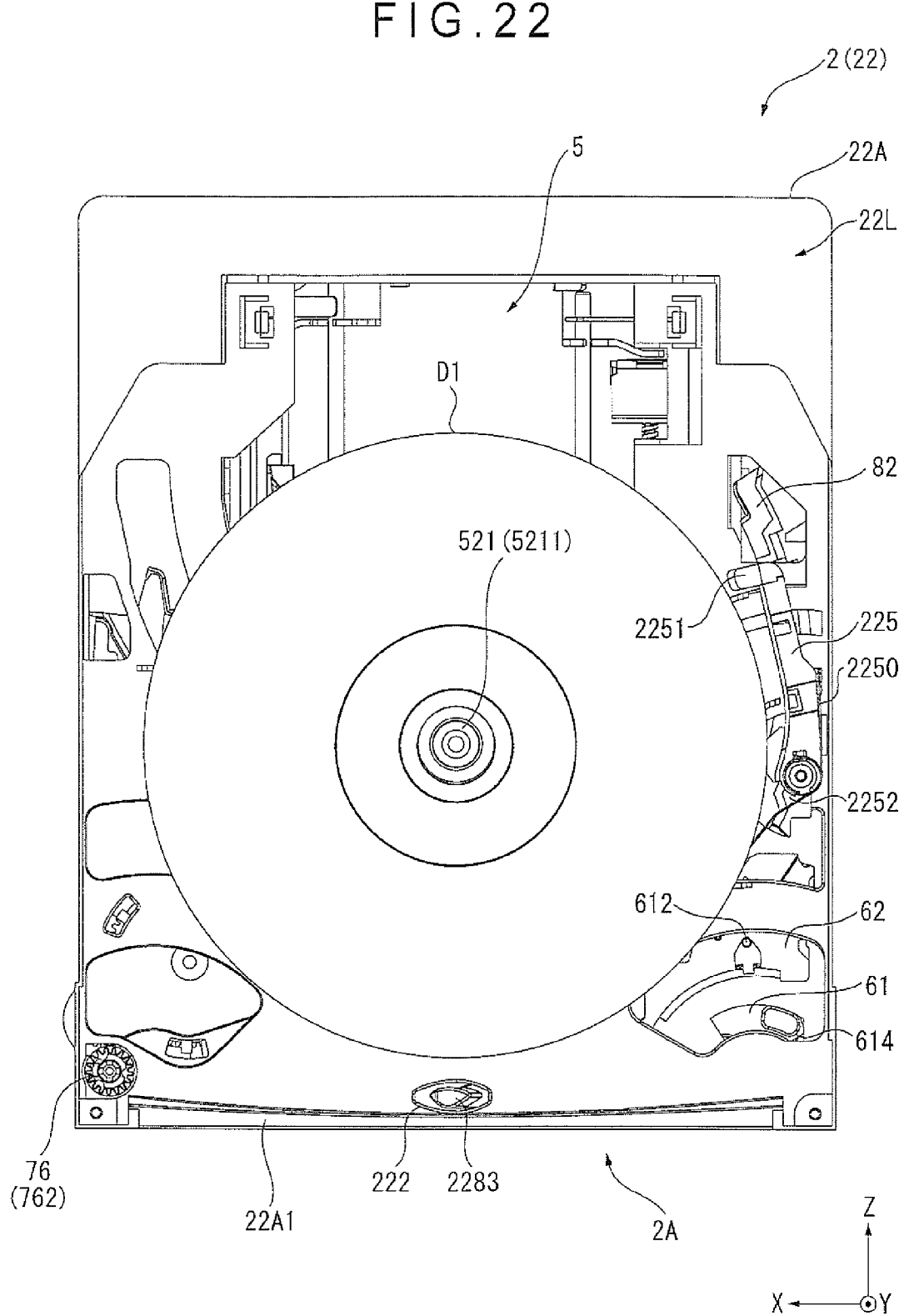
FIG. 22 is a schematic view illustrating movement of the embodiment of FIG. 1 upon loading of the first disk.

Further, the lock lever 228 is pivoted in a direction along the lower face 22L by the guide portion 829 shown in FIG. 20 with which the projection 2282 shown in FIG. 20 is engaged. Consequently, the projection 2283 of the lock lever 228 projects to the upper side from the upper face 22U as seen in FIG. 22 to lock the insertion opening 2A.

Further, an end portion of the optical apparatus 5 on the turntable 521 side, that is, on the trailing end side in the Z direction, is pressed upwardly by the guide grooves 839 with which the projections 5611 is engaged, and the fitting portion 5211 is fitted into the hole at the center of the disk D1.

Also the support arm 225 is spaced away from the disk D1 by the guide portion 834 shown in FIG. 11 with which the projection 2252 engages.

Figure 23:
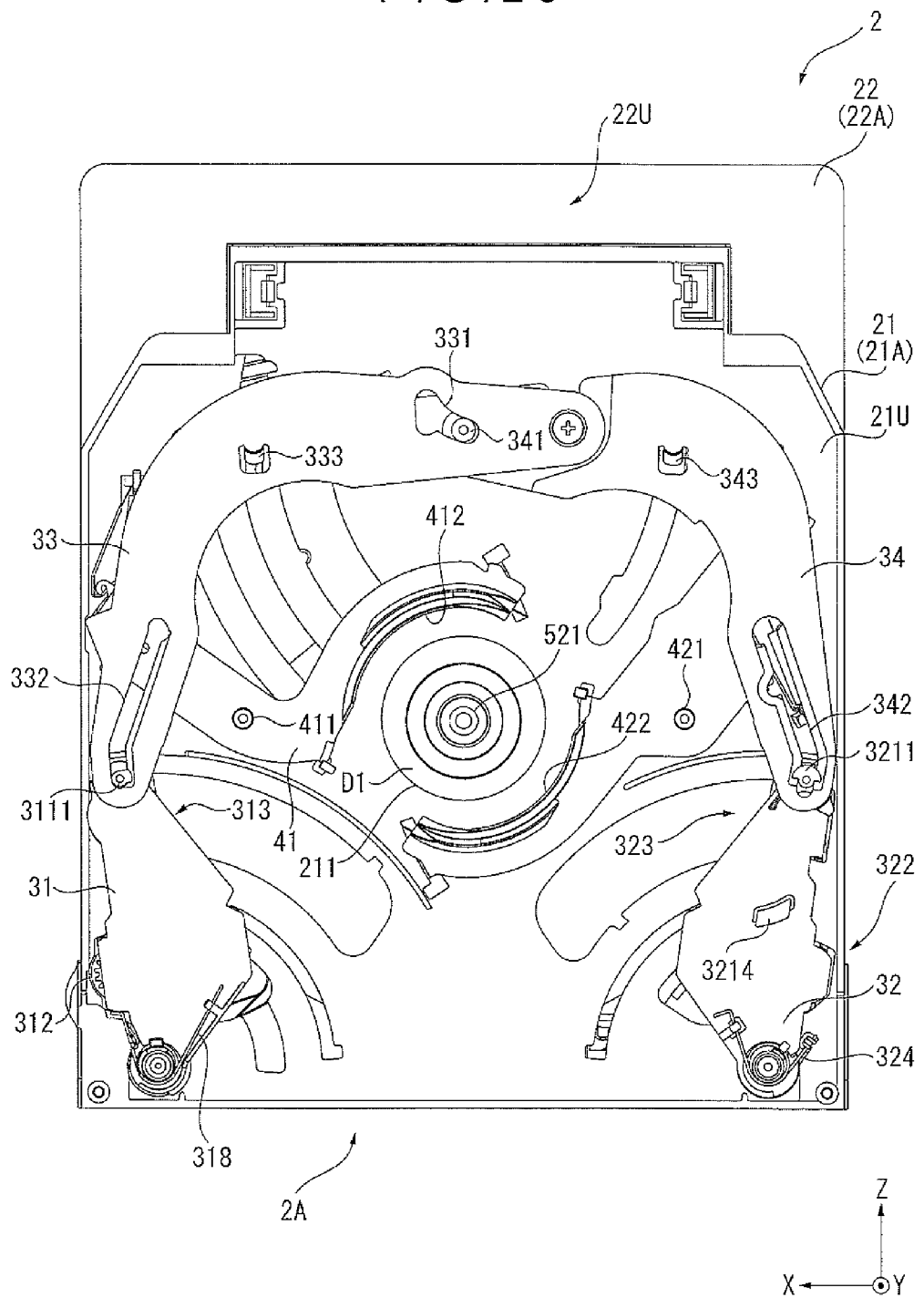
FIG. 23 is a schematic view illustrating movement of the embodiment of FIG. 1 upon loading of the first disk.

Then, if the chuck arms 41 and 42 are further pivoted by the second slide cam 82 as seen in FIG. 23, then the abutting portions 412 and 422 are spaced fully away from the chuck pulley 43 not shown. Consequently, the disk D1 is chucked by the chuck pulley 43 in a fully free state and the turntable 521 pushed up.

Figure 24:
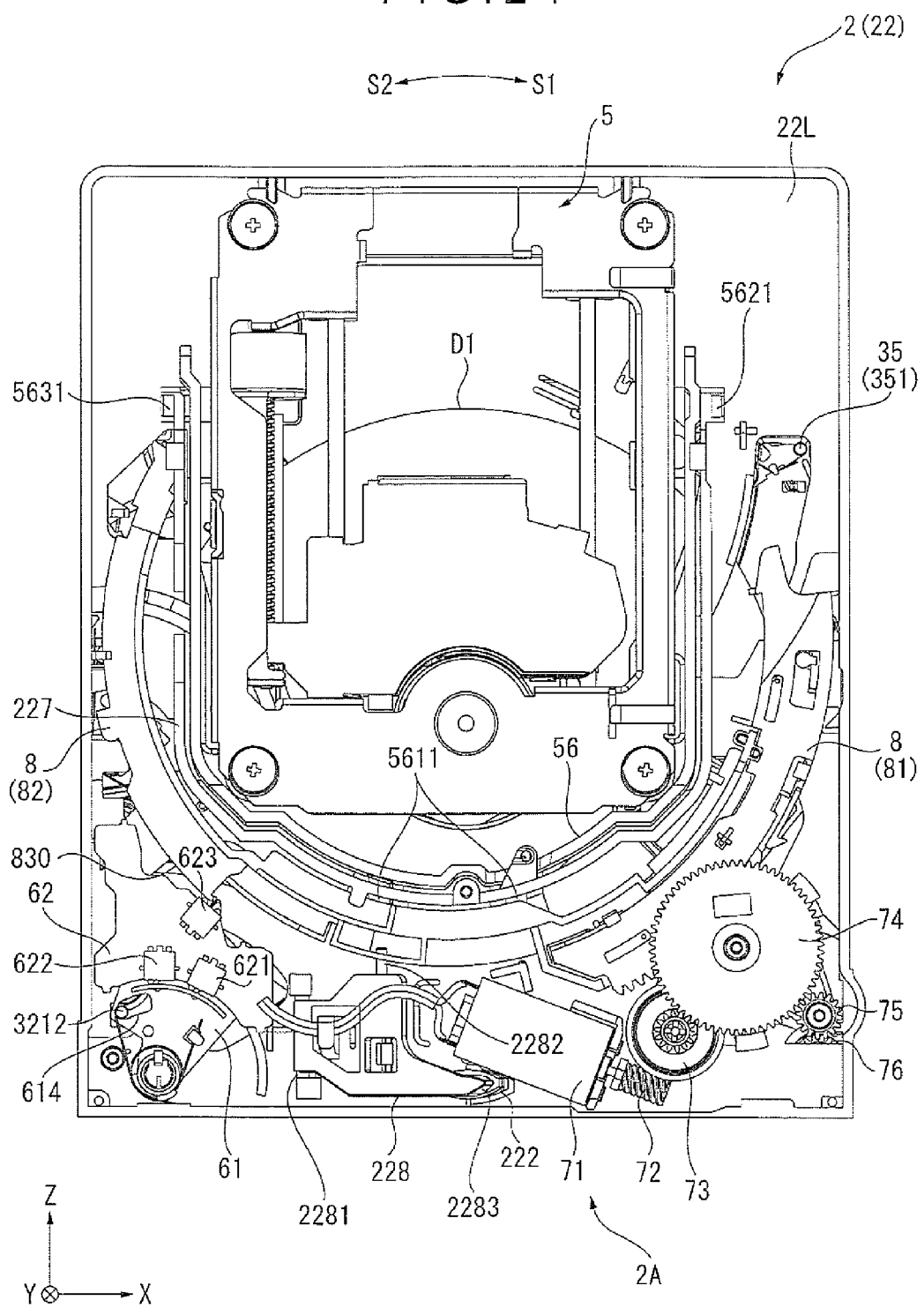
FIG. 24 is a schematic view illustrating movement of the embodiment of FIG. 1 upon loading of the first disk.

Thereafter, when the second slide cam 82 is further arcuately moved in the S1 direction until the pressure upon the switch 623 by the pressing portion 830 is canceled as seen from FIG. 24, then a stopping signal is outputted from the control board 62 to stop the driving of the motor 71.

The loading of the disk D1 is completed therewith.

Loading of Disk of Diameter of 8 cm

Figure 26:
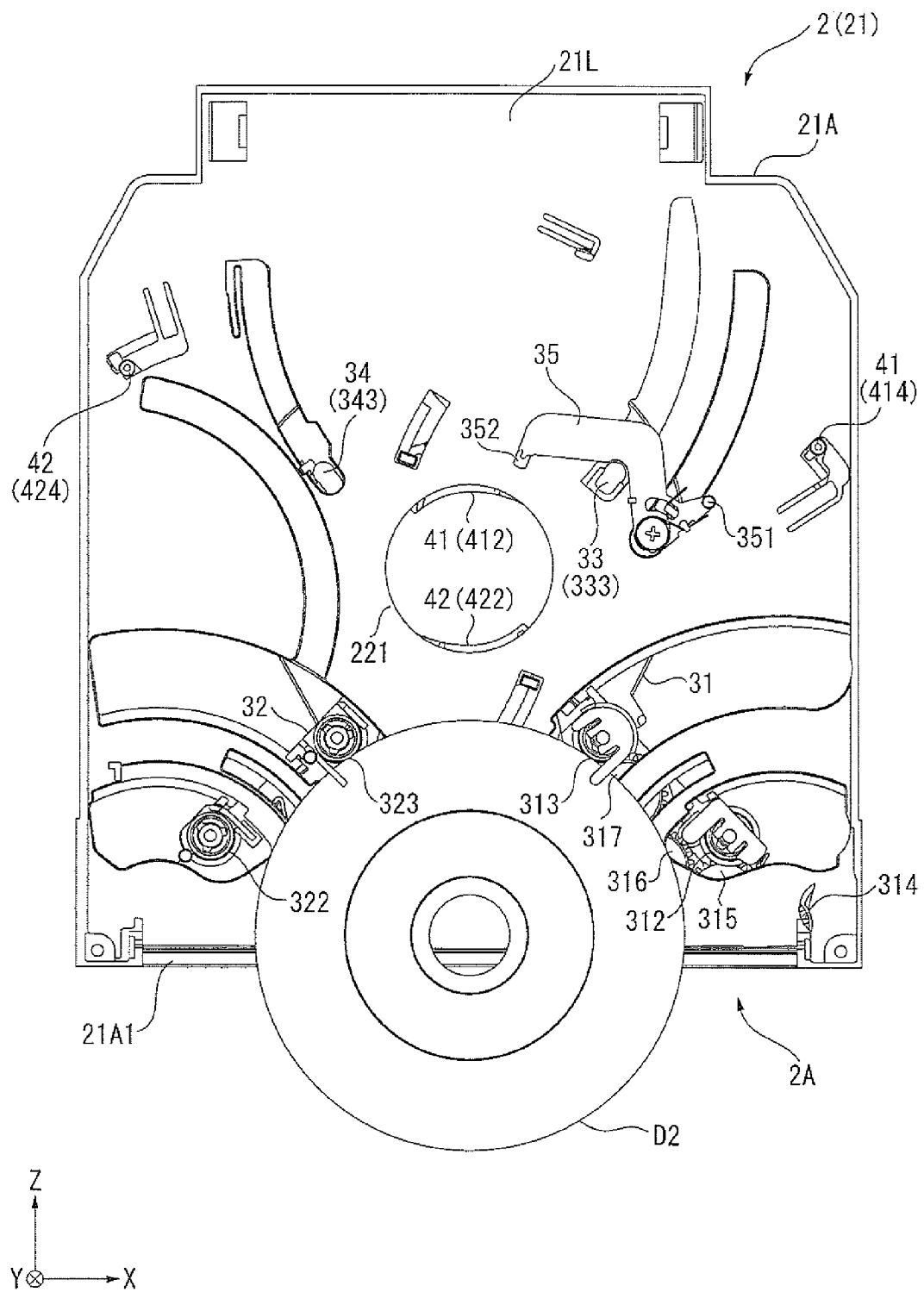
FIG. 26 is a schematic view illustrating movement of the embodiment of FIG. 1 upon loading of the second disk.
Figure 27:
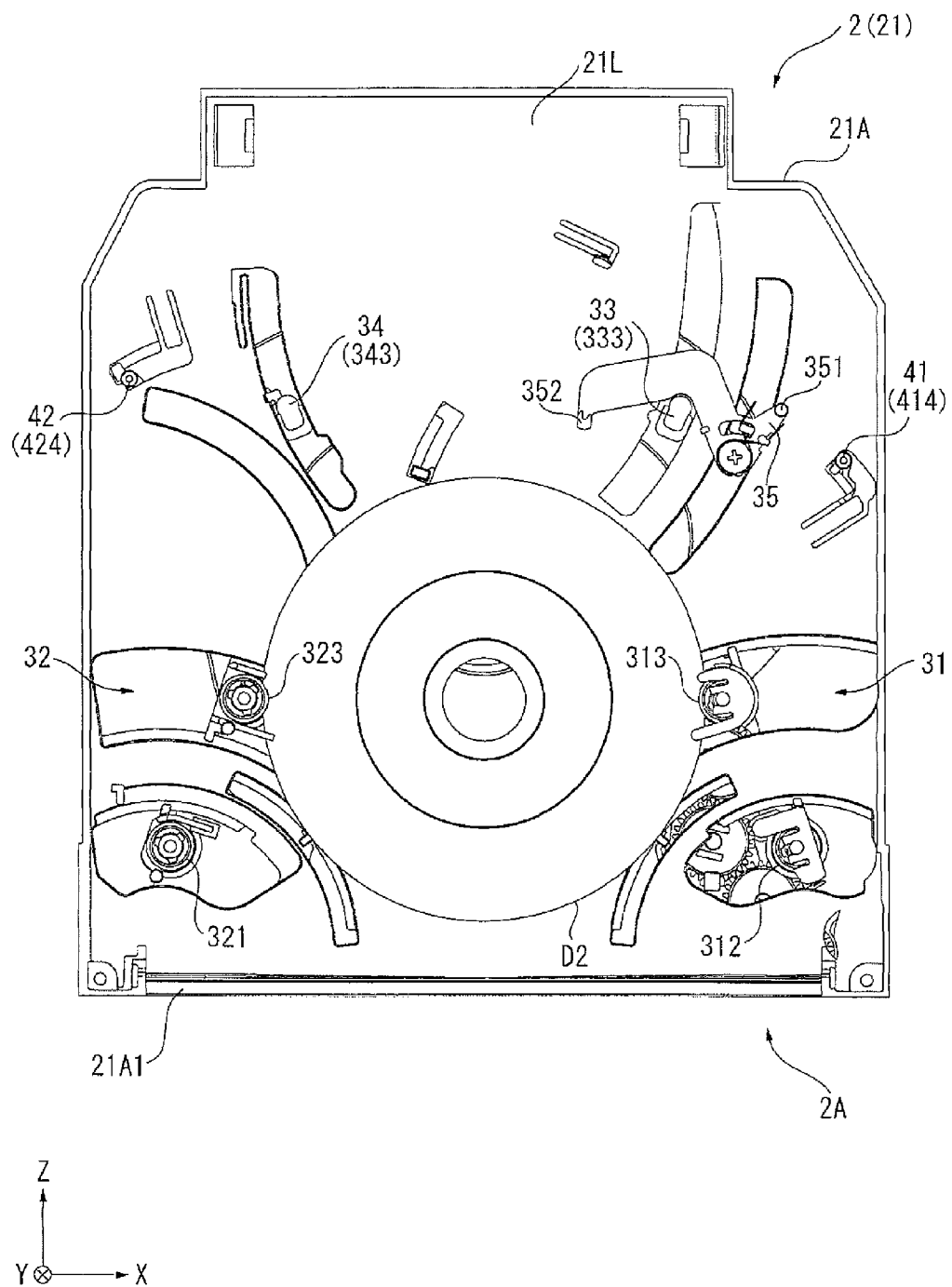
FIG. 27 is a schematic view illustrating movement of the embodiment of FIG. 1 upon loading of the second disk.

FIGS. 25 to 33 illustrate operation of the disk apparatus 1 upon loading of a disk D2. Now, operation upon loading of a disk D2 of a diameter of 8 cm is described. As seen in FIGS. 25 and 26, if a disk D2 is inserted to a substantially central position of the insertion opening 2A, then an end edge of the disk D2 is grasped by the grasping members 313 and 323. If the disk D2 is pushed in this state to the leading end side in the Z direction, then the disk D2 is brought into abutment with the abutting portion 612 to pivot the detection arm 61. Consequently, the switch 621 is pushed, and the motor 71 is driven in response to a driving signal outputted from the control board 62.

Since the diametrical dimension of the disk D2 is smaller than the dimension of the insertion opening 2A in the X direction, the disk D2 may possibly be inserted in a one-sided state to the left side, that is, to the leading end side in the X direction, or to the right side, that is, to the trailing end side in the X direction, of the insertion opening 2A.

In particular, if the disk D2 is inserted in a one-sided relationship to the left side, then the front arm 31 is pivoted a little in a direction in which it is spaced away from the insertion opening 2A, and the front arms 33 and 34 are pivoted in response to the pivotal motion of the front arm 31. Thereupon, since the projection 341 shown in FIG. 25 slidably moves along an end edge of the slot 331 shown in FIG. 25 on the trailing end side in the Z direction until it is fitted into the restricting portion 3311, the pivotal motion of the link arms 33 and 34 is restricted, and also the pivotal motion of the front arms 31 and 32 is restricted. Consequently, the disk D2 is not centered and is prevented from being loaded into the apparatus main body 2.

Further, if the disk D2 is thrown in to the left end side of the insertion opening 2A, then a load is applied to the front arm 31 and link arm 33 side, and the projection 3211 shown in FIG. 25 is slidably moved along a left side end edge of the slot 342. If the arms 31 and 32 are pivoted in this state, then the projection 3211 is fitted into the restricting portion 3421, and consequently, further pivotal motion of the arms 31 to 34 is restricted. Consequently, the disk D2 is not centered and is prevented from being loaded into the apparatus main body 2 similarly as in the case described above. Thereafter, the projection 3211 is spaced away from the restricting portion 3421, and the front arms 31 and 32 are pivoted to the insertion opening 2A side by the biasing force of the torsion coil springs 318 and 324 until they come to a state illustrated in FIGS. 25 and 26.

On the other hand, if the disk D2 is inserted in a one-sided state to the right side, then in a state in which the disk D2 is grasped by the front arm 32, the front arms 31 and 32 are pivoted in a direction in which they are spaced away from the insertion opening 2A. However, since the support arm 225 disposed so as to extend in a direction substantially perpendicular to the Z direction and biased toward the trailing end side in the Z direction is disposed on the leading end side of the front arm 32 in the Z direction, the disk D2 is centered by the support arm 225. Then, by the biasing force of the torsion coil springs 318 and 324, the front arms 31 and 32 are pivoted to the insertion opening 2A side, whereupon the disk D2 is grasped by the grasping members 313 and 323 and comes to a state illustrated in FIGS. 25 and 26.

If the grasping members 312 and 313 are rotated from the state illustrated in FIGS. 25 and 26, then while the disk D2 is grasped by the grasping members 313 and 323, the front arms 31 and 32 are pivoted in a direction in which they are spaced away from the insertion opening 2A to load the disk D2 to the leading end side in the Z direction.

Then, when the disk D2 is further loaded, the disk D2 is brought into abutment with the protrusion 352 as seen in FIG. 28 and then brought into abutment with the restricting portions 333 and 343 as seen in FIG. 29. In this state, the disk D2 is supported at four points thereof by the restricting portions 333 and 343 and the grasping members 313 and 323 and disposed at the chucking position. Further, the detection lever 35 is pivoted, whereupon the pressing portion 351 presses the abutting portion 812 to the trailing end side in the Z direction, that is, to the S1 direction side to slidably move the first slide cam 81 in the same direction. Then, by the sliding movement of the first slide cam 81 in the S1 direction, the second slide cam 82 is arcuately moved in the same direction as described hereinabove.

Figure 31:
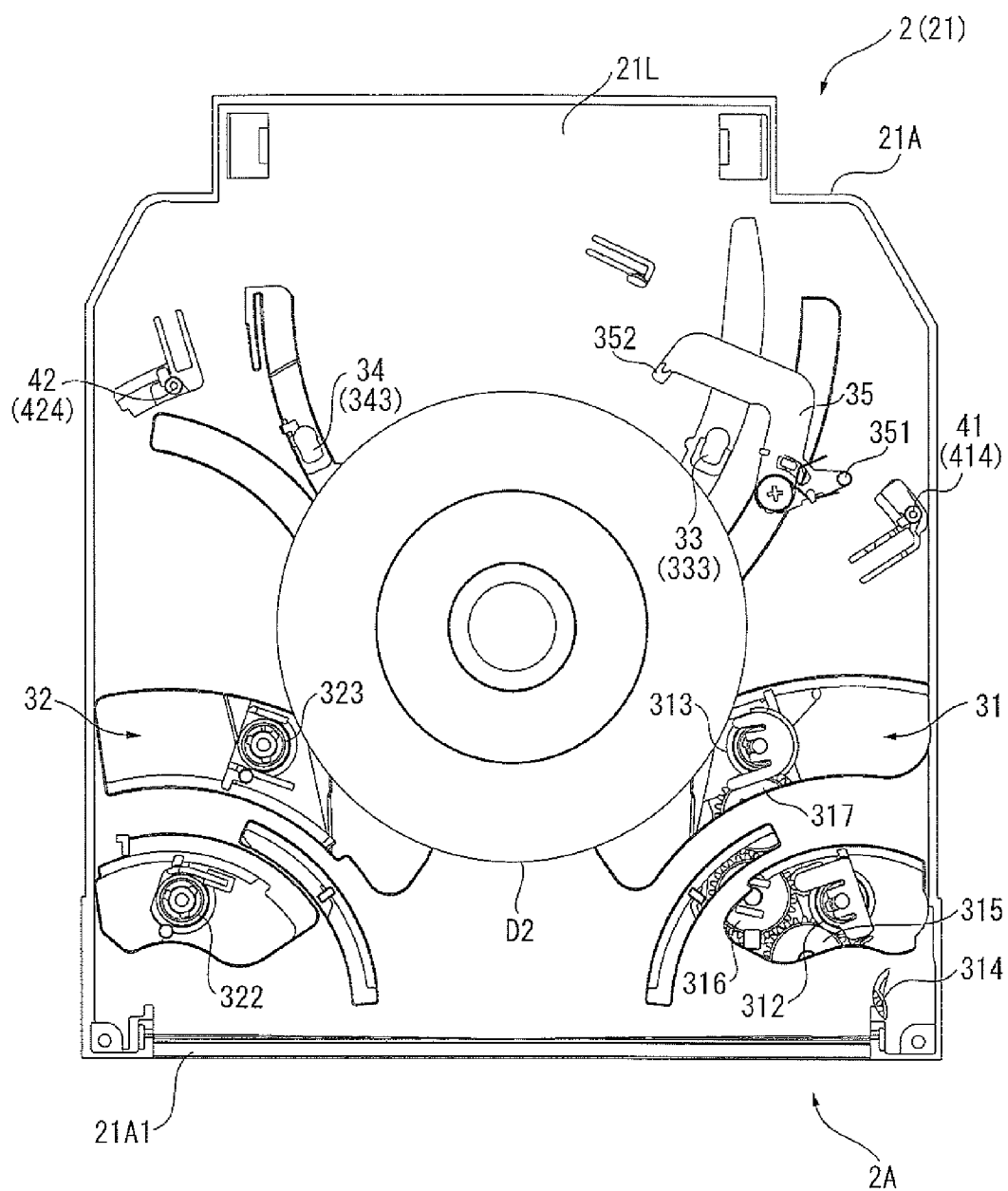
FIG. 31 is a schematic view illustrating movement of the embodiment of FIG. 1 upon loading of the second disk.

By the arcuate movement of the second slide cam 82 in the S1 direction, the arms 31 to 34 are pivoted in a direction in which they are spaced away from the disk D2 as seen in FIG. 31. Further, in response to the pivotal motion of the link arm 33, also the detection lever 35 is spaced away from the disk D2, and the detection arm 61 is retracted to the peripheral edge side of the lower frame 22A in response to the pivotal motion of the front arm 32. It is to be noted that, in this state, the meshing engagement between the gear wheel 75 and the gear shaft 76 has been canceled by the pivotal motion of the swing arm 77, similarly as in the case of loading of the disk D1 described hereinabove, and the rotation of the grasping members 312 and 313 is stopped.

Figure 32:
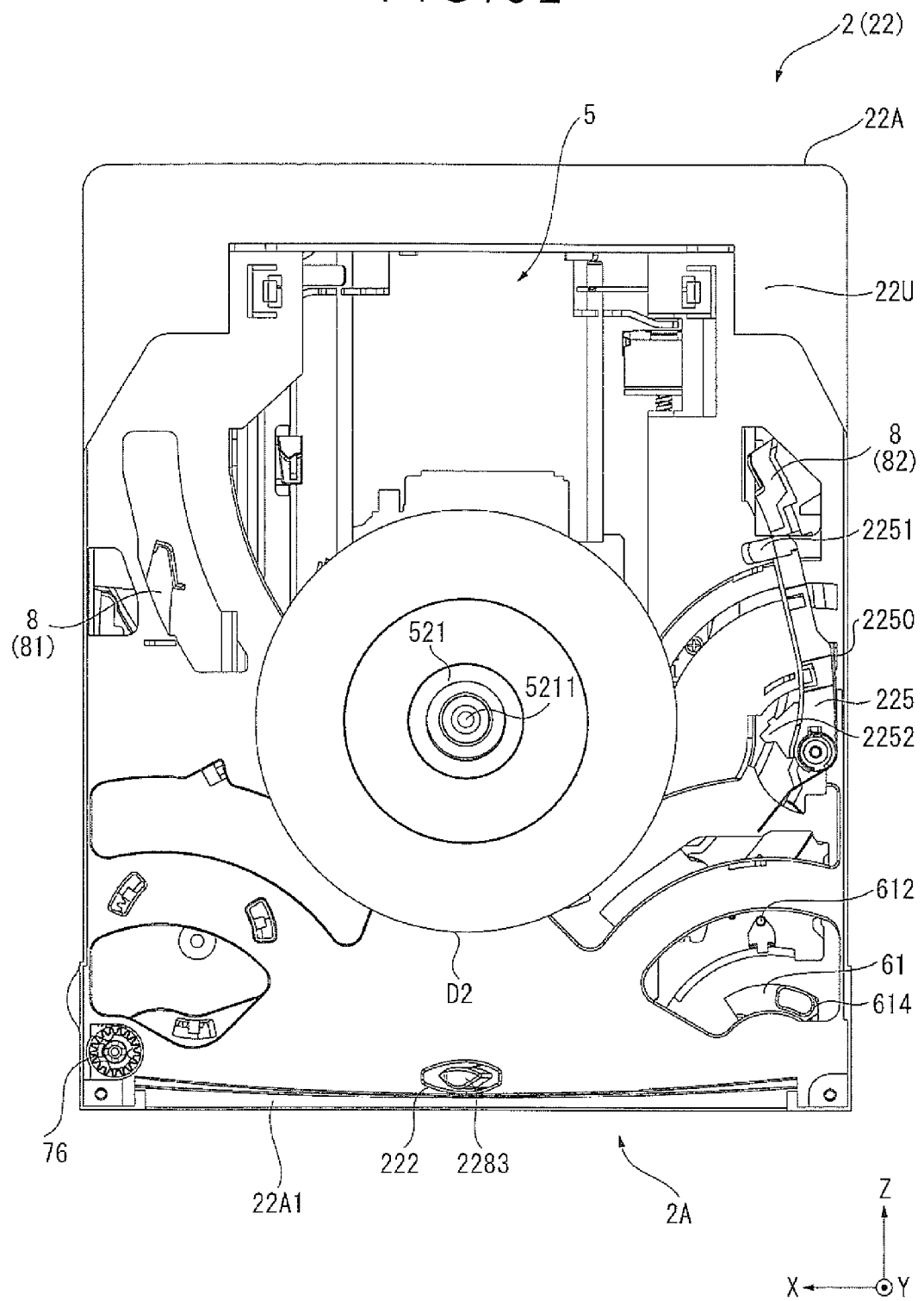
FIG. 32 is a schematic view illustrating movement of the embodiment of FIG. 1 upon loading of the second disk.

Further, as seen in FIG. 32, the support arm 225 is pivoted in a direction in which it is spaced away from the disk D2 and retracted to the peripheral edge side of the lower frame 22A. Further, similarly as in the case of loading of the disk D1, upward movement of the optical apparatus 5 is carried out, and the fitting portion 5211 of the turntable 521 is fitted into the hole at the center of the disk D2. Further, the lock lever 228 is pivoted so that the projection 2283 projects to the upper face 22U side through the opening 222. The insertion opening 2A is locked thereby.

Figure 33:
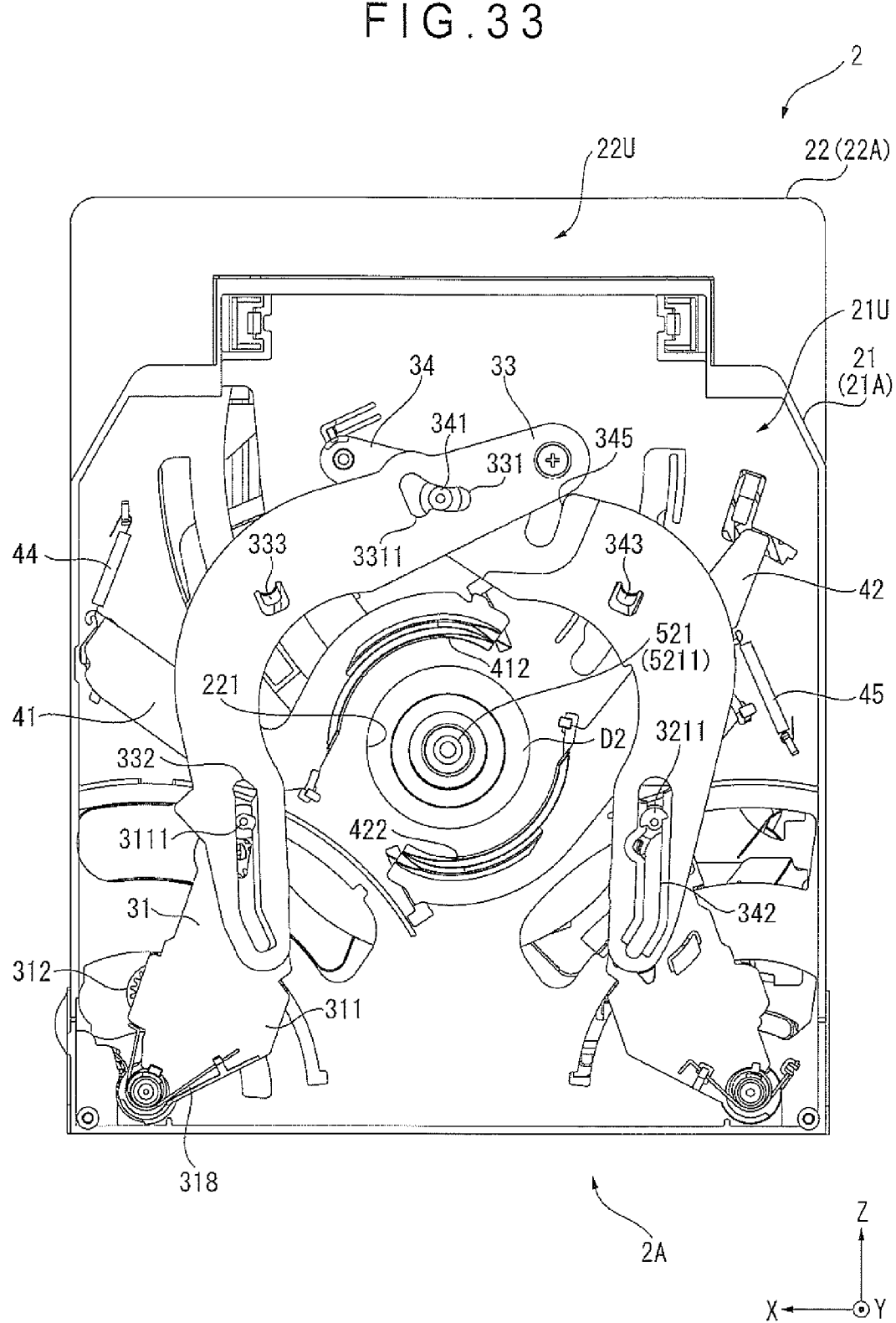
FIG. 33 is a schematic view illustrating movement of the embodiment of FIG. 1 upon loading of the second disk.

In addition, the chuck arms 41 and 42 are pivoted by the second slide cam 82 as seen in FIG. 33, and the abutting portions 412 and 422 are spaced away from the chuck pulley 43 not shown. Consequently, the chuck pulley 43 is placed into a free state, and the disk D2 is chucked by the chuck pulley 43 and the upwardly moved turntable 521.

Figure 30:
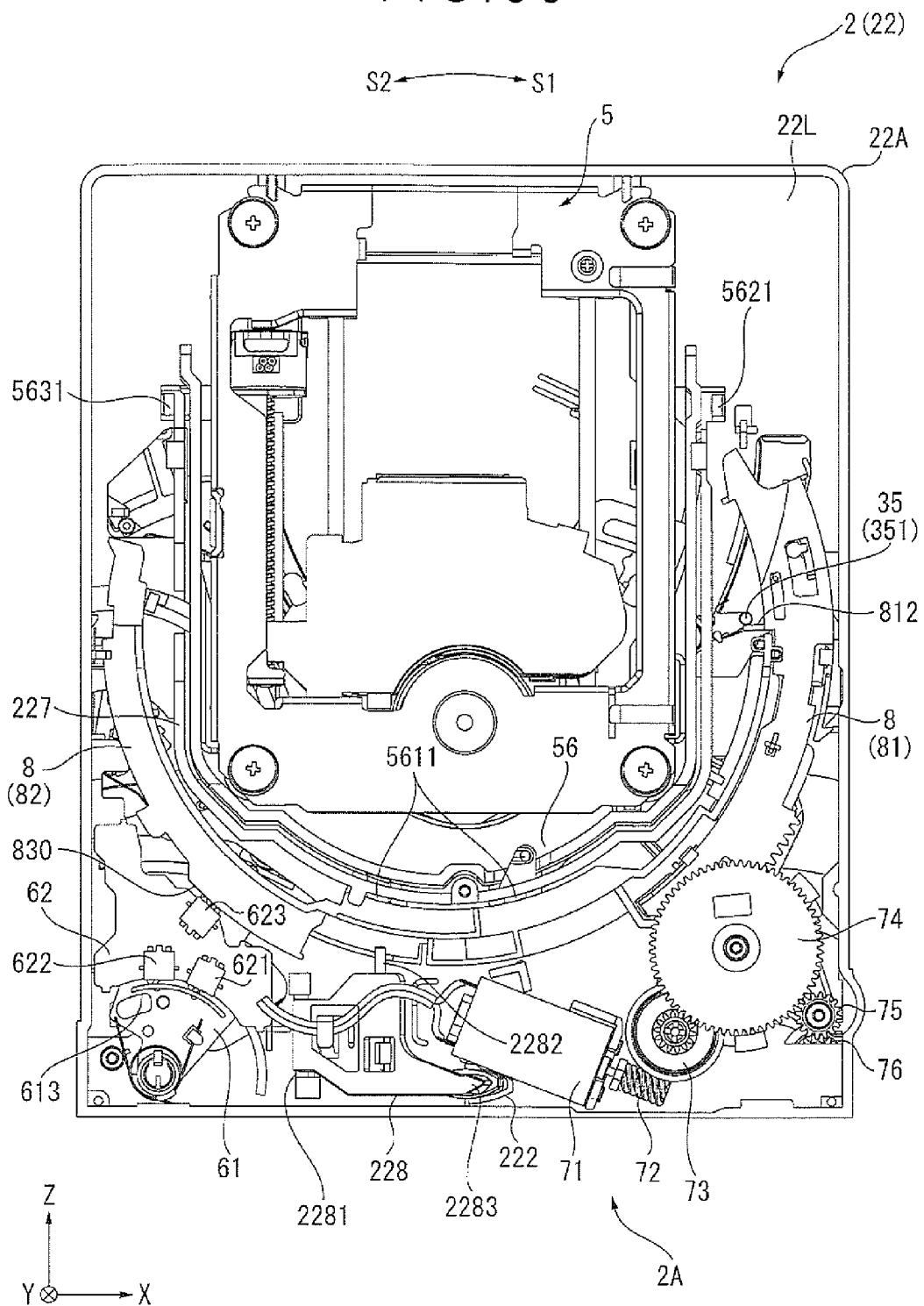
FIG. 30 is a schematic view illustrating movement of the embodiment of FIG. 1 upon loading of the second disk.

It is to be noted that, if the chucking of the disk D2 is completed and the pressing of the pressing portion 830 against the switch 623 shown in FIG. 30 is canceled, then a stopping signal is outputted from the control board 62. Consequently, the driving of the motor 71 is stopped. The loading of the disk D2 is completed therewith.

It is to be noted that, when the disk D1 or D2 is to be unloaded, the associated members move in the opposite directions to the moving directions described hereinabove, and the disk D1 or D2 is unloaded from the insertion opening 2A. Thereupon, when the switch 622 is placed into an off state, that is, when the pressing of the pressing portion 613 against the switch 622 is canceled, the control board 62 outputs a stopping signal to the motor 71. Consequently, the unloading operation is stopped in a state in which the disk D1 or D2 is grasped by the grasping members 312 and 322 or the grasping members 313 and 323. Consequently, the disk D1 or D2 is prevented from coming off from the insertion opening 2A.

With the disk apparatus 1 according to the present embodiment described hereinabove, the following advances are achieved.

(1) A disk D1 or D2 loaded can be disposed appropriately to the loaded position by the restricting portions 333 and 343 provided at positions of the link arms 33 and 34 on the leading end side in the Z direction without provision of other arms and so forth. Accordingly, a disk can be loaded appropriately to the loaded position by the simple configuration. Further, the disk D1 or D2 can be chucked appropriately by the chuck pulley 43 and the turntable 521, and at least one of reading and recording of information from and on the disk D1 or D2 can be carried out appropriately by the pickup 55. Accordingly, the reliability of the disk apparatus 1 can be enhanced.

(2) Since the link arms 33 and 34 have a curved shape, particularly, a substantially arcuate shape, in comparison with an alternative case wherein the link arms 33 and 34 have a substantially linear shape, the range of movement of the end portions of the link arms 33 and 34 on the opposite side to the pivot shafts RA3 and RA4 side can be made small. Accordingly, miniaturization of the disk apparatus 1 can be anticipated. Further, since the range of movement of the end portions can be made small, the space within the upper frame 21A and the lower frame 22A can be utilized effectively, and besides interference of the link arms 33 and 34 with the other component parts of the disk apparatus 1 can be suppressed.

(3) The restricting portions 333 and 343 are provided on the link arms 33 and 34 in a substantially symmetrical relationship to each other with respect to the virtual straight line L. Consequently, substantially symmetrical positions of the disk D1 or D2 with respect to the virtual straight line L can be restricted by the restricting portions 333 and 343. Accordingly, in comparison with an alternative case wherein only one restricting portion is provided at one place of one of the link arms, the disk D1 or D2 is not displaced, and the disk D1 or D2 can be placed on the loaded position with certainty.

(4) An end edge of the disk D1 or D2 loaded to the loaded position is abutted with the restricting portions 333 and 343 and besides is grasped by the grasping members 313 and 323. According to the configuration just described, since the disk D1 or D2 can be supported at four points thereof, the disk D1 or D2 can be placed stably and with certainty at the loaded position.

(5) One end of each of the link arms 33 and 34 which serves as the pivot shaft RA3 or RA4 is positioned on the leading end side in the Z direction with respect to the position of the loaded position, that is, of the center of the turntable 521 at the moved up position. With the configuration just described, even in the case where the link arms 33 and 34 are opened by a great amount in response to pivotal motion of the front arms 31 and 32, since the range of movement of the restricting portions 333 and 343 is small, position setting of the restricting portions 333 and 343 can be carried out readily. Further, since the positions of the restricting portions 333 and 343 are not displaced by a great amount from the virtual straight line L, the restricting portions 333 and 343 can be abutted with certainty with an end edge of the disk D1 or D2 loaded to the loaded position to appropriately control the disk D1 or D2.

(6) Since the projection 341 is inserted in the slot 331 formed in accordance a locus of the projection 341 when the link arm 34 pivots, the link arms 33 and 34 can be pivoted in synchronism with each other by an equal pivoting amount, and consequently, the front arms 31 and 32 can be pivoted in synchronism with each other by an equal pivoting amount. Accordingly, since the front arms 31 and 32 can be pivoted with certainty in a symmetrical relationship with each other with respect to the virtual straight line L, the disk D1 or D2 can be loaded while being centered by the front arms 31 and 32.

(7) If the disk D2 is inserted in a one-sided state to the front arm 31 side, then a load to the leading end side in the Z direction is applied to the front arm 31 and the link arm 33. If the link arms 33 and 34 tend to be pivoted in this state, then the projection 341 slidably moves along an end edge of the slot 331 on the side near to the center of the loaded position, that is, along an end edge on the trailing end side in the Z direction until it is fitted into the restricting portion 3311. By the configuration just described, pivotal motion of the link arms 33 and 34 upon loading of the disk D2 can be suppressed, and hence pivotal motion of the front arms 31 and 32 can be suppressed. Accordingly, the disk D2 can be prevented from being loaded without being centered.

Further, the slot 331 and the restricting portion 3311 are formed on the link arm 33 with which they are engaged with the front arm 31 upon which biasing force lower than that by the torsion coil spring 324 acts from the torsion coil spring 318. According to the configuration just described, when the disk D2 is inserted into the insertion opening 2A in a one-sided state to the front arm 31 side, the projection 341 of the link arm 34 which engages with the front arm 32 upon which high biasing force acts can be caused to slidably move with certainty along an end edge of the slot 331 on the side near to the center of the loaded position. Consequently, the projection 341 can be fitted into the restricting portion 3311. Accordingly, pivotal motion of the arms 31 to 34 can be restricted with certainty, and the disk D2 can be prevented from being loaded without being centered. Further, by a difference in biasing force between the torsion coil springs 318 and 324 as such biasing members, rattling of the front arms 31 and 32 can be prevented.

(8) Similarly, when a disk D2 is thrown into the insertion opening 2A in a one-sided state to the front arm 31 side, a load is applied to the front arm 31 and the link arm 33, and the projection 3211 of the front arm 32 slidably moves along an end edge of the slot 342 of the link arm 34 on the center side of the loaded position. Then, the arms 31 to 34 are pivoted and the projection 3211 is fitted into the restricting portion 3421. Consequently, further pivotal motion of the arms 31 to 34 can be restricted. Accordingly, the disk D2 can be prevented from being loaded without being centered.

Further, since such a restricting portion 3421 as described above is formed on the link arm 34 which engages with the front arm 32 upon which high biasing force acts, similarly as in the case of the slot 331 and the restricting portion 3311 described hereinabove, pivotal motion of the arms 31 to 34 when the disk D2 is inserted in a one-sided state to the front arm 31 side can be restricted with certainty. Accordingly, the disk D2 can be prevented from being loaded without being centered with certainty.

(9) In a closed state in which the link arms 33 and 34 are closed, that is, in a state in which no disk is loaded, pivotal motion of the chuck arms 41 and 42 in a direction in which they are spaced away from the chuck pulley 43 is restricted. According to the configuration just described, in this closed state, the chuck pulley 43 does not become free and does not move in a direction in which it approaches the turntable 521. Accordingly, engagement of the chuck pulley 43 with the turntable 521 to disturb loading of the disk D1 or D2 in a state in which no disk is loaded can be prevented.

(10) The inclined portion 8392 is inclined in both of the direction of arcuate movement of the second slide cam 82 and the direction along the axis of arcuate movement of the second slide cam 82, that is, along the Y direction. Then, the projections 5611 are inserted into the guide grooves 839, and when the second slide cam 82 is arcuately moved, then the end portion of the holder 56 on the base portion 561 side is moved along the axis of arcuate movement of the second slide cam 82. With the configuration just described, since the holder 56 can be moved relative to the second slide cam 82, there is no necessity to provide members, which slidably move in the opposite directions to each other along the lower frame 22A, on the opposite sides of the optical apparatus 5. Accordingly, the configuration for moving the rotating apparatus 52 in the directions in which the rotating apparatus 52 moves toward and away from a disk can be simplified, and hence the configuration of the disk apparatus 1 can be simplified.

(11) Since the holder 56 is supported for pivotal motion on the lower frame 22A around the shaft portions 5621 and 5631, pivotal motion of the holder 56 around the axis of arcuate movement of the second slide cam 82 can be restricted. Further, since the second slide cam 82 is arcuately moved along the lower frame 22A, the end portion of the holder 56 on the base portion 561 side moves along the axis of arcuate movement of the second slide cam 82. With the configuration just described, the end portion of the holder 56 on the base portion 561 side can be moved without forming the second slide cam 82 in a shape which surrounds the overall periphery of the optical apparatus 5. Accordingly, miniaturization of the second slide cam 82 can be anticipated, and hence miniaturization of the disk apparatus 1 can be anticipated.

(12) If the second slide cam 82 is positioned otherwise on the opposite side to the insertion opening 2A with respect to the rotating apparatus 52, then it is necessary to dispose the second slide cam 82 on the outer side with respect to the pickup 55 which moves along a diametrical direction of the disk. Therefore, the dimension of the lower frame 22A in the loading direction of a disk, that is, in the Z direction, becomes great, which gives rise to increase in size of the disk apparatus 1.

In contrast, in the case where the second slide cam 82 is provided between the insertion opening 2A and the rotating apparatus 52, the space in the lower frame 22A can be utilized effectively. Accordingly, miniaturization of the lower frame 22A and hence the disk apparatus 1 can be anticipated.

(13) Since the insertion opening 2A is closed up by the lock lever 228 upon arcuate movement of the second slide cam 82, another disk can be prevented from being inserted into the insertion opening 2A. Accordingly, another disk can be prevented from engaging with the chuck pulley 43 and the rotating apparatus 52 between which the disk loaded already is sandwiched.

(14) If a disk is loaded to the loaded position by the transport apparatus 3, then since arcuate movement of the first slide cam 81 and the second slide cam 82 is started, the optical apparatus 5 can be moved up rapidly. Accordingly, rotation of a disk and a reading/recording operation of information from/on the disk can be carried out rapidly.

(15) If a disk is loaded to the loaded position or chucking position, then the first slide cam 81 is pressed by the pressing portion 351 of the detection lever 35 to slidably move in the S1 direction until the rack portion 817 is brought into meshing engagement with the gear wheel 74. Then, by rotation of the gear wheel 74, the first slide cam 81 is slidably moved in the S1 direction so that the projection 819 arcuately moves the second slide cam 82 in the S1 direction. With the configuration just described, since the first slide cam 81 and the second slide cam 82 can be arcuately moved by rotating force of the gear wheel 74, that is, by driving force generated by the motor 71, driving force required for arcuate movement of the second slide cam 82 and upward and downward movement of the optical apparatus 5 can be assured.

Further, since the transport apparatus 3 slidably moves the first slide cam 81 which is smaller than the second slide cam 82, the force from the transport apparatus 3 to be acted upon the lifting apparatus 8, that is, the force upon starting of upward movement of the optical apparatus 5 can be reduced. Accordingly, arcuate movement of the second slide cam 82 and upward and downward movement of the optical apparatus 5 can be carried out with certainty.

(16) The detection lever 35 is abutted with and pivoted by an end edge of a disk inserted to the proximity of the loaded position to press the first slide cam 81 to slidably move in the S1 direction. With the configuration just described, when the disk is fully loaded to the loaded position, the first slide cam 81 and the second slide cam 82 can be arcuately moved with certainty. Accordingly, loading of a disk and movement of the optical apparatus 5 can be synchronized with certain with each other.

(17) A disk inserted in the insertion opening 2A is grasped by the grasping members 312 and 313 of the front arm 31 and the grasping members 322 and 323 of the front arm 32 and is loaded by rotation of the grasping members 312 and 313 and pivotal motion of the front arms 31 and 32. With the configuration just described, since the disk can be loaded in a state in which it is sandwiched by the front arms 31 and 32 in pair, the disk can be loaded into the apparatus main body 2 while being centered.

Further, the grasping members 312 and 313 are rotated by driving force generated by the motor 71 and transmitted by the gear wheels 72 to 76. With the configuration just described, arcuate movement of the slide cams and transportation of a disk by the transport apparatus 3 can be carried out by driving force generated by the motor 71. Accordingly, in comparison with an alternative case in which a mechanism for generating driving force to move the optical apparatus 5 up and down and a mechanism for generating driving force necessary for transportation of a disk are provided separately, the configuration of the disk apparatus 1 can be simplified.

(18) Upon arcuate movement of the second slide cam 82, the swing arm 77 which engages with the second slide cam 82 is pivoted, whereupon the gear wheel 75 is spaced away from the gear wheel 74. With the configuration just described, since the rotation of the grasping members 312 and 313 is stopped in response to the arcuate movement of the second slide cam 82 which is started when the disk is inserted to the loaded position, driving force necessary for arcuate movement of the second slide cam 82 can be assured. Accordingly, the second slide cam 82 can be arcuately moved with certainty, and hence the optical apparatus 5 can be moved with certainty.

(19) Upon arcuate movement of the second slide cam 82, the front arms 31 and 32 are spaced away from a loaded disk. With the configuration just described, when a disk is rotated by the rotating apparatus 52, the front arms 31 and 32, particularly the grasping members 312 and 323, can be prevented from obstructing rotation of the disk. Accordingly, the disk can be rotated appropriately and with certainty.

(20) In a state in which the second slide cam 82 is not arcuately moved, that is, in a state in which no disk is loaded, since the chuck pulley 43 is supported on the chuck arms 41 and 42, insertion of a disk can be prevented from being obstructed by the chuck pulley 43. Further, when the second slide cam 82 arcuately moves, since the chuck arms 41 and 42 are spaced away from the chuck pulley 43, the disk can be held or chucked with certainty by and between the chuck pulley 43 and the turntable 521. Accordingly, when the second slide cam 82 is arcuately moved and a disk is loaded to the loaded position, sandwiching by the chuck pulley 43 and the turntable 521 can be carried out with certainty.

2. Second Embodiment

In the following, a disk apparatus according to a second embodiment of the disclosed technology is described. The disk apparatus of the present embodiment has a configuration similar to that of the disk apparatus 1 described hereinabove. However, the disk apparatus of the present embodiment is different from the disk apparatus 1 in that one of the chuck arms has a restricting portion for restricting, upon completion of loading of a disk D1, pivotal motion of the front arms and the link arms in a direction in which they approach the disk D1.

Figure 34:
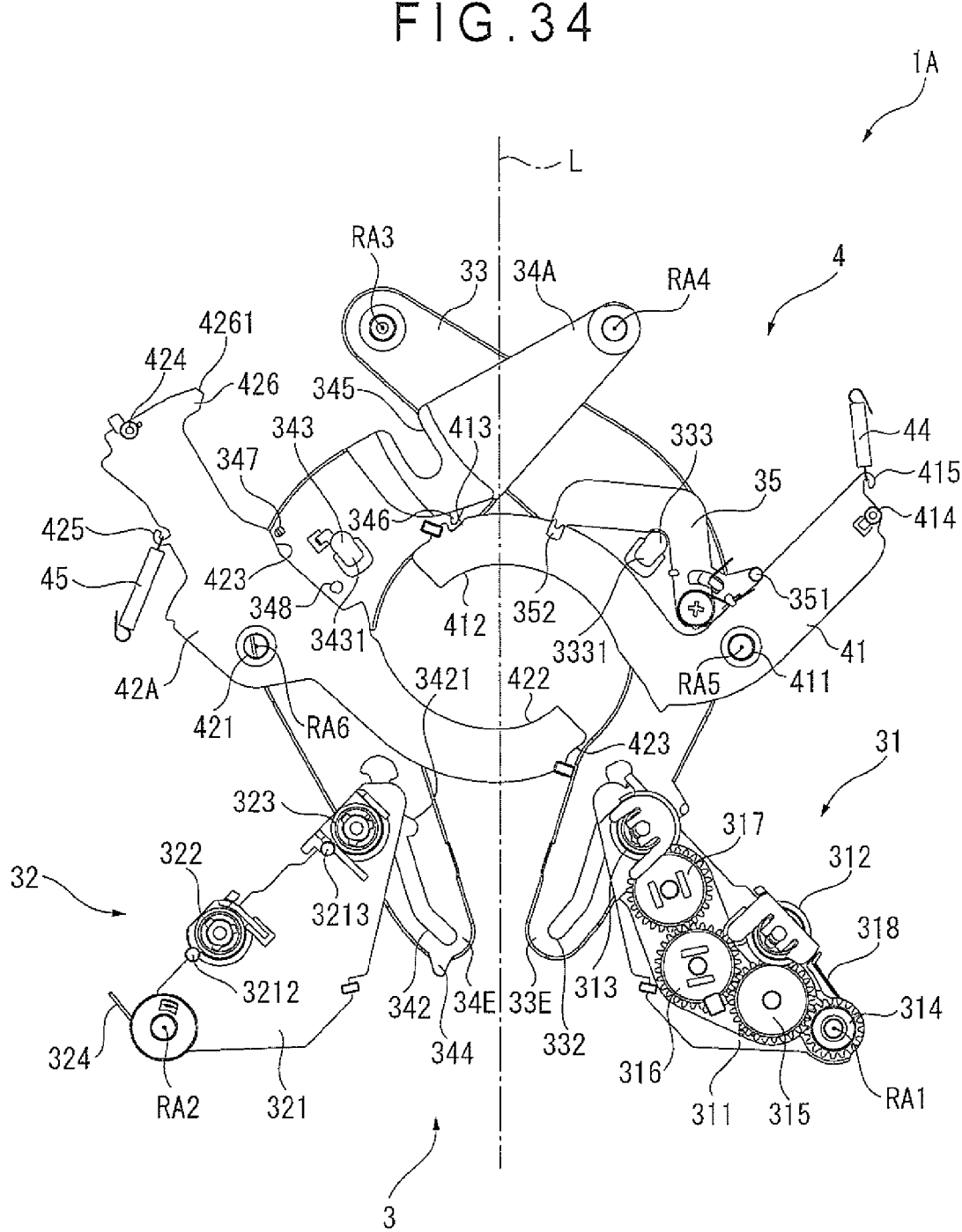
FIG. 34 is a schematic view showing a link arm and a chuck arm of a disk apparatus according to a second embodiment of the disclosed technology.

FIG. 34 shows a link arm 34A and a chuck arm 42A provided in the disk apparatus 1A according to the present embodiment. Referring to FIG. 34, the disk apparatus 1A according to the present embodiment is similar in configuration to the disk apparatus 1 described hereinabove except that it includes the link arm 34A and the chuck arm 42A in place of the link arm 34 and the chuck arm 42, respectively.

The link arm 34A has a configuration and a function similar to those of the link arm 34 described hereinabove except that it further has a pivotal motion restricting portion 348 as seen from FIG. 34. The pivotal motion restricting portion 348 corresponds to a first pivotal motion restriction portion, and when a disk D1 of a large diameter is loaded, the pivotal motion restricting portion 348 is engaged with the chuck arm 42A to restrict pivotal motion of the link arm 34A and hence lock and maintain the arms 31 to 33 and 34A in a state in which the front arms 31 and 32 are spaced away from the disk D1. It is to be noted that, in the present embodiment, the pivotal motion restricting portion 348 is formed as a projection at a position thereof near to the chuck arm 42A in the proximity of the restricting portion 343 such that it projects in a direction in which it approaches the upper face 21U not shown.

The chuck arm 42A has a configuration and a function similar to those of the chuck arm 42 described hereinabove except that it further has a restricting portion 426. The restricting portion 426 is formed in a hooked shape such that it projects from an end portion of the chuck arm 42A at which the protrusion 424 is formed toward the pivot shafts RA3 and RA4 of the link arms 33 and 34. The restricting portion 426 has at an end portion thereof an inclined portion 4261 inclined in a direction in which it is spaced away from a pivot shaft RA6 of the chuck arm 42A toward the end portion. The inclined portion 4261 pushes up the pivotal motion restricting portion 348 described hereinabove upon completion of loading of a disk D1.

Figure 35:
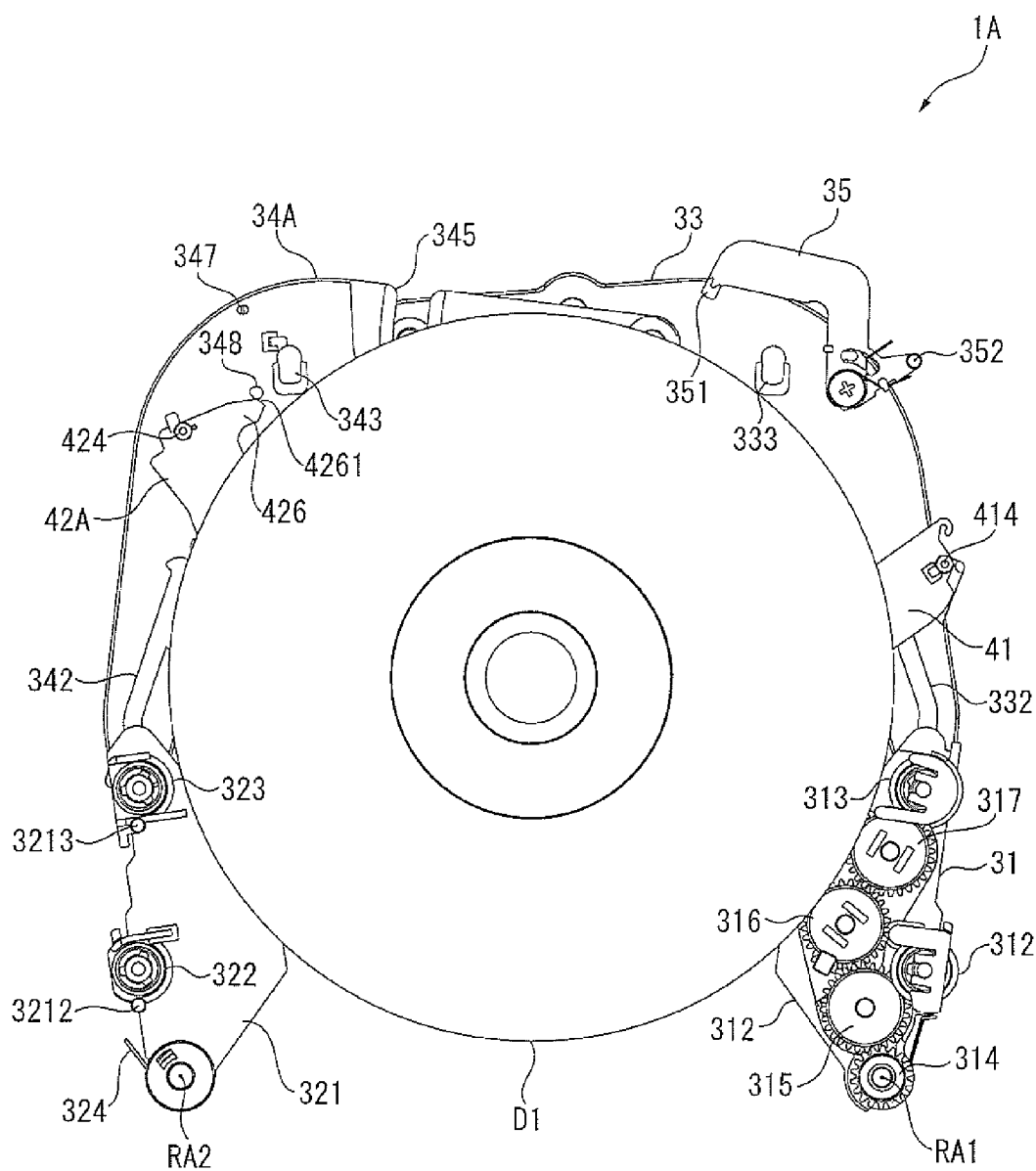
FIG. 35 is a schematic view illustrating movement of the embodiment of FIG. 34 upon loading of a first disk.

FIG. 35 shows the transport apparatus 3 and the chuck apparatus 4 upon completion of loading of a disk D1. In particular, referring to FIG. 35, when loading of a disk D1 is completed and the second slide cam 82 is arcuately moved, the chuck arms 41 and 42A are pivoted in a direction in which they are spaced away from the chuck pulley 43 as described hereinabove. Consequently, as seen in FIG. 35, the inclined portion 4261 is abutted with the pivotal motion restricting portion 348 to push up the pivotal motion restricting portion 348 upon pivotal motion of the chuck arm 42A. Then, when the second slide cam 82 is further arcuately moved, the front arms 31 and 32 are pivoted in a direction in which they are spaced away from the disk D1 and the link arms 33 and 34A are pivoted in a direction in which end portions 33E and 34E on which the slots 332 and 342 are formed are spaced away from each other.

In this state, even if the link arms 33 and 34A tend to pivot in directions in which the end portions 33E and 34E approach each other by the biasing force of the torsion coil springs 318 and 324, since the restricting portion 426 is positioned within the range of movement of the pivotal motion restricting portion 348, pivotal motion of the link arms 33 and 34A is restricted first. As a result, also pivotal motion of the front arms 31 and 32 in a direction in which they approach the disk D1 is restricted. Consequently, the pivotal motion of the arms 31 to 34A becomes great, and upon completion of loading of the first disk D1 with which the biasing force of the torsion coil springs 318 and 324 acts strongly upon the arms 31 to 34A, the grasping members 313 and 323 and the restricting portions 333 and 343 can be spaced away from the first disk D1 with certainty.

With the disk apparatus 1A according to the present embodiment described above, similar advantages to those of the disk apparatus 1 described hereinabove can be achieved.

It is to be noted that, upon completion of loading of the second disk D2, the biasing force does not strongly act upon the arms 31 to 34A, and besides, since the space into which the arms are to be retracted from the disk D2 can be assured, the grasping members 313 and 323 and the restricting portions 333 and 343 can be spaced away from the disk D2 with certainty.

Further, since, upon pivotal motion of the chuck arm 42A, an end edge on the inner diameter side of the chuck arm 42A which moves from the restricting portion 423 to the restricting portion 426 pushes up the pivotal motion restricting portion 348, the arms 31 to 34A can be pivoted in a direction in which they are spaced away from the disk D2, and the grasping members 313 and 323 and the restricting portions 333 and 343 can be spaced away from the disk D2 with certainty. Accordingly, the front arms 31 and 32 can be prevented from interfering with the loaded disk D1 or D2, and rotation of the disk D1 or D2 by the turntable 521 can be prevented from being disturbed.

It is to be noted that the pivotal motion restricting portion 348 as a first pivotal motion restricting portion may otherwise be provided on the link arm 33 or else may be provided on each of the link arms.

3. Modifications to the Embodiments

The technology disclosed herein is not limited to the embodiments described above but includes modifications, improvements and so forth within a range within which the advantages provided by the technology can be achieved.

In the embodiments described above, the link arm 33 has the restricting portion 333 while the link arm 34 or 34A has the restricting portion 343, and the restricting portions 333 and 343 are disposed substantially symmetrical with each other with respect to the virtual straight line L. However, the disclosed technology is not limited to this. In particular, a restricting portion for restricting movement of a disk to the leading end side in the loading direction of the disk from the loaded position such as, for example, the chucking position may be provided on at least one of a pair of link arms. Further, the number, position, shape and so forth of such restricting portions may be set suitably. Further, a restricting portion for restricting movement of a first disk D1 and a restricting portion for restricting movement of a second disk D2 may be provided separately from each other.

While, in the embodiments described above, the link arms 33, 34 and 34A have substantially L shapes in plan symmetrical with each other, the disclosed technology is not limited to this. In particular, the link arms 33, 34 and 34A may otherwise have arcuate shapes or linear shapes. Further, while the pivot shafts RA3 and RA4 of the link arms 33 and 34 or 34A are positioned on the leading end side in the Z direction from the center of the turntable 521 corresponding to the center of the loaded position, the disclosed technology is not limited to this and they may otherwise be positioned on the trailing end side in the Z direction. Also in this instance, if the restricting portions are provided at positions on the trailing end side in the Z direction with respect to the loaded position, then advantages similar to those of the disk apparatus 1 and 1A described hereinabove can be achieved. Further, the pivot shaft RA3 of the link arm 33 and the pivot shaft RA4 of the link arm 34 or 34A may coincide with each other.

While, in the embodiments described above, when a disk D1 or D2 is loaded to the loaded position or chucking position, an end edge of the disk D1 or D2 is supported at four points thereof by the restricting portions 333 and 343 and the grasping members 312 and 323, the disclosed technology is not limited to this. In particular, if it is possible for the restricting portions 333 and 343 to keep the disk D1 or D2 at the loaded position, the grasping members 313 and 323 need not necessarily grip the disk D1 or D2. Or, an end edge of a disk may otherwise be supported by at least one of a plurality of restricting portions and at least one of a plurality of grasping members.

While, in the embodiments described hereinabove, the projection 341 which the link arm 34 or 34A has is inserted into the slot 331 which the link arm 33 has such that the link arm 33 and the link arm 34 or 34A are combined in a mutually crossing relationship with each other, the disclosed technology is not limited to this. For example, a plurality of teeth may be formed around an end portion which serves as an axis of pivotal motion of each link arm such that the teeth of the link arms mesh with each other so that the link arms are pivoted in synchronism with each other. Or the link arm 34 or 34A may have a grooved portion while the link arm 33 has a projection.

While, in the embodiments described above, a slot 331 cut out from the position of the projection 341 in a state in which a disk D1 or D2 is not loaded toward the center side of the loaded position is formed on the slot 331, the disclosed technology is not limited to this. In particular, the restricting portion 3311 may not be provided if a disk D2 inserted to the proximity of an end portion of the insertion opening 2A can be centered and loaded to the loaded position.

While, in the embodiments described hereinabove, the restricting portion 3421 is formed on the slot 342, the disclosed technology is not limited to this. In other words, a cutout may be formed on the slot 332, or a cutout may be provided on the slots 332 and 342.

While, in the embodiments described hereinabove, the front arms 31 and 32 are biased in a direction in which they approach the insertion opening 2A by the torsion coil springs 318 and 324, respectively, the disclosed technology is not limited to this. For example, a biasing member such as a tension coil spring may be adopted. Further, while it is described that the biasing force of the torsion coil spring 324 is stronger than that of the torsion coil spring 318, the disclosed technology is not limited to this, and the biasing force of the torsion coil spring 318 may otherwise be stronger or the torsion coil springs 318 and 324 may have equal biasing force.

While, in the embodiments described above, the front arm 31 includes the substantially cylindrical grasping members 312 and 313 which grasp a disk and rotate to transport the disk and the front arm 32 has a grasping member having a substantially same shape as that of the grasping members 312 and 313 for grasping a disk and besides the grasping member is fixed, the disclosed technology is not limited to this. In particular, the front arms 31 and 32 may be configured such that they have, as grasping members, rollers which grasp a disk and individually rotate. In this instance, preferably the roller of the front arm 31 and the roller of the front arm 32 rotate in the opposite directions to each other. Or, the front arm 32 may include a roller which rotates as a grasping member while the front arm 31 includes a fixed grasping member. Further, the number, position and shape of such grasping members and rollers may be set suitably.

While, in the embodiments described above, the entire optical apparatus 5 moves upwardly or downwardly along an axis of arcuate movement of the second slide cam 82, that is, in the Y direction, in response to arcuate movement of the second slide cam 82, the disclosed technology is not limited to this. In particular, the object which is moved by the lifting apparatus 8 having the second slide cam 82 may be only the rotating apparatus 52 or only the pickup 55.

While, in the embodiments described above, the second slide cam 82 is formed in a substantially semicircle which covers the base portion 561 of the holder 56 and a region of approximately ¾ the extensions 562 and 563 in the proximity of the insertion opening 2A, the disclosed technology is not limited to this. In particular, the second slide cam 82 need only have a portion formed in a substantially arcuate shape, and for example, a substantially circular shape which surrounds the overall periphery of the optical apparatus 5 or may be a substantially arcuate shape corresponding only to the base portion 561. It is to be noted that, if the second slide cam has a substantially circular shape which surrounds the overall periphery of the optical apparatus 5 and arcuate movement of the optical apparatus 5 in the direction same as arcuate movement of the second slide cam is restricted by the guide portion 227 and the like, then the entire optical apparatus 5 may be moved along the Y direction.

While, in the embodiments described hereinabove, the second slide cam 82 has the guide grooves 839 and the holder 56 has the projections 5611 which are inserted into the guide grooves 839, the disclosed technology is not limited to this. In particular, the holder may have guide grooves while the second slide cam has projections which are inserted into the guide grooves. Further, while the holder 56 has the two projections 5611, the disclosed technology is not limited to this, and the number of such projections 5611 may be one or three or more.

While, in the embodiments, the second slide cam 82 is provided between the insertion opening 2A and the rotating apparatus 52, the disclosed technology is not limited to this. In particular, the second slide cam 82 may be disposed on the opposite side to the insertion opening 2A with respect to the rotating apparatus 52. Further, while the optical apparatus 5 is disposed such that the pickup 55 moves along the loading direction of a disk, that is, along the Z direction, the disclosed technology is not limited to this. The optical apparatus 5 may otherwise be disposed such that the direction of movement of the pickup 55 is inclined with respect to the loading direction of a disk.

While, in the embodiments described hereinabove, when a disk is loaded to the chucking position and the second slide cam 82 is arcuately moved, the insertion opening 2A is closed up by the lock lever 228, the disclosed technology is not limited to this. In particular, such a lock lever 228 as just described may not be provided, but the insertion opening 2A may be closed up by some other configuration.

While, in the embodiments described hereinabove, the first slide cam 81 is slidably moved along the second slide cam 82 by the detection lever 35 and the rack portion 817 is brought into meshing engagement with the gear wheel 74, the disclosed technology is not limited to this. In particular, the first slide cam 81 may be slidably moved by some other configuration which configures the transport apparatus 3, that is, by the front arms 31 and 32 and the link arms 33 and 34. Further, the transport apparatus 3 may slidably move the second slide cam directly without provision of the first slide cam 81. In this instance, the second slide cam may have a rack portion for meshing with the gear wheel 74. A further different configuration may be adopted wherein, when the first slide cam slidably moves the second slide cam 82 in the S1 direction, the rack portion is brought into meshing engagement with the gear wheel 74 so that the second slide cam is further arcuately moved in the S1 direction.

While, in the embodiments described hereinabove, the transport apparatus 3 includes a pair of front arms 31 and 32 and a pair of link arms 33 and 34, the disclosed technology is not limited to this. In particular, the configuration for transporting a disk may be some other configuration. For example, a tray on which a disk is to be placed from the apparatus main body 2 may be projected and retracted in place of the transport apparatus 3. In this instance, the second slide cam may be configured so as to be arcuately moved in response to retraction of the tray.

While, in the embodiments described hereinabove, the swing arm 77 is engaged with the guide groove 824 of the second slide cam 82 to bring the gear wheel 75 out of meshing engagement with the gear wheel 74 in response to arcuate movement of the second slide cam 82, the disclosed technology is not limited to this. In particular, such a swing arm 77 as described above need not be provided, but the grasping members 312 and 313 may continue to rotate until the arcuate movement of the second slide cam 82 is stopped.

While, in the embodiments described hereinabove, when the second slide cam 82 arcuately moves in the S1 direction, it pivots the front arms 31 and 32 in a direction in which they are spaced away from an end edge of a disk and pivots the chuck arms 41 and 42 or 42A in a direction in which they are spaced away from the chuck pulley 43, the disclosed technology is not limited to this. In particular, some other member than the second slide cam 82 may pivot the arms mentioned.

While, in the embodiments described hereinabove, the disk loading apparatus according to the disclosed technology is applied to the disk apparatus 1 and 1A, the disclosed technology is not limited to this. For example, the disclosed technology may be adopted by a working apparatus for working a disk. Further, while the disk apparatus 1 and 1A have a configuration for unloading a disk D1 or D2 loaded in the inside thereof, the disclosed technology is not limited to this. In particular, a discharge port through which a disk is to be discharged may be formed separately from the insertion opening such that a disk is discharged through the discharge port. Further, while the disk apparatus 1 carries out reading and recording of information from and on a disk D1 or D2 loaded therein, the disclosed technology is not limited to this, but it may otherwise carry out one of reading and recording. Further, while the first disk D1 has a diameter of 12 cm and the second disk D2 has another diameter of 8 cm, the disclosed technology is not limited to this. In particular, if the diameter of the second disk is smaller than that of the first disk, then the diameter of the disks may be set suitably. Further, while the disk apparatus 1 is configured such that both of the first disk D1 and the second disk D2 can be transported, it may otherwise be configured such that it can transport one of the first disk D1 and the second disk D2.

The technology disclosed herein can be applied to a disk loading apparatus for loading a disk and particularly to a disk apparatus of the slot-in type.

The invention claimed is:

1. A disk loading apparatus for loading a disk to a loaded position, comprising:

an apparatus body having an insertion opening corresponding to a diametrical dimension of the disk and having the loaded position therein to which the disk inserted into the insertion opening is to be positioned;

a pair of front arms disposed in a substantially symmetrical relationship with each other with respect to a virtual straight line extending along the loading direction of the disk and passing a substantially central position of the insertion opening and supported at one end thereof for pivotal motion in the proximity of the opposite ends of the insertion opening such that the other ends thereof are spaced away from each other to load the disk; and a pair of link arms disposed in a substantially symmetrical relationship with each other around the virtual straight line and in a crossing relationship with each other and supported at one end thereof for pivotal motion such that the other ends thereof are spaced away from each other to synchronize the pivotal motion of the front arm with which one of said link arms is engaged and the pivotal motion of the front arm with which the other of said link arms is engaged with each other, wherein at least one of said link arms has a restricting portion adapted to abut with an end edge of the disk loaded to the loaded position to restrict the movement of the disk to a leading end side in the loading direction.

2. The disk loading apparatus according to claim 1, wherein each of said link arms has a curved shape and is disposed such that the inner side of the curved shape is directed to a center of the loaded position.

3. The disk loading apparatus according to claim 1, wherein:

each of said link arms has the restricting portion, and the restricting portions are disposed in a substantially symmetrical relationship with each other with respect to the virtual straight line on the leading end side in the loading direction with respect to a center of the loaded position.

4. The disk loading apparatus according to claim 1, wherein said front arms have grasping members provided at substantially symmetrical positions with respect to the virtual straight line and adapted to abut with an end edge of the disk to grasp the disk;

the grasping member which at least one of said front arms has being a roller for transporting the disk;

the restricting portion leaving, when the restricting portion abuts with the disk, the disk at the loaded position together with said grasping members.

5. The disk loading apparatus according to claim 1, wherein:

the one end of each of said link arms which acts as a pivot shaft is positioned on the leading end side in the loading direction with respect to a center of the loaded position; and the other end of each of said link arms is engaged with the other end of the corresponding front arm.

6. The disk loading apparatus according to claim 1, wherein:

one of said link arms has a projection which projects toward the other link arm at the crossing point with the other link arm, and the other link arm has a grooved portion extending along a locus of the projection upon pivotal motion of said link arms and adapted to receive the projection inserted therein.

7. The disk loading apparatus according to claim 6, wherein:

the grooved portion has a cutout which is cut out from a position of the projection in a state in which the disk is not loaded toward a center of the loaded position, and when a different disk having a diameter smaller than that of the disk is inserted in a one-sided state to the front arm side which engages with the other of said link arms of the insertion opening, the projection is fitted into the cutout.

8. The disk loading apparatus according to claim 1, wherein:

each of said front arms has a projection which projects toward a corresponding one of said link arms;

each of said link arms has a grooved portion in which the corresponding projection slidably moves upon pivotal motion of the front arm;

at least one of the grooved portions has a cutout which is cut out from the grooved portion to a center side of the loaded position; and the projection is fitted into the cutout when a different disk having a diameter smaller than that of the disk is inserted into the insertion opening in a one-sided state to the front arm side which engages with the link arm on the opposite side to the link arm which has the cutout.

9. The disk loading apparatus according to claim 1, wherein at least one of said link arms has a pivotal motion restricting portion adapted to restrict, when the disk is loaded to the loaded position, pivotal motion of said link arms in directions in which the other ends of said link arms move toward each other in a state in which said link arms are spaced from the disk.

10. The disk loading apparatus according to claim 1, further comprising:

an abutting member adapted to be abutted with one of faces of the disk loaded to the loaded position; and an arm member adapted to pivot to move said abutting member into abutment with the disk, wherein at least one of said link arms includes a pivotal motion restricting portion adapted to restrict pivotal motion of the arm member when the disk is not loaded.

11. A disk apparatus, comprising:

a disk loading apparatus for loading a disk to a loaded position, including:

an apparatus body having an insertion opening corresponding to a diametrical dimension of the disk and having the loaded position therein to which the disk inserted into the insertion opening is to be positioned;

a pair of front arms disposed in a substantially symmetrical relationship with each other with respect to a virtual straight line extending along the loading direction of the disk and passing a substantially central position of the insertion opening and supported at one end thereof for pivotal motion in the proximity of the opposite ends of the insertion opening such that the other ends thereof are spaced away from each other to load the disk;

a pair of link arms disposed in a substantially symmetrical relationship with each other around the virtual straight line and in a crossing relationship with each other and supported at one end thereof for pivotal motion such that the other ends thereof are spaced away from each other to synchronize the pivotal motion of the front arm with which one of said link arms is engaged and the pivotal motion of the front arm with which the other of said link arms is engaged with each other, wherein at least one of said link arms has a restricting portion adapted to abut with an end edge of the disk loaded to the loaded position to restrict the movement of the disk to a leading end side in the loading direction; and an information reading/recording apparatus adapted to carry out at least one of reading and recording of information from and on the disk loaded by said disk loading apparatus.

* * * * *